(12) United States Patent
Sakurabu et al.

(10) Patent No.: US 12,244,925 B2
(45) Date of Patent: Mar. 4, 2025

(54) DISTANCE-BASED FOCUS SELECTION METHOD, IMAGING METHOD, AND IMAGING APPARATUS

(71) Applicant: FUJIFILM Corporation, Tokyo (JP)

(72) Inventors: Hitoshi Sakurabu, Saitama (JP); Hideaki Kokubun, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 95 days.

(21) Appl. No.: 18/155,630

(22) Filed: Jan. 17, 2023

(65) Prior Publication Data
US 2023/0247288 A1  Aug. 3, 2023

(30) Foreign Application Priority Data

Jan. 31, 2022 (JP) ................................. 2022-013769

(51) Int. Cl.
| | |
|---|---|
| H04N 23/67 | (2023.01) |
| G02B 7/04 | (2021.01) |
| G03B 13/36 | (2021.01) |
| G06V 10/25 | (2022.01) |
| G06V 10/74 | (2022.01) |

(52) U.S. Cl.
CPC ............. H04N 23/675 (2023.01); G02B 7/04 (2013.01); G03B 13/36 (2013.01); G06V 10/25 (2022.01); G06V 10/761 (2022.01)

(58) Field of Classification Search
CPC ........ H04N 23/675; H04N 23/63; G02B 7/04; G02B 7/28; G02B 7/34; G02B 7/36; G03B 13/36; G06V 10/25; G06V 10/761; G06V 20/20

See application file for complete search history.

(56) References Cited

U.S. PATENT DOCUMENTS

| | | | | | |
|---|---|---|---|---|---|
| 3,736,057 | A | * | 5/1973 | Harvey | ................... G01S 17/46 |
| | | | | | 250/201.4 |
| 4,792,819 | A | * | 12/1988 | Akashi | ..................... G02B 7/36 |
| | | | | | 396/147 |
| 5,532,782 | A | * | 7/1996 | Mori | ........................ G02B 7/28 |
| | | | | | 396/257 |

(Continued)

FOREIGN PATENT DOCUMENTS

| | | |
|---|---|---|
| JP | 2006-243609 A | 9/2006 |
| JP | 2009-118162 A | 5/2009 |

(Continued)

*Primary Examiner* — Chiawei Chen
(74) *Attorney, Agent, or Firm* — Studebaker & Brackett PC

(57) ABSTRACT

A selection method includes a first imaging step of imaging a subject included in a plurality of candidate regions including a first region and a plurality of second regions, a first calculation step of calculating a first distance, which is a distance of a first subject in the first region, and a plurality of second distances, which are distances of a plurality of second subjects in the plurality of second regions, a first specifying step of specifying a first specific region, which corresponds to the second distance satisfying a first condition, from among the plurality of second regions, and a first selection step of selecting a first in-focus subject, which is to be focused, from among the first subject and the second subject in the first specific region based on a first ratio which is a ratio of the first specific region to the plurality of second regions.

14 Claims, 44 Drawing Sheets

(56) References Cited

U.S. PATENT DOCUMENTS

| | | | | |
|---|---|---|---|---|
| 6,194,694 | B1* | 2/2001 | Shirai | G02B 7/28 |
| | | | | 250/201.2 |
| 2011/0128640 | A1* | 6/2011 | Koh | G02B 7/38 |
| | | | | 359/823 |
| 2012/0163785 | A1* | 6/2012 | Tomosada | G03B 3/10 |
| | | | | 396/79 |
| 2014/0022636 | A1* | 1/2014 | Asano | G03B 13/36 |
| | | | | 359/463 |
| 2016/0337579 | A1* | 11/2016 | Tanaka | H04N 25/134 |
| 2017/0118393 | A1* | 4/2017 | Dayana | H04N 13/239 |
| 2017/0214846 | A1* | 7/2017 | Du | H04N 23/45 |
| 2019/0204714 | A1* | 7/2019 | Yu | G03B 13/36 |
| 2019/0320120 | A1* | 10/2019 | Du | G01B 11/02 |
| 2022/0046177 | A1* | 2/2022 | Honjo | H04N 23/695 |
| 2022/0294991 | A1* | 9/2022 | Hoshino | H04N 23/672 |
| 2022/0337756 | A1* | 10/2022 | Kudo | G06V 40/161 |
| 2024/0060822 | A1* | 2/2024 | Shi | H04N 23/695 |

FOREIGN PATENT DOCUMENTS

| | | |
|---|---|---|
| JP | 2014-126858 A | 7/2014 |
| JP | 2020-067534 A | 4/2020 |

* cited by examiner

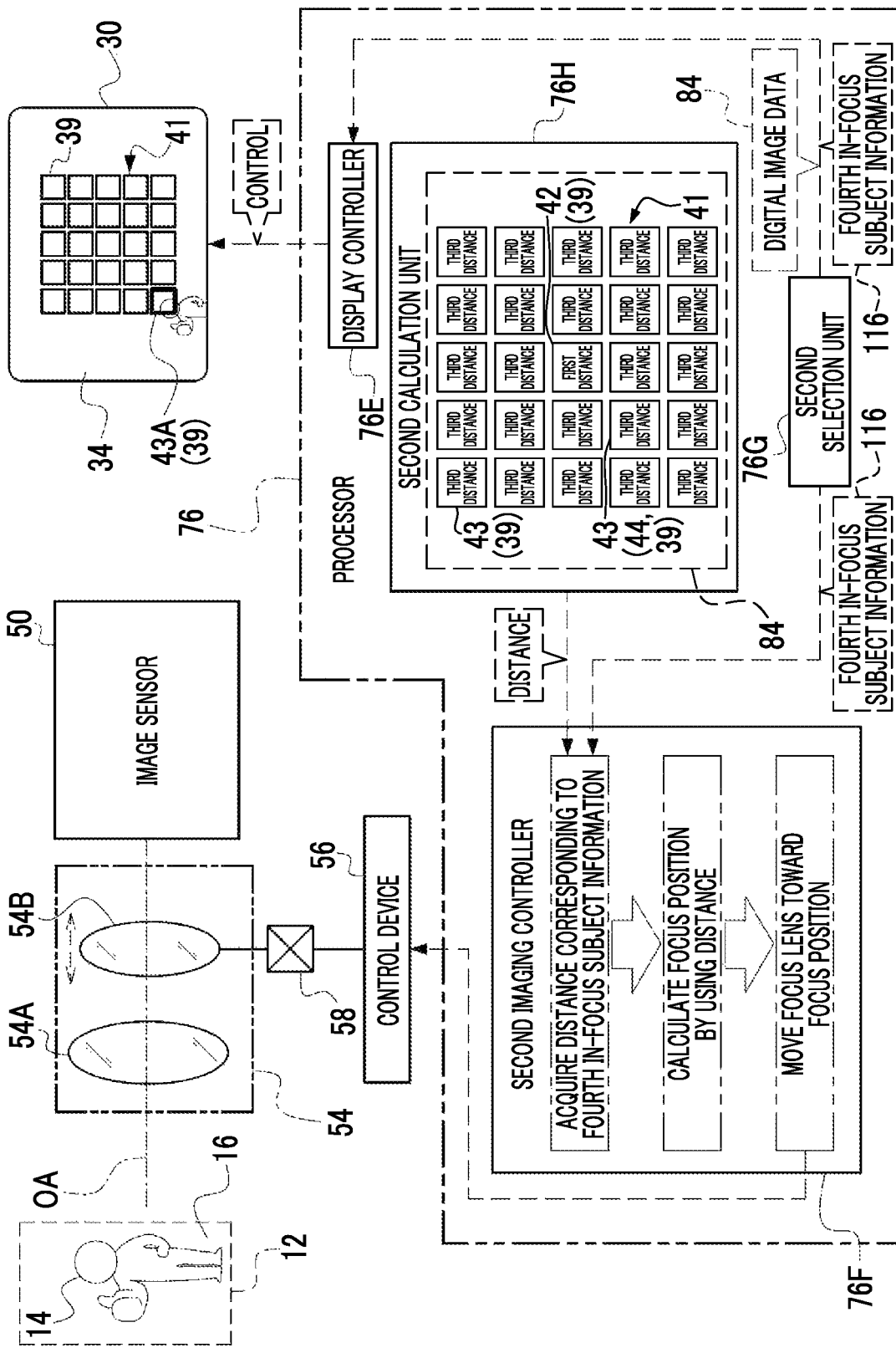

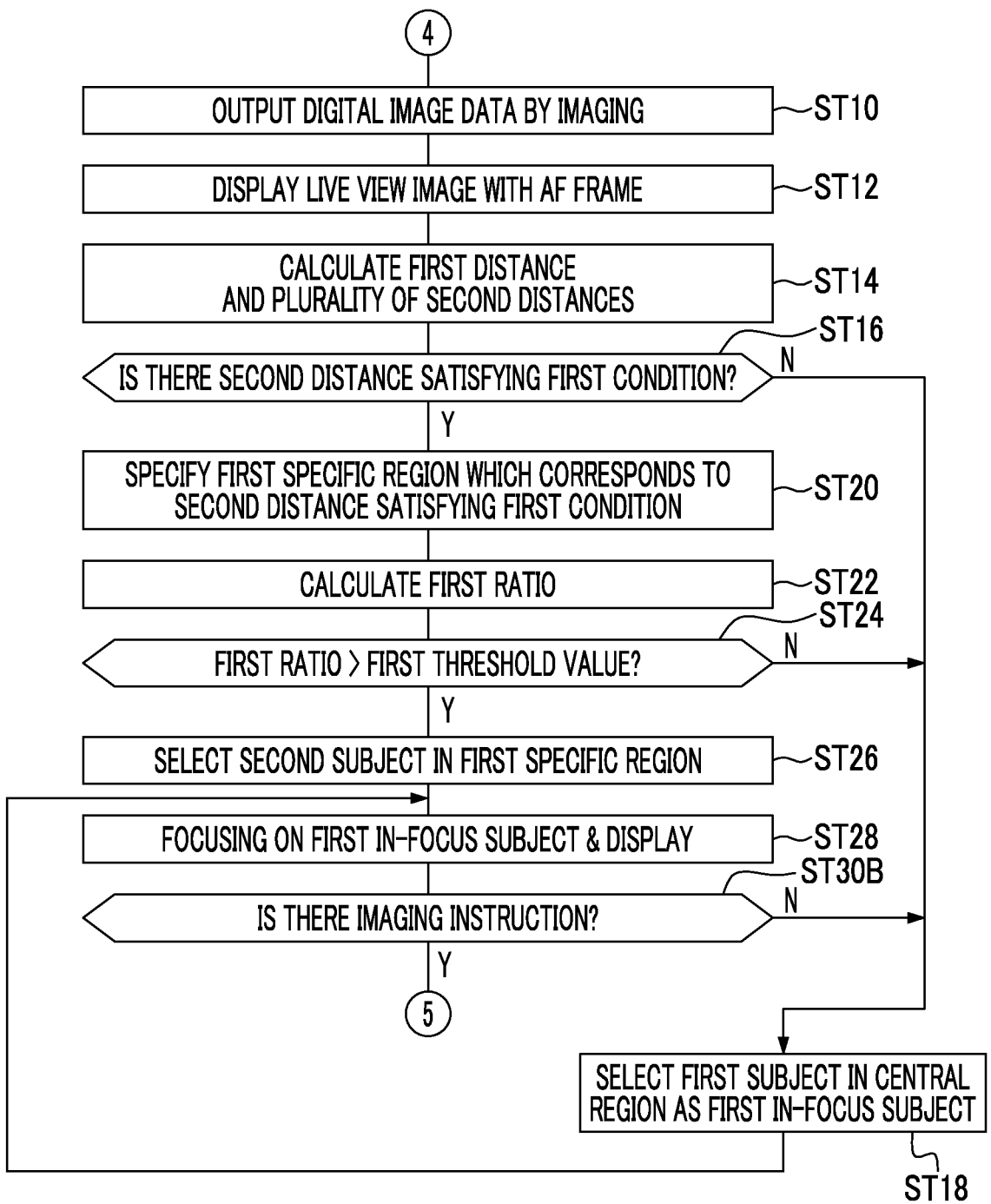

DISTANCE-BASED FOCUS SELECTION METHOD, IMAGING METHOD, AND IMAGING APPARATUS

CROSS-REFERENCE TO RELATED APPLICATIONS

This application claims priority under 35 USC 119 from Japanese Patent Application No. 2022-013769 filed on Jan. 31, 2022, the disclosure of which is incorporated by reference herein.

BACKGROUND

1. Technical Field

The technology of the present disclosure relates to a selection method, an imaging method, and an imaging apparatus.

2. Related Art

JP2020-067534A discloses an imaging apparatus that has a function of detecting a region of a predetermined object from a captured image and automatically focusing on the detected region. The imaging apparatus disclosed in JP2020-067534A comprises an image sensor, a first detection unit, a second detection unit, a focus position decision unit, and an AF controller.

In the imaging apparatus disclosed in JP2020-067534A, the image sensor images a subject and generates image data indicating the captured image. The first detection unit detects the region including the predetermined object from the captured image. The second detection unit detects, from the captured image, distance information indicating a distance to the subject included in each small region for each of a plurality of small regions set in the captured image. The focus position decision unit decides a focus position in the detected region from the region detected by the first detection unit and the distance information detected by the second detection unit. The AF controller controls an automatic focusing operation based on the focus position.

In the imaging apparatus disclosed in JP2020-067534A, the focus position decision unit sets the focus position to focus on the small region at the predetermined position in a case in which a subject distance of the small region at the predetermined position in the detected region is equal to or less than a predetermined value. Moreover, the focus position decision unit sets the focus position to focus on the small region in which the subject distance is equal to or less than the predetermined value and a distance from the small region at the predetermined position is smallest in the small region disposed around the small region at the predetermined position in a case in which in a case in which the subject distance of the small region at the predetermined position is larger than the predetermined value.

JP2014-126858A discloses an imaging apparatus including a focus detection unit, a distance detection unit, and a controller. In the imaging apparatus disclosed in JP2014-126858A, the focus detection unit executes an AF scan of detecting a focus position of a set focus detection region based on a focus evaluation value obtained from a captured image. The distance detection unit obtains a distribution of subject distances included in an imaging scene based on the focus evaluation value obtained by the AF scan. The controller controls an operation of the imaging apparatus based on the distribution of the subject distances obtained by the distance detection unit. The distance detection unit detects a focus lens position at which the focus evaluation value peaks for each focus detection region, and then corrects the focus lens position at which the detected focus evaluation value peaks in accordance with a position of the focus detection region to obtain the distribution of the subject distances.

JP2006-243609A discloses an autofocus device. In the autofocus device disclosed in JP2006-243609A, in a case in which a determination is made that a difference between a detected subject distance and a previous subject distance is larger than a predetermined value during continuous imaging, that is, in a case in which a distance measurement area deviates from a main subject, a focusing operation is performed based on the previous subject distance, instead of the subject distance detected in that case. In this case, since the previous subject distance is a subject distance of the main subject, an image in which the main subject is in focus is captured.

JP2009-118162A discloses a camera. The camera disclosed in JP2009-118162A comprises an imaging element that captures an image of a subject at time intervals, a distance measurement unit that measures a distance to the subject, and an imaging interval adjustment unit that increases a frame rate of imaging by the imaging element in a case in which a change amount of the distance per unit time measured by the distance measurement unit is increased during continuous imaging.

SUMMARY

An embodiment according to the technology of the present disclosure provides a selection method and an imaging apparatus capable of facilitating focusing on a subject that a user takes an interest, as one aspect. Moreover, an embodiment according to the technology of the present disclosure provides an imaging method capable of achieving both release and focusing in a well-balanced manner, as another aspect.

A first aspect according to the technology of the present disclosure relates to a selection method comprising a first imaging step of imaging a subject included in a plurality of candidate regions including a first region and a plurality of second regions, a first calculation step of calculating a first distance, which is a distance of a first subject in the first region, and a plurality of second distances, which are distances of a plurality of second subjects in the plurality of second regions, a first specifying step of specifying a first specific region, which corresponds to the second distance satisfying a first condition among the plurality of second distances, from among the plurality of second regions, and a first selection step of selecting a first in-focus subject, which is to be focused, from among the first subject and the second subject in the first specific region based on a first ratio which is a ratio of the first specific region to the plurality of second regions.

A second aspect of the technology of the present disclosure relates to an imaging apparatus comprising an image sensor, and a processor, in which the processor causes the image sensor to image a subject included in a plurality of candidate regions including a first region and a plurality of second regions, calculates a first distance, which is a distance of a first subject in the first region, and a plurality of second distances, which are distances of a plurality of second subjects in the plurality of second regions, specifies a first specific region, which corresponds to the second distance satisfying a first condition among the plurality of second distances, from among the plurality of second regions, and selects a first in-focus subject, which is to be focused, from among the first subject and the second subject in the first specific region based on a first ratio which is a ratio of the first specific region to the plurality of second regions.

A third aspect according to the technology of the present disclosure relates to an imaging method comprising a first calculation step of calculating a first distance which is a distance of a first subject included in first frame data of a first frame period, a first movement step of moving a focus lens to a first position based on the first distance, a second calculation step of calculating a second distance which is a distance of a second subject included in second frame data of a second frame period after the first frame period, a selection step of selecting a second position or a third position closer to the first position than the second position, as a position to which the focus lens is moved, based on the second distance, and an imaging step of moving the focus lens to the selected second position or third position and imaging the second subject.

BRIEF DESCRIPTION OF THE DRAWINGS

Exemplary embodiments of the technology of the disclosure will be described in detail based on the following figures, wherein:

FIG. 29 is a conceptual diagram showing an example of processing contents of the second imaging controller, the second calculation unit, the display controller, and the second selection unit according to the third embodiment;

FIG. 30C is the continuation of the flowchart shown in FIG. 30A and FIG. 30B;

DESCRIPTION OF THE PREFERRED EMBODIMENTS

In the following, an example of embodiments of a selection method, an imaging method, and an imaging apparatus according to the technology of the present disclosure will be described with reference to the accompanying drawings.

First Embodiment

Figure 1:
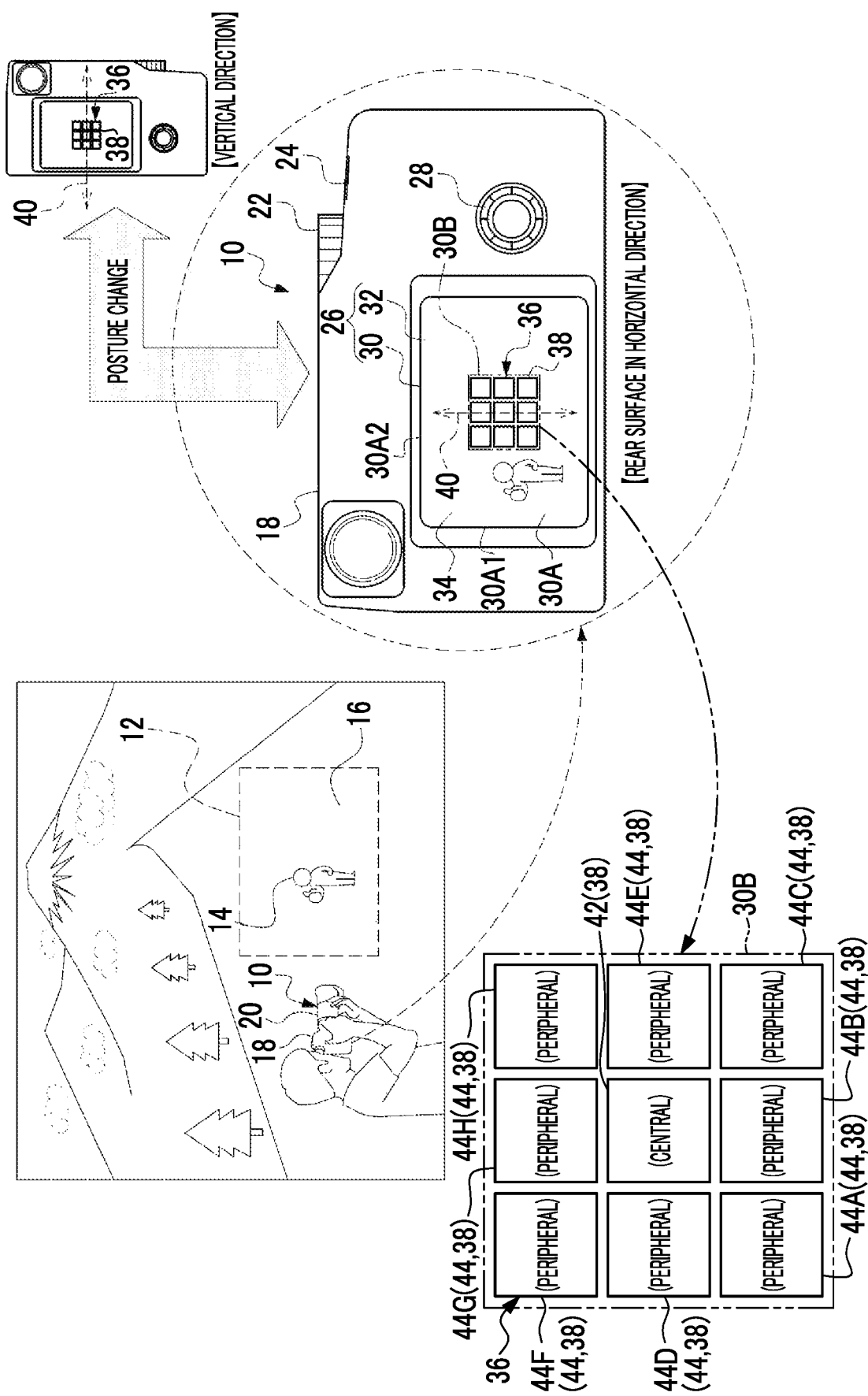
FIG. 1 is a conceptual diagram showing an example of an appearance of an imaging apparatus and an example of an AF frame according to a first embodiment.

As shown in FIG. 1 as an example, an imaging apparatus 10 which is an example of an "imaging apparatus" according to the technology of the present disclosure captures an imaging target region 12 designated as a subject. A range of the imaging target region 12 is determined by an angle of view designated by a user of the imaging apparatus 10 (hereinafter, referred to as the "user"). In the example shown in FIG. 1, a person 14 and a road 16 are included in the imaging target region 12. Moreover, in the example shown in FIG. 1, an aspect is shown in which the person 14 stands on the road 16.

For example, the imaging apparatus 10 is a lens-interchangeable digital camera. The imaging apparatus 10 comprises an imaging apparatus body 18 and an interchangeable lens 20. The interchangeable lens 20 is interchangeably attached to the imaging apparatus body 18. It should be noted that, here, the lens-interchangeable digital camera is described as an example of the imaging apparatus 10, but this is merely an example, and a digital camera with a fixed lens may be used. Moreover, the technology of the present disclosure is established even for a digital camera mounted on various electronic apparatuses, such as a smart device, a wearable terminal, a cell observation device, an ophthalmologic observation device, or a surgical microscope.

In the imaging apparatus body 18, a dial 22, a release button 24, a touch panel display 26, an instruction key 28, and the like are provided.

The dial 22 is operated in a case of setting an operation mode or the like. In the imaging apparatus 10, various operation modes are selectively set by operating the dial 22. The operation mode includes an operation mode of an imaging system. Examples of the operation mode of the imaging system include a live view imaging mode, an imaging mode for a still image, an imaging mode for a video, and a continuous imaging mode. The live view imaging mode is an operation mode for performing continuous imaging for a live view image (hereinafter, also referred to as "live view imaging"). The imaging mode for the still image is an operation mode for performing imaging for the still image accompanied by a main exposure for one frame. The imaging mode for the video is an operation mode for acquiring a video for recording by imaging the subject in accordance with a frame rate for the video (for example, several tens of fps). The continuous imaging mode is an operation mode for performing the continuous imaging (that is, the continuous imaging of the still image).

The release button 24 functions as an imaging preparation instruction unit and an imaging instruction unit, and a two-stage pressing operation of an imaging preparation instruction state indicating an imaging preparation instruction with respect to the imaging apparatus 10 and an imaging instruction state indicating an imaging instruction with respect to the imaging apparatus 10 can be detected. For example, the imaging preparation instruction state refers to a state in which the release button 24 is pushed to an intermediate position (half push position) from a standby position, and the imaging instruction state refers to a state in which the release button 24 is pushed to a final push position (full push position) beyond an intermediate position. It should be noted that, in the following, the "state in which the release button 24 is pushed to the half push position from the standby position" will be referred to as a "half push state", and the "state in which the release button 24 is pushed to the full push position from the standby position" will be referred to as a "full push state". Depending on the configuration of the imaging apparatus 10, the imaging preparation instruction state may be a state in which a finger of the user is in contact with the release button 24, and the imaging instruction state may be a state in which the finger of the user who performs the operation shifts from a state of being in contact with the release button 24 to a state of being separated from the release button 24.

The release button 24 is also operated in a case in which a continuous imaging instruction is given to the imaging apparatus 10. The continuous imaging is continuous imaging of the still image accompanied by the main exposure. In a situation in which the imaging mode is set for the imaging apparatus 10, in a case in which the full push state of the release button 24 is continued for a certain time (for example, 0.5 seconds) or longer, the continuous imaging mode is set, and the continuous imaging is started. The continuous imaging is performed until the full push state is released. In the imaging apparatus 10, the continuous imaging is realized by continuously performing the main exposure at predetermined time intervals. Here, the predetermined time interval refers to a time interval for one frame determined by, for example, a frame rate for the continuous imaging of several fps to several tens fps.

The touch panel display 26 comprises a display 30 and a touch panel 32. Examples of the touch panel display 26 include an out-cell type, an on-cell type, or an in-cell type touch panel display. Examples of the display 30 include an organic EL display or a liquid crystal display.

The display 30 is also used for displaying the still image obtained by performing the imaging for the still image in a case in which the imaging apparatus 10 is instructed to capture the still image via the release button 24. Further, the display 30 is used for displaying a playback image and displaying a menu screen and the like in a case in which the imaging apparatus 10 is in a playback mode.

The touch panel 32 receives the instruction from the user. For example, the instruction from the user includes the imaging preparation instruction, the imaging instruction, the continuous imaging instruction, and the like. The imaging preparation instruction, the imaging instruction, the continuous imaging instruction, and the like are realized by performing an operation on a soft key. For example, by the user turning on the soft key displayed on the display 30 via the touch panel 32, the imaging preparation instruction, the imaging instruction, the continuous imaging instruction, and the like are given to the imaging apparatus 10.

The instruction key 28 receives various instructions. Here, the "various instructions" refers to various instructions, for example, an instruction for displaying the menu screen on which various menus can be selected, an instruction for selecting one or a plurality of menus, an instruction for confirming a selected content, an instruction for deleting the selected content, zooming in, zooming out, and frame advance. Moreover, these instructions may be given by the touch panel 32.

FIG. 1 shows an aspect in which a live view image 34 (image in which the imaging target region 12 is included as an image in the example shown in FIG. 1) obtained by the imaging with the imaging apparatus 10 is displayed on the display 30. The imaging apparatus 10 has an auto focus (AF) function, and an AF frame 36 is displayed on the live view image 34 in a superimposed manner. The imaging apparatus 10 performs the focusing on the subject included in the AF frame 36, that is, the subject indicated by the image displayed in the AF frame 36 (that is, the subject in the real space).

A screen 30A of the display 30 is a rectangle screen having a short side 30A1 and a long side 30A2. The AF frame 36 is a rectangular frame and is displayed on a central portion 30B of the screen 30A. The AF frame 36 includes a plurality of regions 38 disposed in a matrix of 3×3. The region 38 is a region defined by a rectangular frame. The plurality of regions 38 are examples of a "plurality of candidate regions" according to the technology of the present disclosure.

An up-down direction 40 is set for the AF frame 36. The up-down direction 40 is a direction along the short side 30A1. Moreover, the up-down direction 40 is fixed in advance with respect to the AF frame 36. Therefore, even in a case in which a posture of the imaging apparatus 10 is changed, the up-down direction 40 with respect to the AF frame 36 is not changed. That is, even in a case in which the posture of the imaging apparatus 10 is changed, the up-down direction 40 remains the direction along the short side 30A1. For example, the up-down direction 40 with respect to the AF frame 36 is not changed regardless of whether the posture of the imaging apparatus 10 is changed from a horizontal direction to a vertical direction or from the vertical direction to the horizontal direction.

The plurality of regions 38 includes a central region 42 and a plurality of peripheral regions 44. The plurality of peripheral regions 44 are disposed in all directions of the central region 42 to surround the central region 42 in the screen 30A. The central region 42 is an example of a "first region" and a "central region" according to the technology of the present disclosure. Moreover, the plurality of peripheral regions 44 are examples of a "plurality of second regions" according to the technology of the present disclosure. Moreover, the peripheral region 44 is an example of a "peripheral region" according to the technology of the present disclosure.

In the example shown in FIG. 1, eight peripheral regions 44 are shown as the plurality of peripheral regions 44. In the example shown in FIG. 1, the eight peripheral regions 44 refer to peripheral regions 44A to 44H. The peripheral regions 44A to 44C are positioned below the central region 42 in the up-down direction 40, and are disposed along a direction (hereinafter, also referred to as "lateral direction") orthogonal to the up-down direction 40 in the screen 30A from a lower left side of a rear view of the horizontal imaging apparatus 10 shown in FIG. 1 to a lower right side of the rear view. The peripheral regions 44D and 44E are adjacent to each other in the lateral direction via the central region 42. Specifically, the peripheral region 44D is disposed on a left side of the rear view of the central region 42 in the horizontal imaging apparatus 10 shown in FIG. 1, and the peripheral region 44E is disposed on a right side of the rear view of the central region 42 in the horizontal imaging apparatus 10 shown in FIG. 1. The peripheral regions 44F to 44H are positioned above the central region 42 in the up-down direction 40 and are disposed along the lateral direction from an upper left of the rear view of the horizontal imaging apparatus 10 shown in FIG. 1 to an upper right of the rear view.

Figure 2:
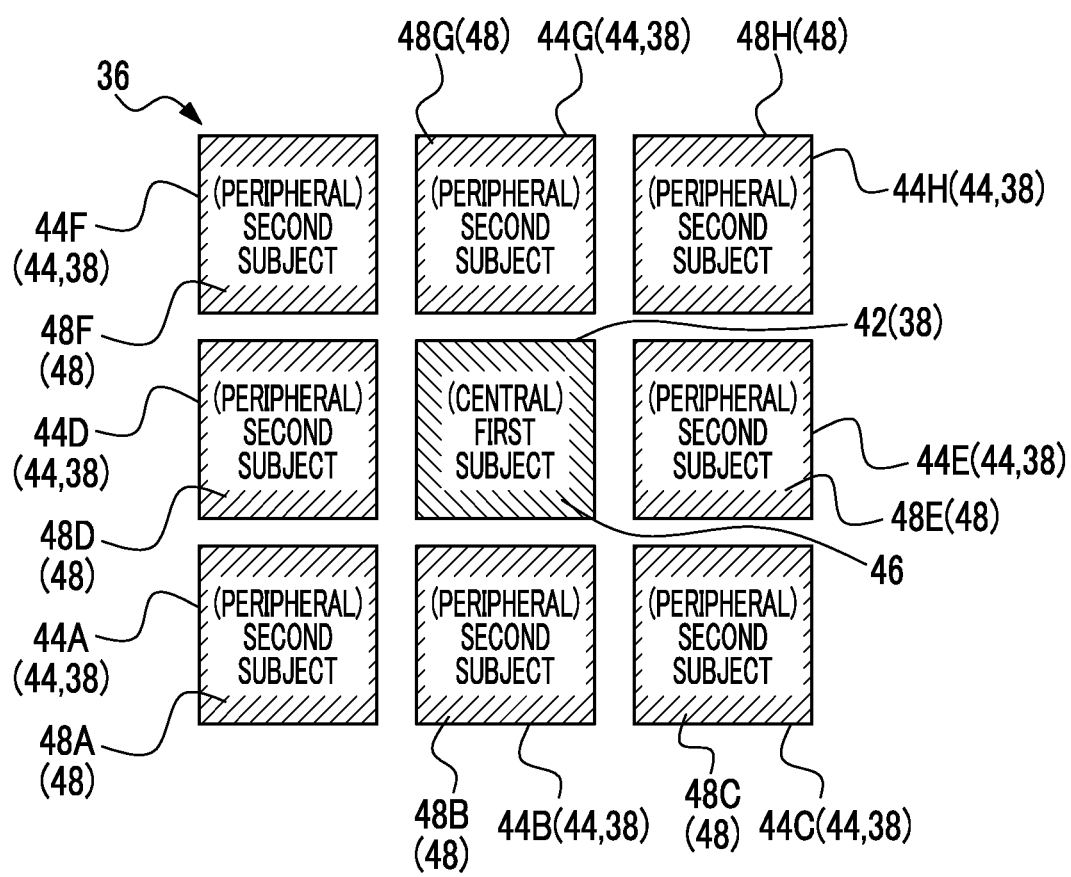
FIG. 2 is a conceptual diagram showing an example of the AF frame according to the first embodiment.
Figure 6:
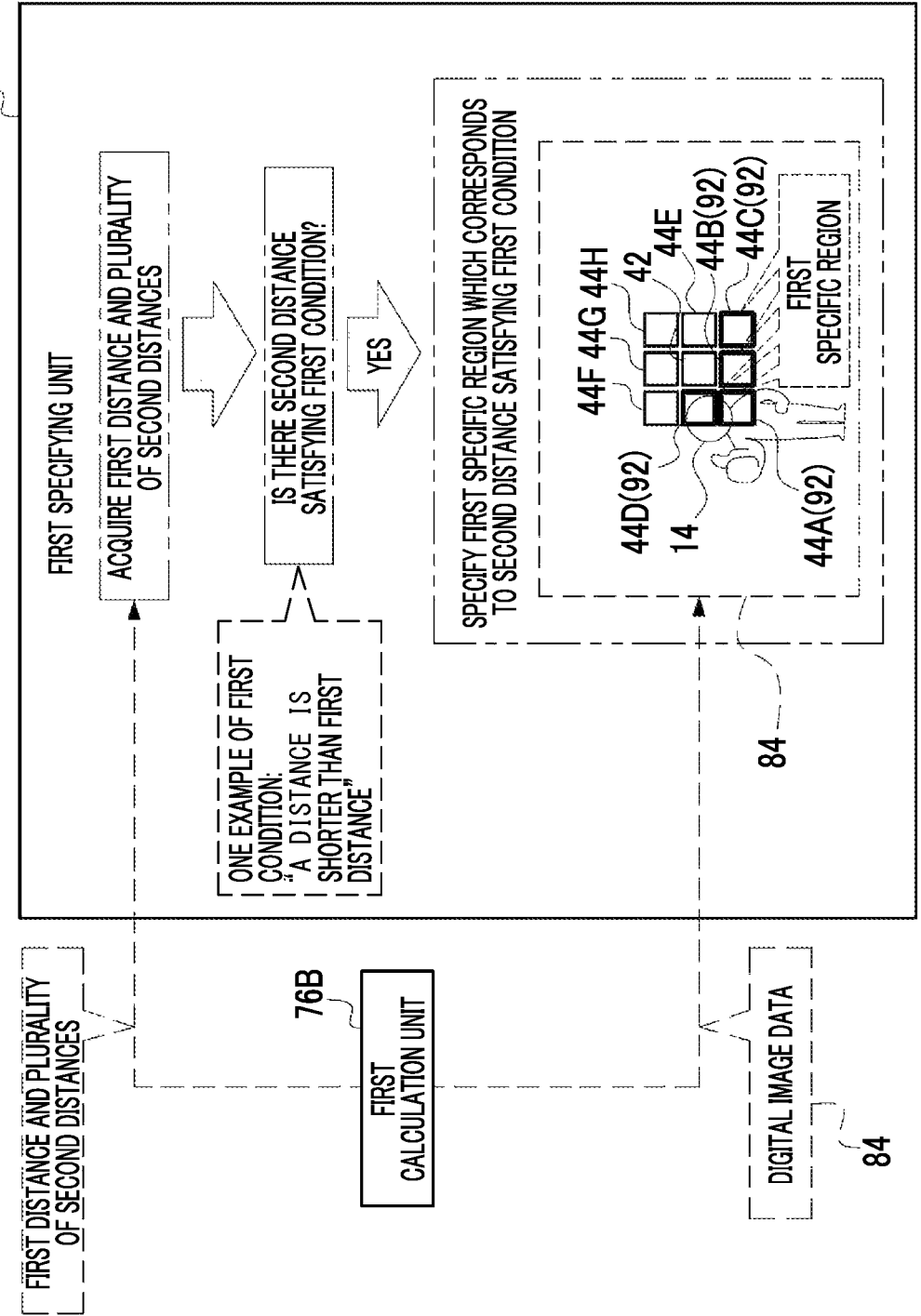
FIG. 6 is a conceptual diagram showing an example of processing contents of the first calculation unit and a first specifying unit according to the first embodiment.

As shown in FIG. 2 as an example, the plurality of regions 38 include the subject. The imaging method using the imaging apparatus 10 includes a step of imaging the subject included in the plurality of regions 38. The subjects included in the plurality of regions 38 are a first subject 46 in the central region 42 and second subjects 48A to 48H in the peripheral regions 44A to 44H. The first subject 46 is an example of a "first subject" according to the technology of the present disclosure, and the second subjects 48A to 48H are examples of "a plurality of second subjects" according to the technology of the present disclosure. It should be noted that the "subject" is a person or an object included in each region 38. For example, as shown in FIG. 6, in a case in which one person is included in the plurality of regions 38, a part of the person reflected in each region 38 is the "subject".

The first subject 46 is included in the central region 42. The second subject 48A is included in the peripheral region 44A. The second subject 48B is included in the peripheral region 44B. The second subject 48C is included in the peripheral region 44C. The second subject 48D is included in the peripheral region 44D. The second subject 48E is included in the peripheral region 44E. The second subject 48F is included in the peripheral region 44F. The second subject 48G is included in the peripheral region 44G. The second subject 48H is included in the peripheral region 44H. In the following, for convenience of description, in a case in which it is not necessary to distinguish between the second subjects 48A to 48H, the second subjects 48A to 48H will be referred to as a "second subject 48".

In the imaging apparatus 10, distance measurement with respect to the plurality of regions 38 is performed. That is, in the imaging apparatus 10, distances from a reference position of the imaging apparatus 10 (for example, an imaging surface 52A of an image sensor 50 described below) to the first subject 46 and the plurality of second subjects 48 are calculated. In the first embodiment, the distance measurement is performed by a phase difference distance measurement method using phase difference pixels (for example, image plane phase difference pixels). It should be noted that the distance measurement by the phase difference distance measurement method using the image plane phase difference pixels is merely an example. The distance measurement by a time of flight (TOF) method using a TOF sensor may be used, or the distance measurement by a light detection and ranging (LiDAR) using a scanner may be used, and the distance measurement method may be any distance measurement method as long as the distance measurement with respect to the first subject 46 and the plurality of second subjects 48 can be realized.

Figure 3:
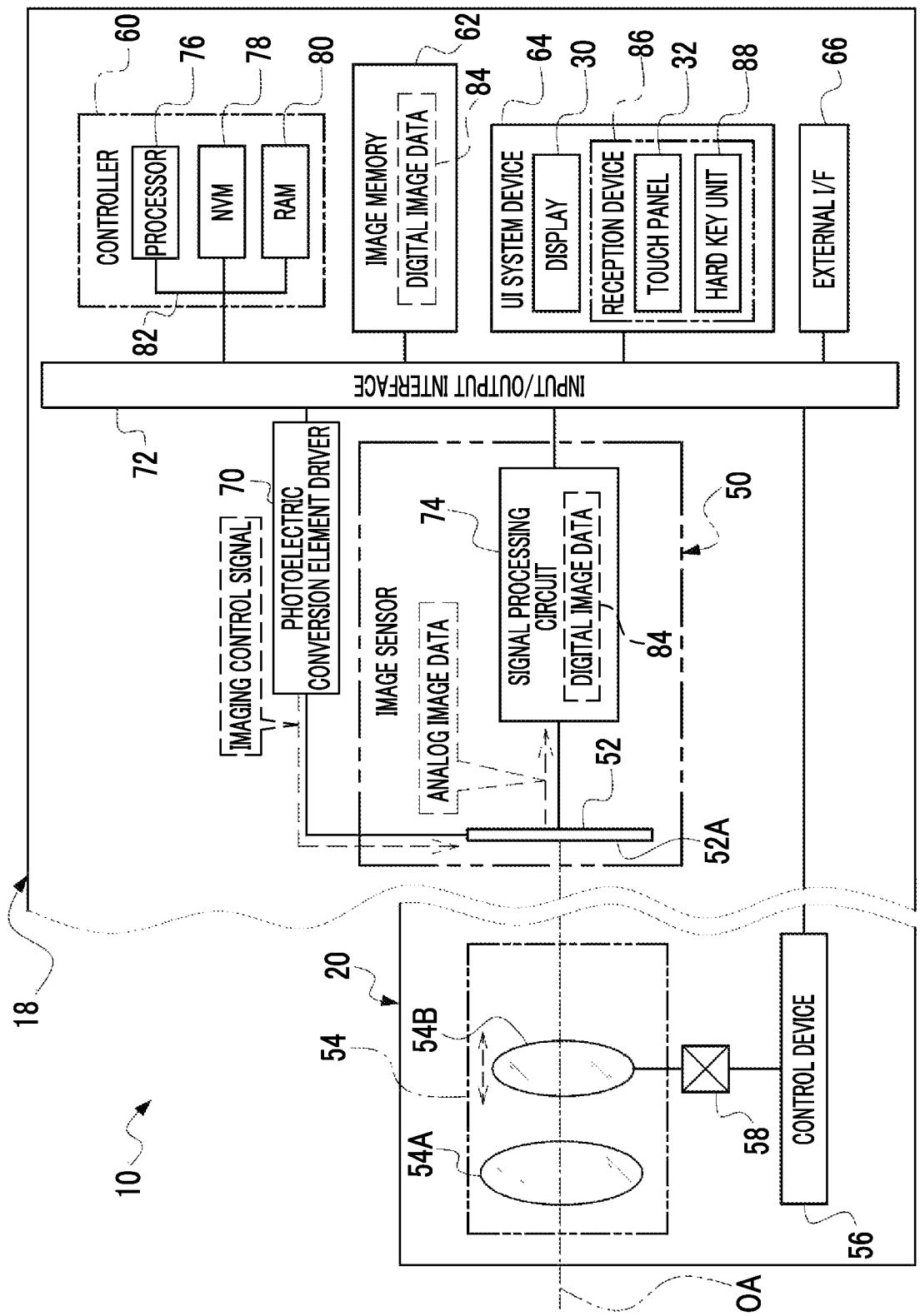
FIG. 3 is a schematic configuration diagram showing an example of a hardware configuration of the imaging apparatus according to the first embodiment.

As shown in FIG. 3 as an example, the imaging apparatus body 18 comprises the image sensor 50. The image sensor 50 comprises a photoelectric conversion element 52. The photoelectric conversion element 52 includes the imaging surface 52A. The photoelectric conversion element 52 includes a phase difference pixel division region and a non-phase difference pixel division region. The phase difference pixel division region is a phase difference pixel group composed of a plurality of phase difference pixels, and receives subject light to generate phase difference image data as an electric signal in accordance with a light-receiving amount. The phase difference image data is used, for example, for the distance measurement. The distance measurement as used herein refers to, for example, processing of calculating a distance from the imaging surface 52A to the subject (hereinafter, also referred to as a "subject distance") from a calculation result obtained by performing a correlation calculation using the phase difference image data. The non-phase difference pixel division region is a non-phase difference pixel group composed of the plurality of non-phase difference pixels, and receives the subject light to generate non-phase difference image data as the electric signal in accordance with the light-receiving amount. The non-phase difference image data is, for example, image data indicating a visible light image and is used as a recording image or a display image (for example, the live view image 34 (see FIG. 1)).

The interchangeable lens 20 comprises an imaging lens 54, a control device 56, and an actuator 58. The imaging lens 54 includes an objective lens 54A, a focus lens 54B, and the like. The objective lens 54A and the focus lens 54B are disposed in the order of the objective lens 54A and the focus lens 54B along an optical axis OA from a subject side (object side) to the imaging apparatus body 18.

The control device 56 controls the entire interchangeable lens 20 in accordance with an instruction from the imaging apparatus body 18. The control device 56 is a device including a computer including, for example, a processor (for example, a central processing unit (CPU)), a non-volatile memory (NVM), and a random access memory (RAM). It should be noted that, here, although the computer is described, this is merely an example, and a device including an application specific integrated circuit (ASIC), a field programmable gate array (FPGA), or a programmable logic device (PLD) may be applied. Moreover, as the control device 56, for example, a device realized by a combination of a hardware configuration and a software configuration may be used.

The actuator 58 comprises a focus slide mechanism (not shown) and a focus motor (not shown). The focus motor is connected to the control device 56, and the drive of the focus motor is controlled by the control device 56. The focus lens 54B is attached to the focus slide mechanism to be slidable along the optical axis OA. Moreover, the focus motor is connected to the focus slide mechanism, and the focus slide mechanism is operated by receiving the power of the focus motor to move the focus lens 54B along the optical axis OA. In the imaging apparatus 10, the imaging apparatus body 18 performs the calculation of a focus position according to a subject distance (hereinafter, also referred to as an "AF calculation"), and moves the focus lens 54B toward the calculated focus position thereby adjusting the focus. Here, the "focus position" refers to a position of the focus lens 54B on the optical axis OA in an in-focus state.

The imaging apparatus body 18 comprises a controller 60, an image memory 62, a user interface (UI) system device 64, an external interface (I/F) 66, a photoelectric conversion element driver 70, and an input/output interface 72. Moreover, the image sensor 50 comprises a signal processing circuit 74.

The controller 60, an image memory 62, the UI system device 64, the external I/F 66, the photoelectric conversion element driver 70, and the signal processing circuit 74 are connected to the input/output interface 72. Moreover, the control device 56 of the interchangeable lens 20 is also connected to the input/output interface 72.

The controller 60 comprises a processor 76, an NVM 78, and a RAM 80. The processor 76, the NVM 78, and the RAM 80 are connected to each other via a bus 82, and the bus 82 is connected to the input/output interface 72.

The NVM 78 is a non-transitory storage medium, and stores various parameters and various programs. For example, the NVM 78 is an electrically erasable programmable read-only memory (EEPROM). It should be noted that this is merely an example, and another type of non-volatile memory may be used. Moreover, the RAM 80 transitorily stores various pieces of information, and is used as a work memory.

The processor 76 is an example of a "processor" according to the technology of the present disclosure, and includes a CPU and a graphics processing unit (GPU). The GPU is operated under the control of the CPU, and is responsible for executing processing related to an image. It should be noted that the processor 76 may be at least one CPU. Moreover, a plurality of GPUs may be incorporated in the processor 76. The processor 76 reads out a necessary program from the NVM 78 and executes the read out program on the RAM 80. The processor 76 controls the entire imaging apparatus 10 in accordance with the program executed on the RAM 80. In the example shown in FIG. 3, the control device 56, the image memory 62, the UI system device 64, the external I/F 66, the photoelectric conversion element driver 70, and the signal processing circuit 74 are controlled by the processor 76.

Under the control of the photoelectric conversion element driver 70, the photoelectric conversion element 52 photoelectrically converts the subject light received by the imaging surface 52A, and outputs the electric signal in accordance with the light amount of the subject light to the signal processing circuit 74 as analog image data indicating the subject light.

The signal processing circuit 74 generates digital image data 84 by digitizing the analog image data read out from the photoelectric conversion element 52. The digital image data 84 includes the phase difference image data and the non-phase difference image data, which are described above.

The image memory 62 stores the digital image data 84 generated by the signal processing circuit 74. That is, the signal processing circuit 74 stores the digital image data 84 in the image memory 62, under the control of the processor 76. The processor 76 acquires the digital image data 84 from the image memory 62, and executes various pieces of processing by using the acquired digital image data 84.

The UI system device 64 comprises the display 30, and the processor 76 displays various pieces of information on the display 30. Moreover, the UI system device 64 comprises a reception device 86. The reception device 86 comprises the touch panel 32 and a hard key unit 88. The hard key unit 88 is a plurality of hard keys, and includes the dial 22, the release button 24, and the instruction key 28 (see FIG. 1). The processor 76 is operated in accordance with various instructions received by the reception device 86.

The external I/F 66 controls the exchange of various pieces of information with and from a device (hereinafter, also referred to as an "external device") that is present outside the imaging apparatus 10. Examples of the external I/F 66 include a universal serial bus (USB) interface. The external device (not shown), such as a smart device, a personal computer, a server, a USB memory, a memory card, or a printer, is directly or indirectly connected to the USB interface. It should be noted that, in the first embodiment, although the hard key unit 88 is provided in the UI system device 64, the technology of the present disclosure is not limited to this, and for example, the hard key unit 88 may be connected to the external I/F 66.

By the way, in the imaging apparatus 10, so-called zone AF is performed. In the zone AF, a region targeted for the AF is divided into a plurality of zones, the distance measurement is performed with respect to each zone, and the focusing is performed on the selected zone based on the distance measurement result (that is, the subject distance). Therefore, it is easier to image the subject than in the AF with respect to one region that is not divided into a plurality of zones, and this is also effective in imaging a moving object.

In the zone AF in the related art, the AF is performed based on an average value of the subject distances in all zones in a state in which, out of a central zone and a plurality of peripheral zones surrounding the central zone, weight higher than those of the plurality of peripheral zones is given to the central zone. However, in this case, the focusing on the subject that the user takes an interest may not be correctly performed. Moreover, there is a risk that the focus is out in a case in which a new subject enters the zone. In a case in which the focus is out, the focusing on the subject that the user takes an interest is not correctly performed.

Moreover, as a first method of the zone AF in the related art, a method is known in which the peripheral zones in front of the central zone (for example, the peripheral zones corresponding to the peripheral regions 44A to 44C shown in FIG. 1) are prioritized to search for the subject which is a focusing target. Moreover, as a second method of the zone AF in the related art, a method is known in which the central zone (for example, the central zone corresponding to the central region 42 shown in FIG. 1) is prioritized to search for the subject which is the focusing target. However, even in a case in which the first method is used, in a case in which the subject that the user takes an interest is included in a zone other than the front peripheral zones, the subject intended by the user is out of focus. Moreover, even in a case in which the second method is used, in a case in which the subject that the user takes an interest is included in a zone other than the central zone, the subject intended by the user is out of focus.

Figure 4:
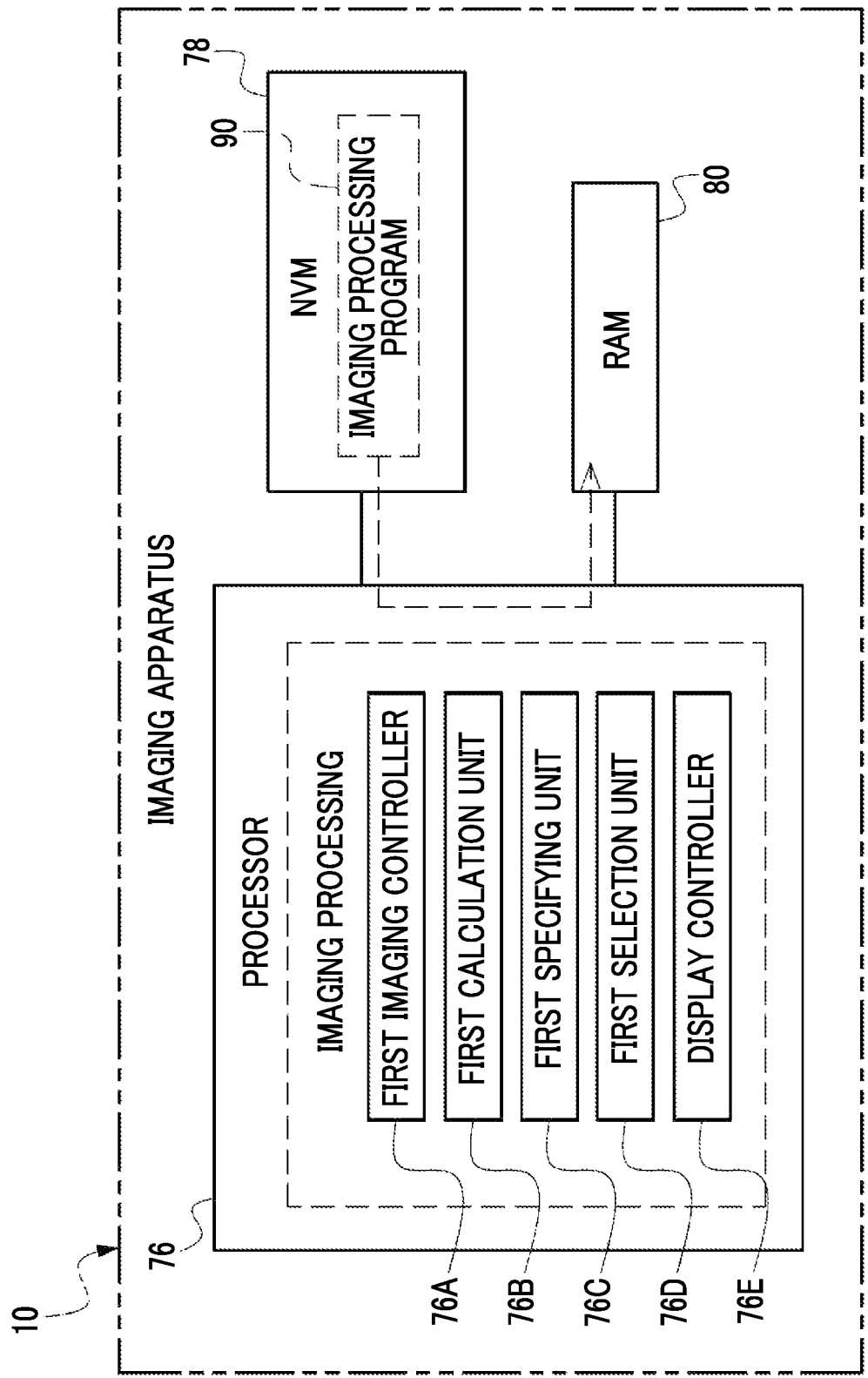
FIG. 4 is a block diagram showing an example of a function of a processor according to the first embodiment.

In view of such circumstances, the imaging apparatus 10 is configured to perform imaging processing (see FIGS. 4 to 12) by the processor 76. As shown in FIG. 4 as an example, an imaging processing program 90 is stored in the NVM 78. The processor 76 reads out the imaging processing program 90 from the NVM 78, and executes the read out imaging processing program 90 on the RAM 80. The processor 76 is operated as a first imaging controller 76A, a first calculation unit 76B, a first specifying unit 76C, a first selection unit 76D, and a display controller 76E in accordance with the imaging processing program 90 executed on the RAM 80 to perform the imaging processing.

It should be noted that processing performed by the first imaging controller 76A is an example of a "first imaging step" according to the technology of the present disclosure. Moreover, processing performed by the first calculation unit 76B is an example of a "first calculation step" according to the technology of the present disclosure. Moreover, processing performed by the first specifying unit 76C is an example of a "first specifying step" according to the technology of the present disclosure. Moreover, processing performed by the first selection unit is an example of a "first selection step" according to the technology of the present disclosure.

Figure 5:
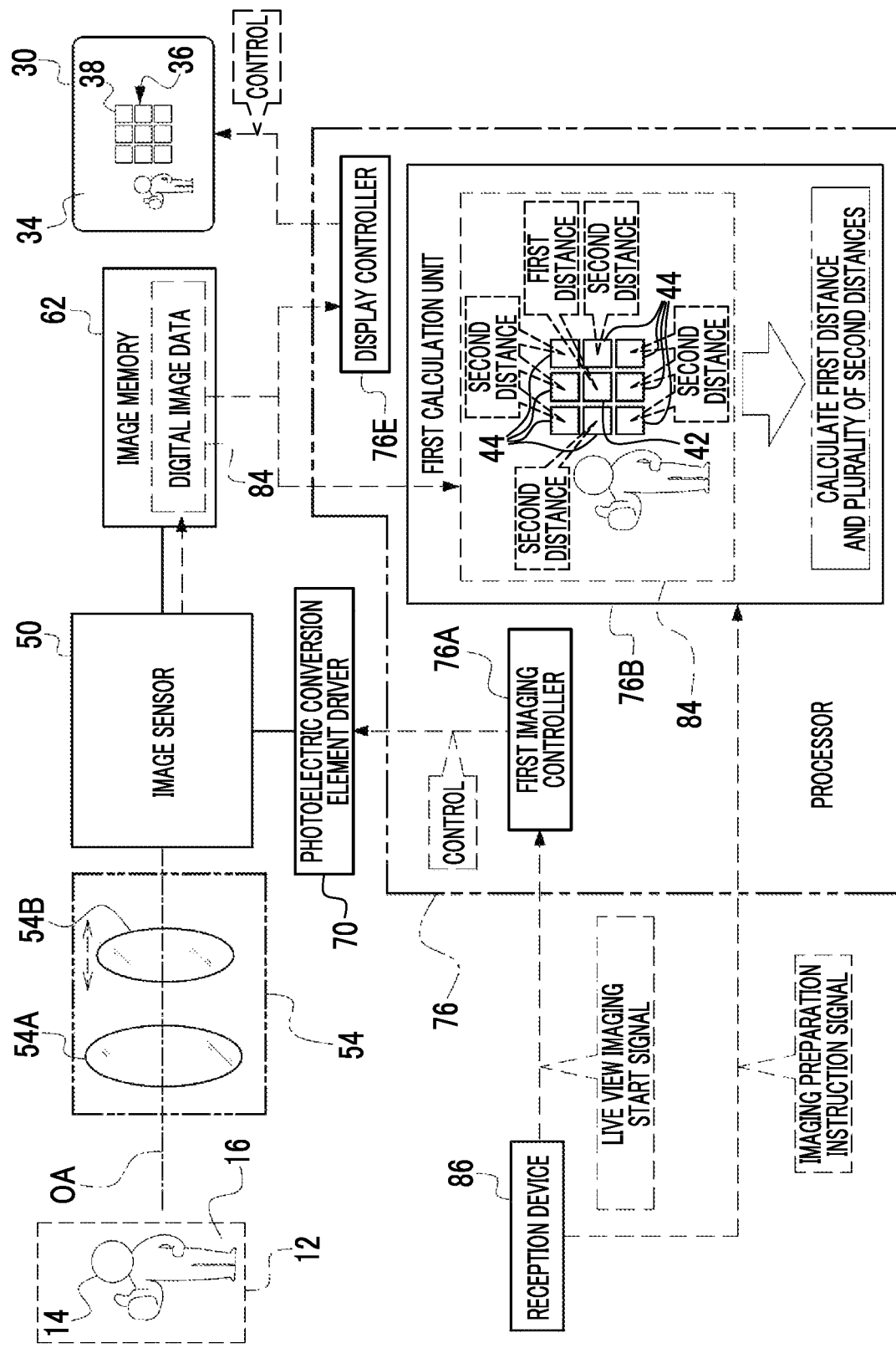
FIG. 5 is a conceptual diagram showing an example of processing contents of a first imaging controller, a first calculation unit, and a display controller according to the first embodiment.

As shown in FIG. 5 as an example, the reception device 86 receives an instruction from the user or the like, and outputs a live view imaging start signal to the first imaging controller 76A in accordance with the received instruction. For example, in a case in which the operation mode of the imaging system is set, the reception device 86 outputs the live view imaging start signal to the first imaging controller 76A. In a case in which the live view imaging start signal is input, the first imaging controller 76A controls the image sensor 50 via the photoelectric conversion element driver 70 to cause the image sensor 50 to perform the live view imaging.

The reception device 86 receives an instruction from the user or the like, and outputs an imaging preparation instruction signal to the first calculation unit 76B in accordance with the received instruction. For example, in a case in which the imaging preparation instruction is received, the reception device 86 outputs the imaging preparation instruction signal to the first calculation unit 76B. In a case in which the imaging preparation instruction signal is input, the first calculation unit 76B performs the distance measurement with respect to the central region 42 and the plurality of peripheral regions 44. In this case, for example, the first calculation unit 76B acquires the digital image data 84 from the image memory 62, and calculates a first distance which is the subject distance related to the first subject 46 (see FIG. 2) included in the central region 42 based on the phase difference image data included in the digital image data 84. Moreover, for example, the first calculation unit 76B calculates a plurality of second distances based on the phase difference image data included in the digital image data 84. The plurality of second distances are a plurality of subject distances related to the plurality of second subjects 48 (see FIG. 2) included in the plurality of peripheral regions 44.

In the first embodiment, the distance measurement is performed with respect to a plurality of portions of the first subject 46. Therefore, the plurality of subject distances are calculated for the first subject 46. The first calculation unit 76B acquires the shortest subject distance as the first distance from the plurality of subject distances of the first subject 46. It should be noted that, here, the shortest subject distance among the plurality of subject distances for the first subject 46 is used as the first distance, but this is merely an example, and a representative subject distance for the first subject 46 need only be used as the first distance. Examples of the representative subject distance for the first subject 46 include an average value, a median value, and a mode value of the plurality of subject distances for the first subject 46.

In the first embodiment, the distance measurement is performed with respect to a plurality of portions of the plurality of second subjects 48 for each of the plurality of peripheral regions 44. Therefore, the plurality of subject distances are calculated for the plurality of second subjects 48. The first calculation unit 76B acquires the shortest subject distance as the second distance from the plurality of subject distances of the plurality of second subjects 48. It should be noted that, here, the shortest subject distance among the plurality of subject distances for the second subjects 48 is used as the second distance, but this is merely an example, and a representative subject distance for the second subjects 48 need only be used as the second distance. Examples of the representative subject distance for the second subjects 48 include an average value, a median value, and a mode value of the plurality of subject distances for the second subjects 48.

The display controller 76E acquires the digital image data 84 used in the calculation by the first calculation unit 76B and generates the live view image 34 based on the acquired digital image data 84. In addition, the display controller 76E displays the live view image 34 on the display and displays the AF frame 36 on the live view image 34 in a superimposed manner. It should be noted that, in the following, the live view image 34 on which the AF frame 36 is displayed in a superimposed manner is also referred to as the "live view image 34 with the AF frame 36".

As shown in FIG. 6 as an example, the first specifying unit 76C acquires the first distance, the plurality of second distances, and the digital image data 84 from the first calculation unit 76B. The first specifying unit 76C determines whether or not the second distance satisfying a first condition is present among the plurality of second distances. For example, the first condition refers to a condition in which a distance is shorter than the first distance. Here, in a case in which the second distance satisfying the first condition is present among the plurality of second distances, the first specifying unit 76C specifies a first specific region 92, which corresponds to the second distance satisfying the first condition among the plurality of second distances, from among the plurality of peripheral regions 44 by using the digital image data 84. In the example shown in FIG. 6, each of the peripheral regions 44A to 44D is shown as the first specific region 92 which corresponds to the second distance satisfying the first condition.

Figure 7:
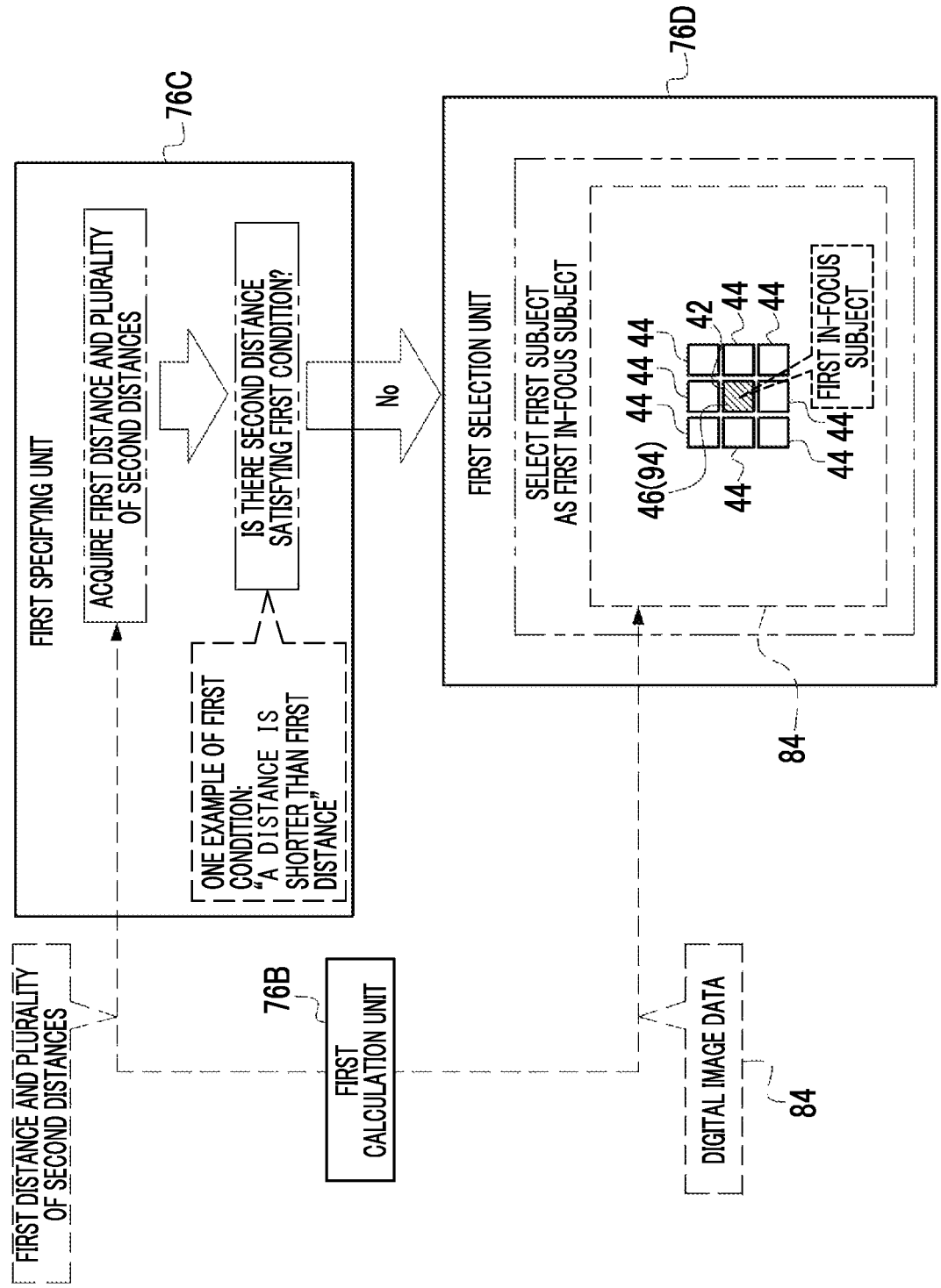
FIG. 7 is a conceptual diagram showing an example of processing contents of the first specifying unit and a first selection unit according to the first embodiment.

As shown in FIG. 7 as an example, the first selection unit 76D acquires the digital image data 84 from the first calculation unit 76B. In a case in which the first specifying unit 76C determines that the second distance satisfying the first condition is not present among the plurality of second distances (that is, in a case in which the plurality of second distances are equal to or larger than the first distance), the first selection unit 76D selects the first subject 46 included in the central region 42 as a first in-focus subject 94, which is the subject to be focused, by using the digital image data 84.

Figure 8:
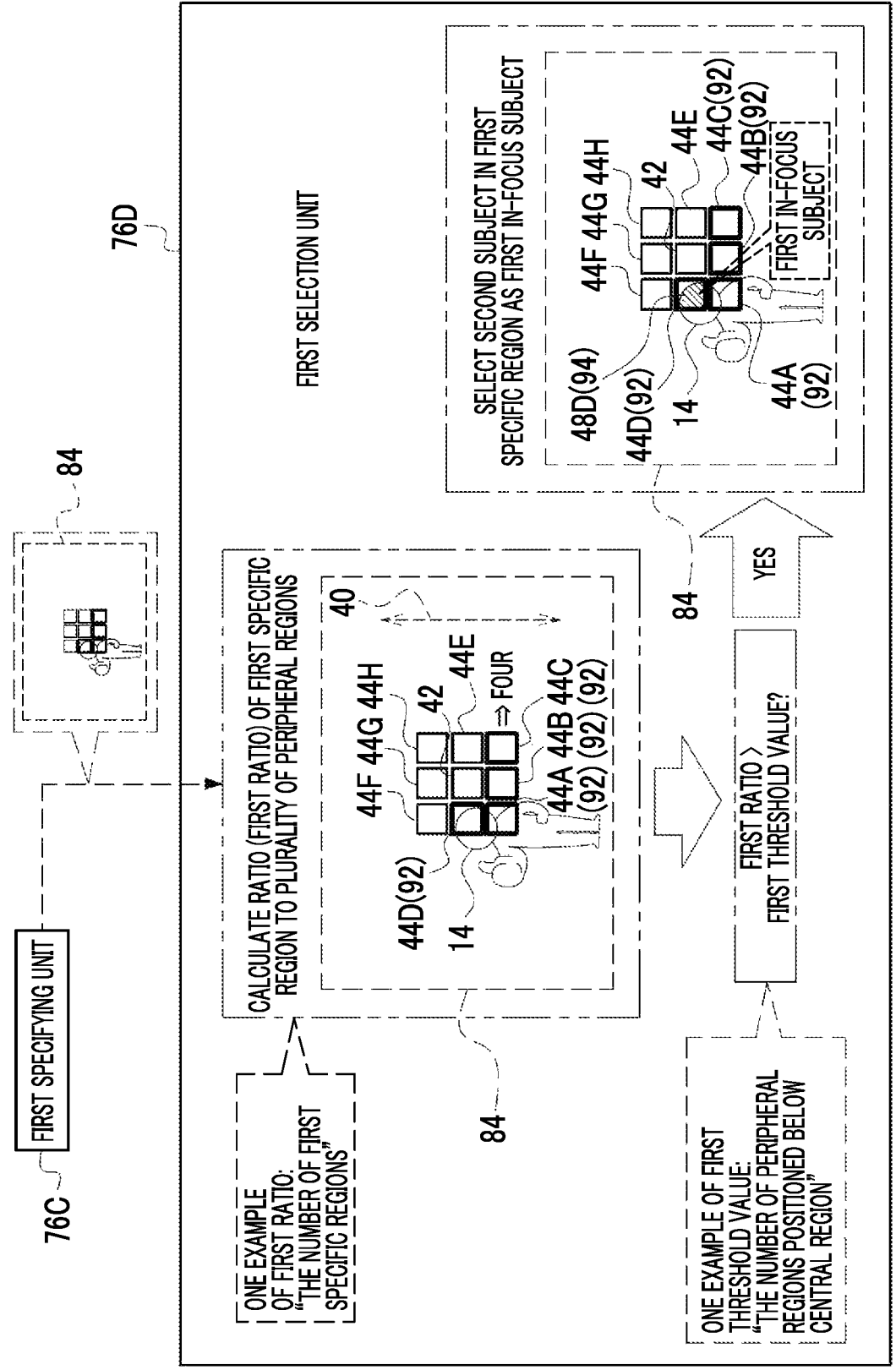
FIG. 8 is a conceptual diagram showing an example of processing contents of the first specifying unit and the first selection unit according to the first embodiment.

On the other hand, in a case in which the first specific region 92 which corresponds to the second distance satisfying the first condition is specified by the first specifying unit 76C, as shown in FIG. 8 as an example, the first selection unit 76D acquires the digital image data 84 from the first specifying unit 76C. In addition, the first selection unit 76D calculates a first ratio, which is a ratio of the first specific region 92 to the plurality of peripheral regions 44. For example, the first ratio is the number of the first specific regions 92. It should be noted that this is merely an example, and the ratio may be a ratio of a total area of the plurality of peripheral regions 44 (in the example shown in FIG. 8, the peripheral regions 44A to 44D), which are the first specific regions 92, to a total area of the plurality of peripheral regions 44, or need only be a value corresponding to the number of the first specific regions 92.

The first selection unit 76D selects the first in-focus subject 94 from among the first subject 46 and the second subjects 48A to 48H by using the digital image data 84 based on the first ratio. Specifically, first, the first selection unit 76D determines whether or not the first ratio exceeds a first threshold value. For example, the first threshold value refers to the number of the peripheral regions 44 positioned below the central region 42 in the up-down direction 40 (here, for example, three peripheral regions 44A to 44C). The first threshold value is an example of a "threshold value" according to the technology of the present disclosure.

In a case in which a determination is made that the first ratio exceeds the first threshold value, the first selection unit 76D selects the second subject 48 in the first specific region 92 as the first in-focus subject 94. That is, in a case in which the first ratio exceeds the first threshold value, a determination is made that there is a higher probability that the user takes an interest in the second subject 48 in the first specific region 92 than in a case in which the first ratio is equal to or less than the first threshold value, and the second subject 48 in the first specific region 92 is selected as the first in-focus subject 94.

In the example shown in FIG. 8, the second subject 48D included in the peripheral region 44D specified as the first specific region 92 is selected as the first in-focus subject 94. More specifically, the subject distance (that is, the second distance) of the person 14 that is the second subject 48D included in the peripheral region 44D is shorter than the subject distance (that is, the first distance) of the road 16 included in the central region 42. Moreover, the subject distance (that is, the second distance) of the road 16 included in the peripheral regions 44B and 44C is shorter than the subject distance (that is, the first distance) of the road included in the central region 42. In this case, the number of the peripheral regions 44 (that is, the first specific region 92) which corresponds to the second distance satisfying the first condition of being shorter than the first distance is four, and exceeds three, which is the first threshold value. Therefore, in the example shown in FIG. 8, the portion having the shortest subject distance among the plurality of second distances is selected as the first in-focus subject 94. In the example shown in FIG. 8, the portion of the head of the person 14 that overlaps the peripheral region 44D is selected as the first in-focus subject 94 (see an oblique line hatched portion shown in FIG. 8).

It should be noted that, here, although the form example is described in which the second subject 48D included in the peripheral region 44D specified as the first specific region 92 is selected as the first in-focus subject 94, this is merely an example. For example, a portion positioned at the median value, the average value, or the mode value of the subject distances with respect to the second subjects 48 included in the first specific region 92 may be selected as the first in-focus subject 94. Moreover, the first selection unit 76D may compare the median values of the subject distances between the plurality of peripheral regions 44 specified as the first specific regions 92 and select the second subject 48 in the specified peripheral regions 44 as the first in-focus subject 94 based on the comparison result. For example, in this case, among the peripheral regions 44A to 44D specified as the first specific region 92, the peripheral region 44 having the smallest median value of the subject distances is selected as the first in-focus subject 94. Here, the median value is described, but the average value or the mode value may be used instead of the median value.

Figure 9:
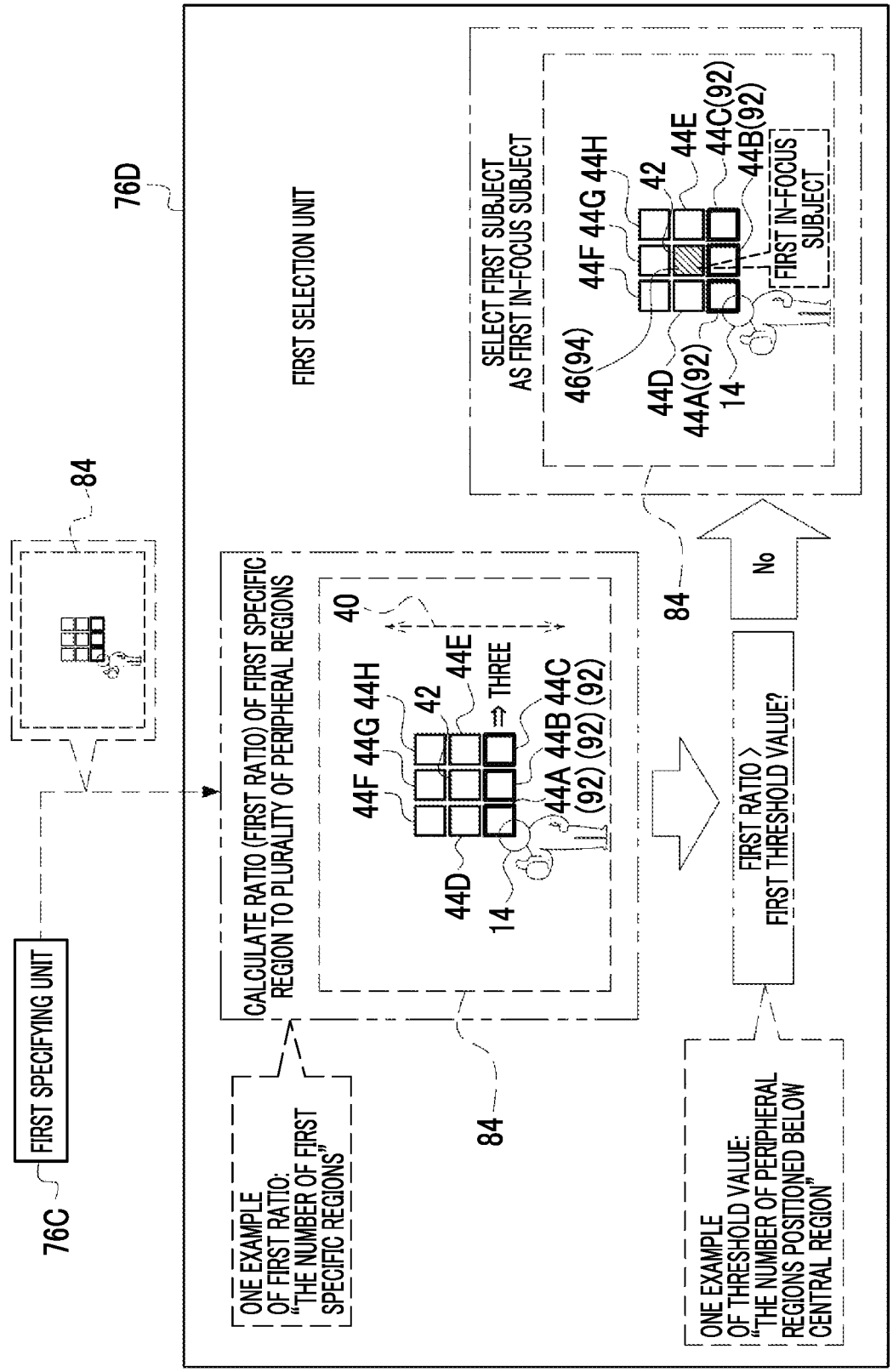
FIG. 9 is a conceptual diagram showing an example of processing contents of the first specifying unit and the first selection unit according to the first embodiment.

On the other hand, as shown in FIG. 9 as an example, in a case in which in a case in which a determination is made that the first ratio is equal to or less than the first threshold value (for example, the number of the first specific regions 92 is equal to or less than three), the first selection unit 76D selects the first subject 46 in the central region 42 as the first in-focus subject 94. That is, in a case in which the first ratio is equal to or less than the first threshold value, a determination is made that the number of the peripheral regions 44 having the probability that the user takes an interest is small and there is a higher probability that the user takes more interest in the central region 42 than the peripheral region 44 than in a case in which the first ratio exceeds the first threshold value, the first subject 46 in the central region 42 is selected as the first in-focus subject 94.

Figure 10:
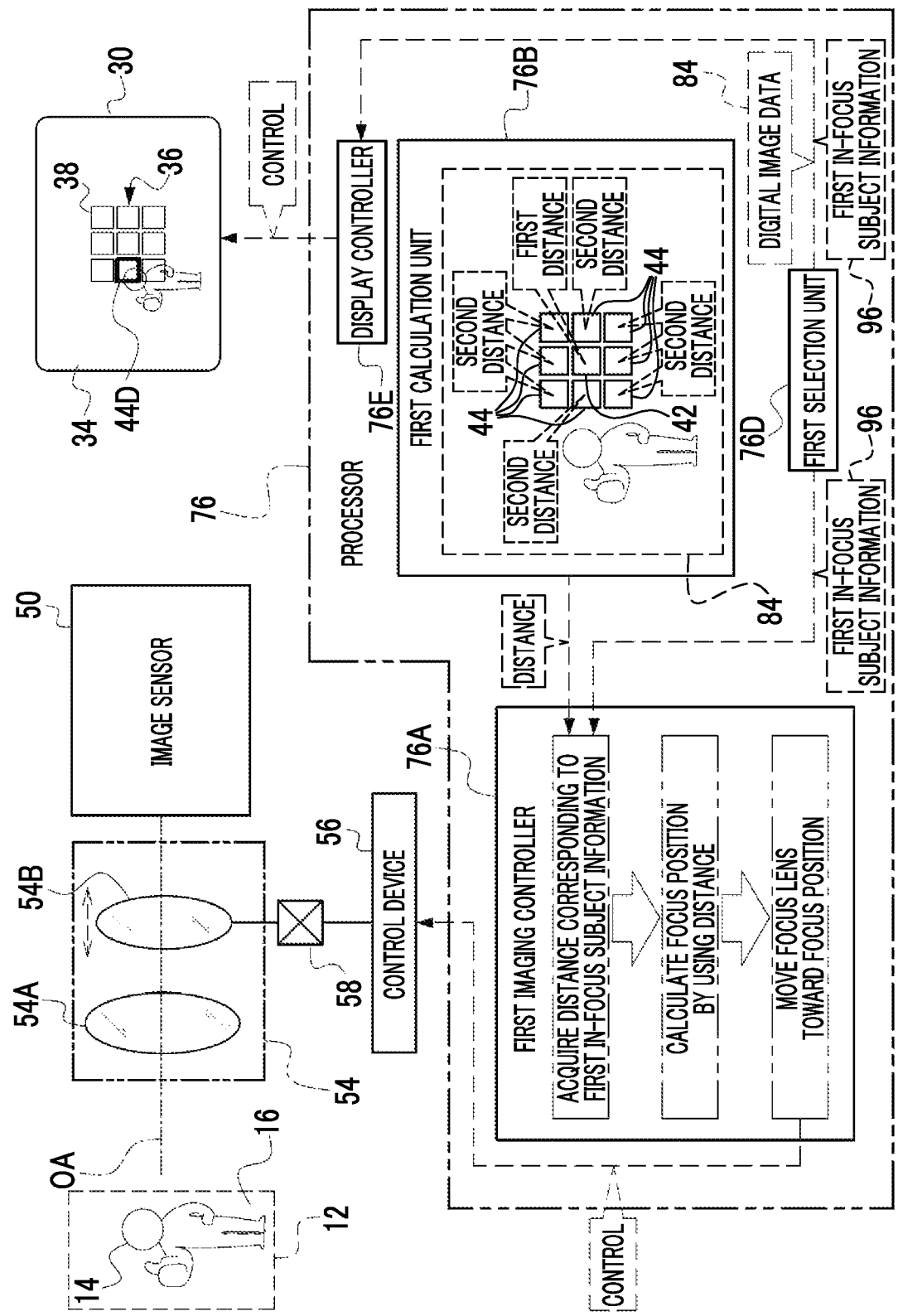
FIG. 10 is a conceptual diagram showing an example of processing contents of the first imaging controller, the first calculation unit, the display controller, and the first selection unit according to the first embodiment.

In this way, in a case in which the first in-focus subject 94 is selected, as shown in FIG. 10 as an example, the first selection unit 76D outputs first in-focus subject information 96, which is information on the first in-focus subject 94, to the first imaging controller 76A. The first in-focus subject information 96 includes position specification information for specifying the position of the first in-focus subject 94 selected by the first selection unit 76D. Here, the position of the first in-focus subject 94 refers to the position of the pixel corresponding to the first in-focus subject 94 in the image indicated by the digital image data 84 used for selecting the first in-focus subject 94.

The first imaging controller 76A acquires the subject distance corresponding to the first in-focus subject information 96, which is input from the first selection unit 76D, from the first calculation unit 76B. For example, the subject distance corresponding to the first in-focus subject information 96 refers to the first distance or the second distance corresponding to the position of the pixel specified from the position specification information included in the first in-focus subject information 96 among the first distance and the plurality of second distances calculated by the first calculation unit 76B.

It should be noted that, here, although the form example has been described in which the subject distance is acquired from the first calculation unit 76B by the first imaging controller 76A, this is merely an example. For example, the subject distance (first distance or second distance) corresponding to the first in-focus subject 94 in the image indicated by the digital image data 84 used for selecting the first in-focus subject 94 may be included in the first in-focus subject information 96. In this case, the first imaging controller 76A need only acquire the subject distance from the first in-focus subject information 96 input from the first selection unit 76D.

The first imaging controller 76A calculates the focus position by using the subject distance corresponding to the first in-focus subject information 96. In addition, the first imaging controller 76A controls the actuator 58 via the control device 56 to move the focus lens 54B to the focus position. As a result, the focusing on the first in-focus subject 94 is realized.

On the other hand, the first selection unit 76D outputs the digital image data 84 used for selecting the first in-focus subject 94 and the first in-focus subject information 96 to the display controller 76E. The display controller 76E displays the live view image 34 with the AF frame 36 on the display 30 based on the digital image data 84 and the first in-focus subject information 96. The region 38 including the first in-focus subject 94 selected by the first selection unit 76D is displayed on the AF frame 36 in an enhanced manner. The display in an enhanced manner refers to the display in which the region 38 including the first in-focus subject 94 selected by the first selection unit 76D and the remaining region 38 can be distinguished from each other. For example, the display in an enhanced manner is realized by making the thickness, the density, the color, the line type, or the like of the contour of the region 38 including the first in-focus subject 94 selected by the first selection unit 76D different from those of the remaining region 38. It should be noted that, in the example shown in FIG. 10, the peripheral region 44D is displayed in an enhanced manner.

Figure 11:
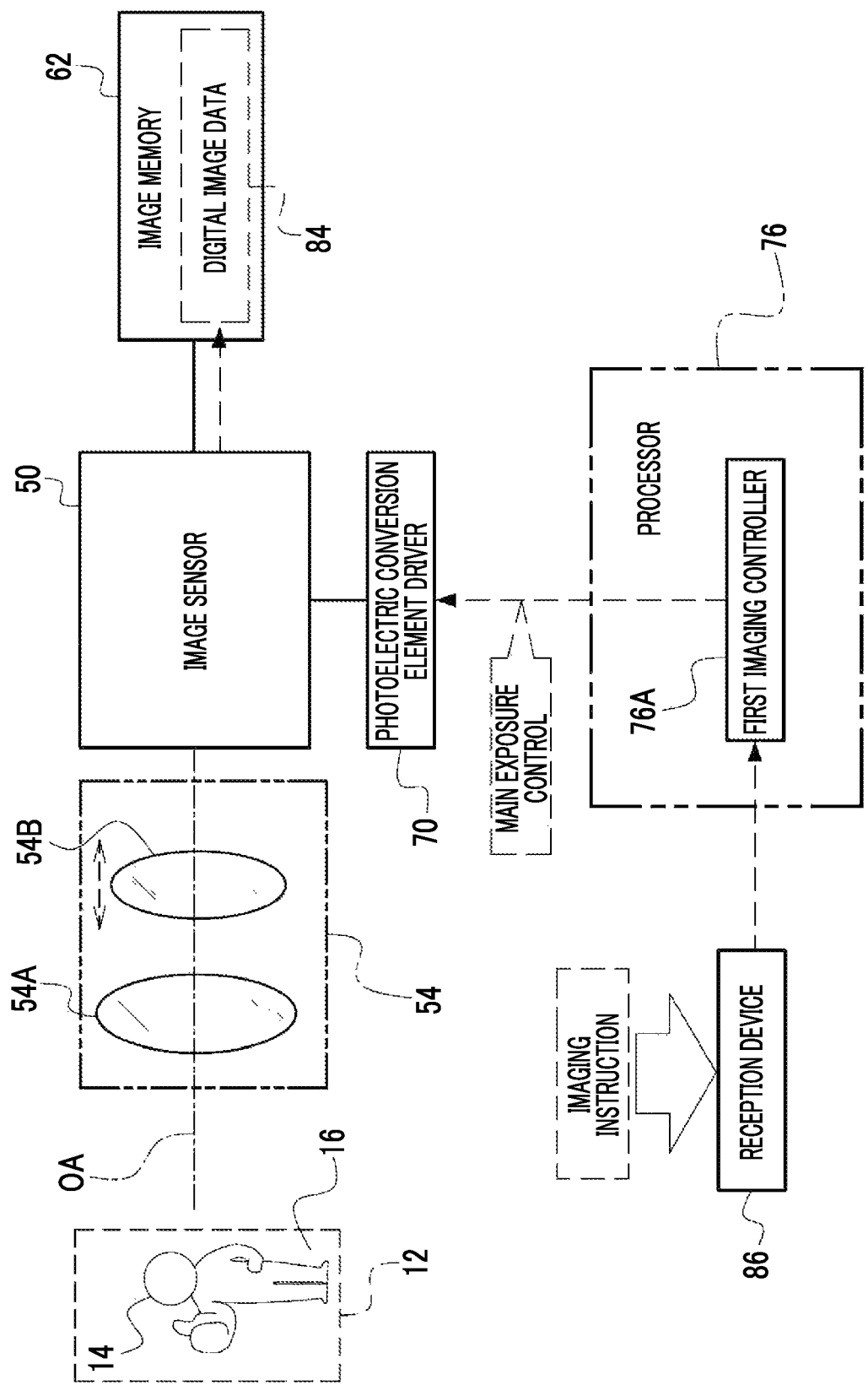
FIG. 11 is a conceptual diagram showing an example of processing contents of the first imaging controller according to the first embodiment.

In a case in which the focusing is performed on the first in-focus subject 94 and the imaging instruction is received by the reception device 86, as shown in FIG. 11 as an example, the first imaging controller 76A performs a main exposure control with respect to the photoelectric conversion element driver 70. The main exposure control refers to a control of causing the image sensor 50 to perform the imaging accompanied by the main exposure. For example, the imaging accompanied by the main exposure refers to processing of obtaining the digital image data 84 for all usable photosensitive pixels included in the imaging surface 52A. The imaging accompanied by the main exposure includes processing of exposing all usable photosensitive pixels included in the imaging surface 52A, outputting the analog image data to the signal processing circuit 74 from all the exposed photosensitive pixels, causing the signal processing circuit 74 to generate the digital image data 84.

Next, an example of a flow of the imaging processing performed by the processor 76 of the imaging apparatus 10 will be described with reference to the flowchart shown in FIG. 12.

Figure 12:
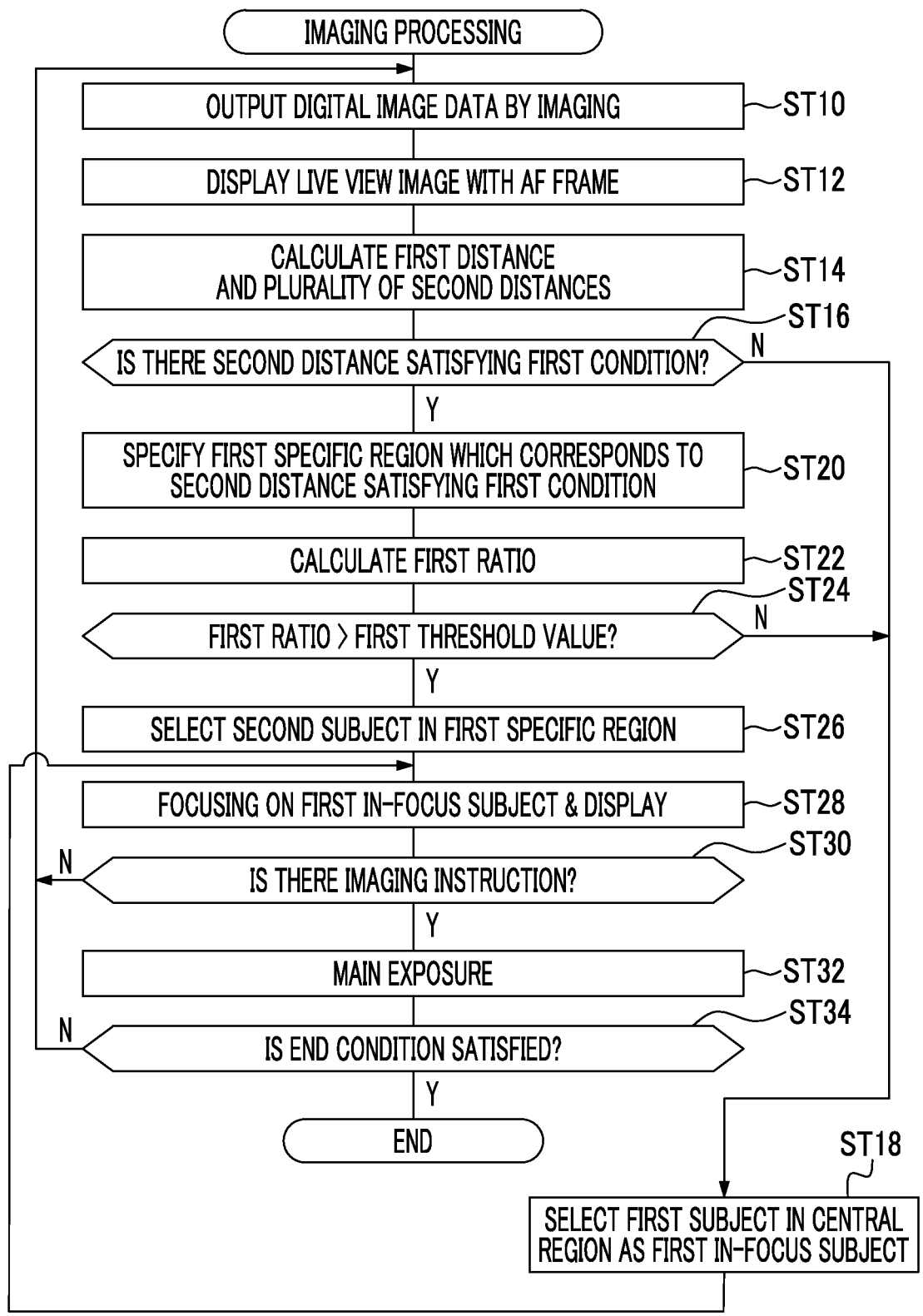
FIG. 12 is a flowchart showing an example of a flow of imaging processing according to the first embodiment.

In the imaging processing shown in FIG. 12, first, in step ST10, the first imaging controller 76A controls the photoelectric conversion element driver 70 to cause the image sensor 50 to perform the live view imaging and acquire the digital image data 84. As a result, the digital image data 84 is stored in the image memory 62 (see FIG. 5). After the processing of step ST10 is executed, the imaging processing shifts to step ST12.

In step ST12, the display controller 76E acquires the digital image data 84 from the image memory 62 and generates the live view image 34 based on the acquired digital image data 84. In addition, the display controller 76E displays the live view image 34 with the AF frame 36 on the display 30 (see FIG. 5). After the processing of step ST12 is executed, the imaging processing shifts to step ST14.

In step ST14, the first calculation unit 76B acquires the digital image data 84 from the image memory 62, and calculates the first distance related to the first subject 46 (see FIG. 2) and the plurality of second distances related to the plurality of second subjects 48 (see FIG. 2) based on the acquired digital image data 84. After the processing of step ST14 is executed, the imaging processing shifts to step ST16.

In step ST16, the first specifying unit 76C determines whether or not the second distance satisfying the first condition is present among the plurality of second distances by using the first distance and the plurality of second distances which are calculated in step ST14 (see FIG. 6). In step ST16, in a case in which the second distance satisfying the first condition is not present among the plurality of second distances, a negative determination is made, and the imaging processing shifts to step ST18. In step ST16, in a case in which the second distance satisfying the first condition is present among the plurality of second distances, a positive determination is made, and the imaging processing shifts to step ST20.

In step ST18, the first selection unit 76D selects the first subject 46 (see FIG. 2) in the central region 42 as the first in-focus subject 94 (see FIGS. 7 and 9). After the processing of step ST18 is executed, the imaging processing shifts to step ST28.

In step ST20, the first specifying unit 76C specifies the first specific region 92, which corresponds to the second distance satisfying the first condition, from among the plurality of peripheral regions 44 (see FIG. 6). After the processing of step ST20 is executed, the imaging processing shifts to step ST22.

In step ST22, the first selection unit 76D calculates the first ratio (see FIG. 8). That is, the first selection unit 76D acquires the digital image data 84 in which the first specific region 92 is specified from the first specifying unit 76C, and calculates the ratio of the first specific region 92 to the plurality of peripheral regions 44 as the first ratio based on the acquired digital image data 84. After the processing of step ST22 is executed, the imaging processing shifts to step ST24.

In step ST24, the first selection unit 76D determines whether or not the first ratio calculated in step ST22 exceeds the first threshold value (see FIGS. 8 and 9). In step ST24, in a case in which the first ratio is equal to or less than the first threshold value (see FIG. 9), a negative determination is made, and the imaging processing shifts to step ST18. In step ST24, in a case in which the first ratio exceeds the first threshold value (see FIG. 8), a positive determination is made, and the imaging processing shifts to step ST26.

In step ST26, the first selection unit 76D selects the second subject 48 in the first specific region 92 as the first in-focus subject 94 (see FIG. 8). After the processing of step ST26 is executed, the imaging processing shifts to step ST28.

In step ST28, the first imaging controller 76A performs the focusing on the first in-focus subject 94 selected in step ST18 or ST26 (see FIG. 10). Moreover, the display controller 76E displays the live view image 34 with the AF frame 36 on the display 30 and displays the region 38 corresponding to the first in-focus subject 94 in an enhanced manner (see FIG. 10). After the processing of step ST28 is executed, the imaging processing shifts to step ST30.

In step ST30, the first imaging controller 76A determines whether or not the imaging instruction is received by the reception device 86. In step ST30, in a case in which the imaging instruction is not received by the reception device 86, a negative determination is made, and the imaging processing shifts to step ST10. In step ST30, in a case in which the imaging instruction is received by the reception device 86, a positive determination is made, and the imaging processing shifts to step ST32.

In step ST32, the first imaging controller 76A performs the main exposure control with respect to the photoelectric conversion element driver 70 to cause the image sensor 50 to perform the imaging accompanied by the main exposure. As a result, the image memory 62 stores the digital image data 84 obtained by performing the imaging accompanied by the main exposure. After the processing of step ST32 is executed, the imaging processing shifts to step ST34.

In step ST34, the first imaging controller 76A determines whether or not a condition for ending the imaging processing (hereinafter, referred to as "imaging processing end condition") is satisfied. A first example of the imaging processing end condition is a condition in which an instruction to end the imaging processing is received by the reception device 86. A second example of the imaging processing end condition is a condition in which a certain time (for example, several tens of seconds) has elapsed without receiving the imaging instruction by the reception device 86. In a case in which the imaging processing end condition is not satisfied in step ST34, a negative determination is made, and the imaging processing shifts to step ST10. In a case in which the imaging processing end condition is satisfied in step ST34, a positive determination is made, and the imaging processing ends.

As described above, in the imaging apparatus 10, the first subject 46 and the second subjects 48A to 48H included in the plurality of regions 38 are imaged. Moreover, the first distance, which is the subject distance related to the first subject 46, and the plurality of second distances, which are the plurality of subject distances related to the second subjects 48A to 48H, are calculated (see FIG. 5). Moreover, the first specific region 92 which corresponds to the second distance satisfying the first condition among the plurality of second distances is specified from among the plurality of peripheral regions 44 (see FIG. 6). In addition, the ratio of the first specific region 92 to the plurality of peripheral regions 44 is calculated as the first ratio (see FIGS. 8 and 9).

Here, for example, in a case in which the first ratio is large (for example, in a case in which the first ratio exceeds the first threshold value), a determination is made that there is a high probability that the user takes more interest in the second subject 48 in the first specific region 92 than the first subject 46 in the central region 42. On the other hand, in a case in which the first ratio is small (for example, in a case in which the first ratio is equal to or less than the first threshold value), a determination is made that there is a high probability that the second subject 48 that the user takes an interest is not present among the plurality of peripheral regions 44. Therefore, in a case in which the first ratio is large, the focusing intended by the user is more easily realized by performing the focusing on the second subject 48 in the first specific region 92 than by performing the focusing on the first subject 46. On the other hand, in a case in which the first ratio is small, the focusing intended by the user is more easily realized by performing the focusing on the first subject 46 than by performing the focusing on the second subject 48 in the first specific region 92. Therefore, in the imaging apparatus 10, the first in-focus subject 94, which is the subject to be focused, is selected from among the first subject 46 and the second subject 48 in the first specific region 92 based on the first ratio (see FIGS. 7 to 9).

As a result, it is possible to facilitate the focusing on the subject that the user takes interest. For example, in a case in which there is a high probability that the user takes more interest in the first subject 46 than the second subject 48, the focusing on the first subject 46 can be performed. On the other hand, in a case in which there is a high probability that the user takes more interest in the second subject 48 than the first subject 46, the focusing on the second subject 48 (that is, the second subject 48 in the first specific region 92) that the user takes an interest can be performed. In other words, this means that it is difficult to perform the focusing on a subject that the user does not take interest.

Moreover, in the imaging apparatus 10, the first specific region 92 corresponding to the second distance which is shorter than the first distance among the plurality of second distances is specified from among the plurality of peripheral regions 44 (see FIG. 6). As a result, the focusing is performed on the second subject 48 in the peripheral region 44 in which the subject distance is shorter than the subject distance related to the first subject 46 in the central region 42. Therefore, in a case in which the subject that the user takes an interest is present on the front side (side closer to the user) of the first subject 46 in the central region 42, it is possible to facilitate the focusing on the subject that the user takes an interest.

Moreover, in the imaging apparatus 10, in a case in which the number of the first specific regions 92 (see FIGS. 7, 8, and 9) is equal to or less than the first threshold value (that is, 3) corresponding to the number of the peripheral regions 44A to 44C positioned below the central region 42 in the up-down direction 40, a determination is made that there is a high probability that the second subject 48 that the user takes an interest is not present in the first specific region 92. On the other hand, in a case in which the number of the first specific regions 92 exceeds the first threshold value, a determination is made that there is a high probability that the second subject 48 that the user takes an interest is present in the first specific regions 92. Therefore, in the imaging apparatus 10, in a case in which the number of the first specific regions 92 exceeds the first threshold value, the second subject 48 in the first specific region 92 is selected as the first in-focus subject 94. Therefore, in a case in which the user takes an interest in the second subject 48 in the first specific region 92, it is possible to facilitate the focusing on the second subject 48 that the user takes an interest.

Moreover, in the imaging apparatus 10, in a case in which the plurality of second distances corresponding to the peripheral regions 44A to 44H are longer than the first distance corresponding to the central region 42, a determination is made that there is a high probability that the user takes more interest in the first subject 46 in the central region 42 than the second subjects 48A to 48H in the peripheral regions 44A to 44H. Therefore, in the imaging apparatus 10, in a case in which the plurality of second distances corresponding to the peripheral regions 44A to 44H are longer than the first distance corresponding to the central region 42, the first subject 46 in the central region 42 is selected as the first in-focus subject 94. Therefore, in a case in which the user takes an interest in the first subject 46 in the central region 42, it is possible to facilitate the focusing on the first subject 46 that the user takes an interest.

Figure 13:
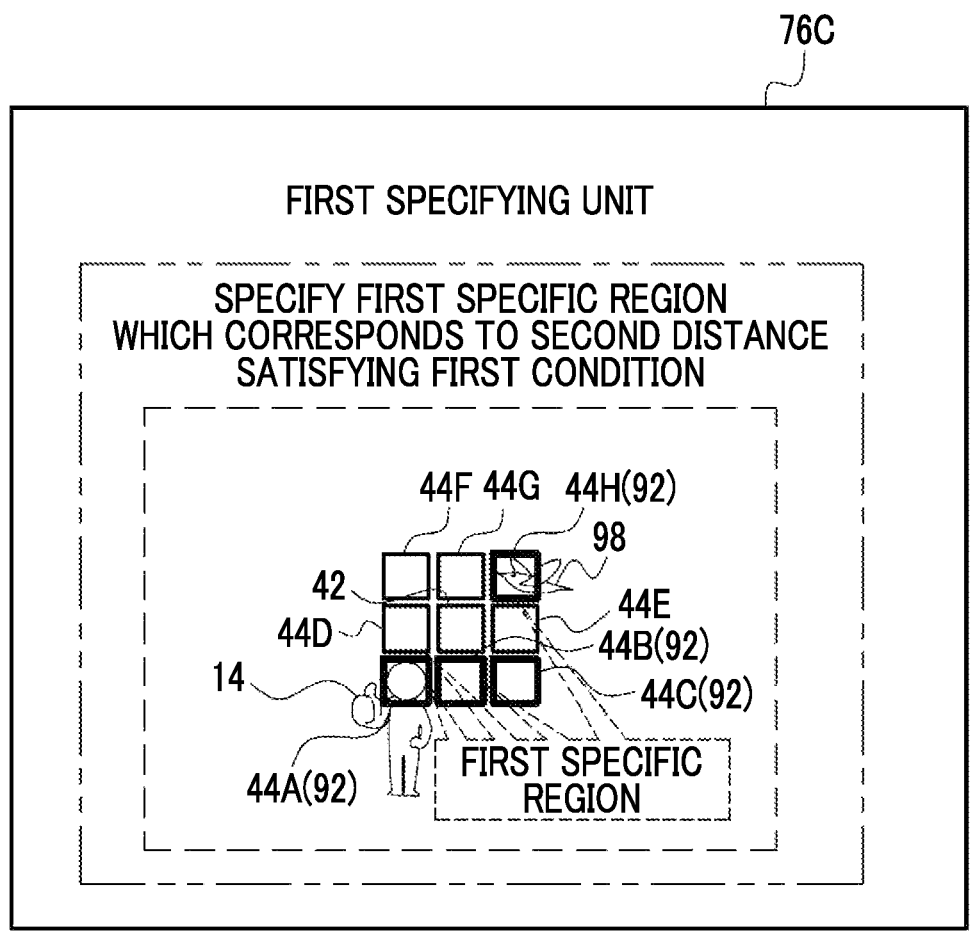
FIG. 13 is a conceptual diagram showing a modification example of processing contents of the first specifying unit according to the first embodiment.

It should be noted that, in the first embodiment described above, the form example has been described in which each of the four adjacent peripheral regions 44A to 44D is specified as the first specific region 92 (see FIG. 6), but this is merely an example, and the technology of the present disclosure is not limited to this. For example, the peripheral regions 44 which are not adjacent to each other may be specified as the first specific region 92. In the example shown in FIG. 13, each of the peripheral regions 44A to 44C and 44H is specified as the first specific region 92 by the first specifying unit 76C. The peripheral region 44H specified as the first specific region 92 includes a bird 98 as a part of the second subject 48H.

In this way, even in a case in which the peripheral region 44H specified as the first specific region 92 is not adjacent to other peripheral regions 44 (in the example shown in FIG. 13, the peripheral regions 44A to 44C) specified as the first specific region 92, a determination is made that the number of the first specific regions 92 is "4". In addition, "4" of the number of the first specific regions 92 is used as the first ratio and is compared with the first threshold value. In addition, in a case in which the same conditions as those of the embodiment described above are satisfied, the portion having the shortest subject distance related to the second subject 48 in the first specific region 92 is selected as the first in-focus subject 94.

Second Embodiment

In the first embodiment described above, the form example has been described in which the imaging processing is performed by the processor 76 in accordance with the imaging processing program 90 (see FIG. 4). However, in the second embodiment, a case will be described in which the imaging processing is performed by the processor 76 in accordance with an imaging processing program 100 (see FIG. 14). It should be noted that, in the second embodiment described above, the same components as those in the first embodiment will be designated by the same reference numeral, the description of the components will be omitted, and the difference from the first embodiment will be mainly described.

Figure 14:
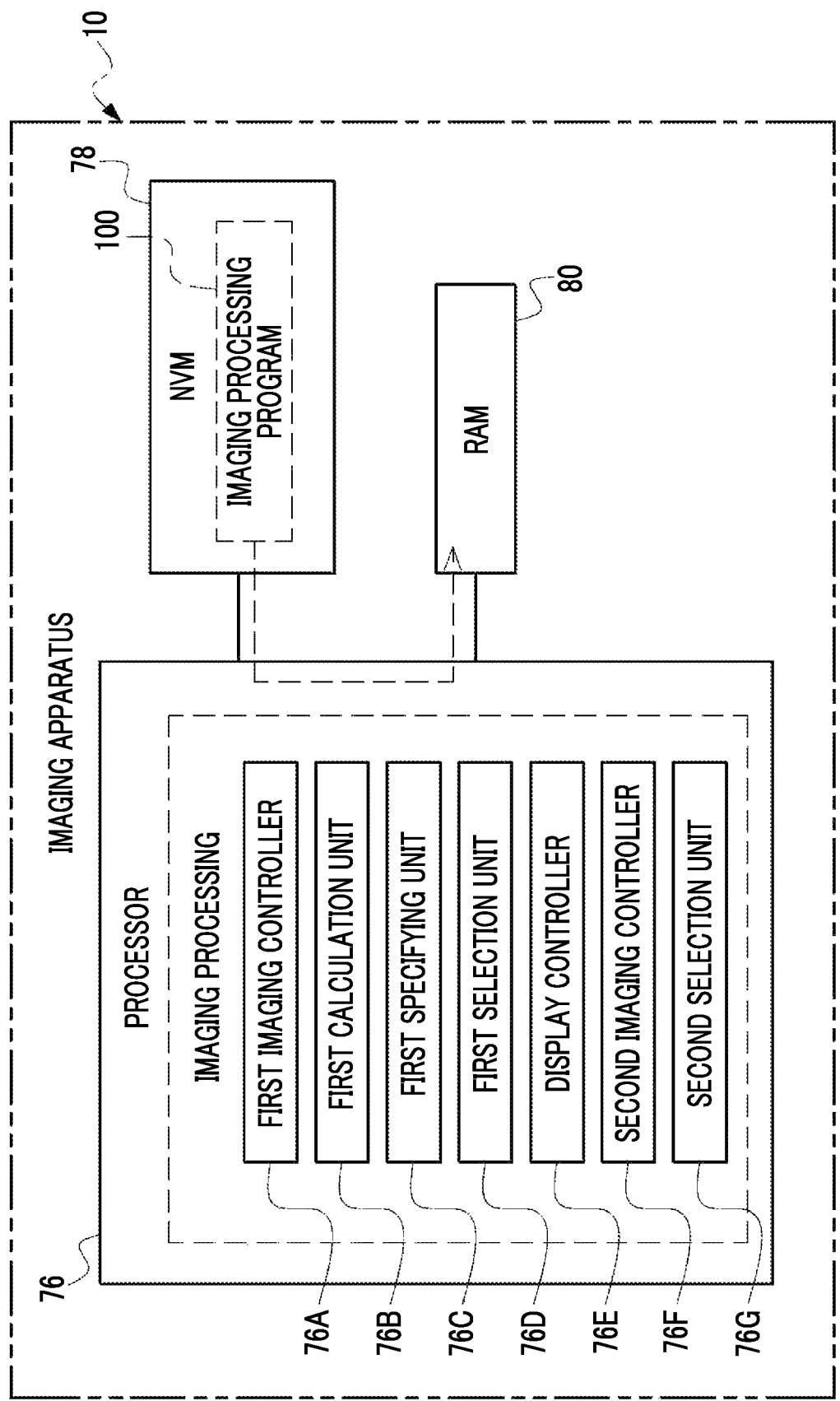
FIG. 14 is a block diagram showing an example of a function of a processor according to a second embodiment.

As shown in FIG. 14 as an example, the imaging processing program 100 is stored in the NVM 78. The processor 76 reads out the imaging processing program 100 from the NVM 78, and executes the read out imaging processing program 100 on the RAM 80. The processor 76 is operated as the first imaging controller 76A, the first calculation unit 76B, the first specifying unit 76C, the first selection unit 76D, the display controller 76E, a second imaging controller 76F, and a second selection unit 76G in accordance with the imaging processing program 100 executed on the RAM 80 to perform the imaging processing according to the second embodiment.

It should be noted that processing performed by the second imaging controller 76F is an example of a "second imaging step" according to the technology of the present disclosure. Moreover, processing performed by second selection unit 76G is an example of a "second selection step" according to the technology of the present disclosure.

Figure 15:
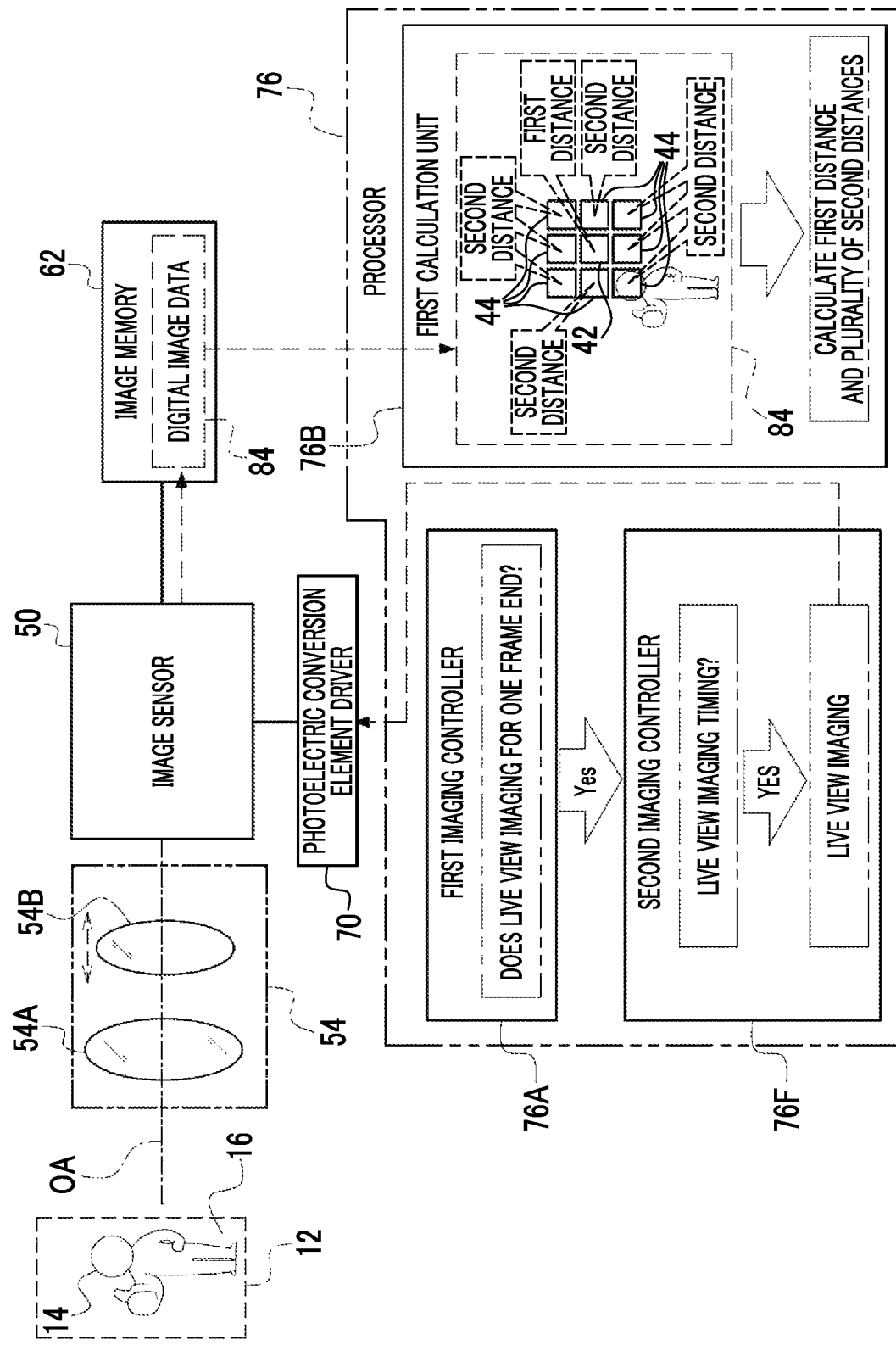
FIG. 15 is a block diagram showing an example of a first imaging controller, a second imaging controller, and a first calculation unit according to the second embodiment.

As shown in FIG. 15 as an example, in a case in which the live view imaging for one frame ends under the control of the first imaging controller 76A, the second imaging controller 76F determines whether or not a timing (hereinafter, also referred to as a "live view imaging timing") at which the live view imaging of the next frame is performed has arrived. In a case in which the second imaging controller 76F determines that the live view imaging timing has arrived, the second imaging controller 76F causes the image sensor 50 to perform the live view imaging. As a result, as in the first embodiment described above, the first subject 46 and the second subjects 48A to 48H (see FIG. 2) are imaged, and the image memory 62 stores the digital image data 84 indicating the live view image for one frame. In addition, in the same manner as in the first embodiment described above, the first calculation unit 76B calculates the first distance and the plurality of second distances based on the digital image data 84.

Figure 16:
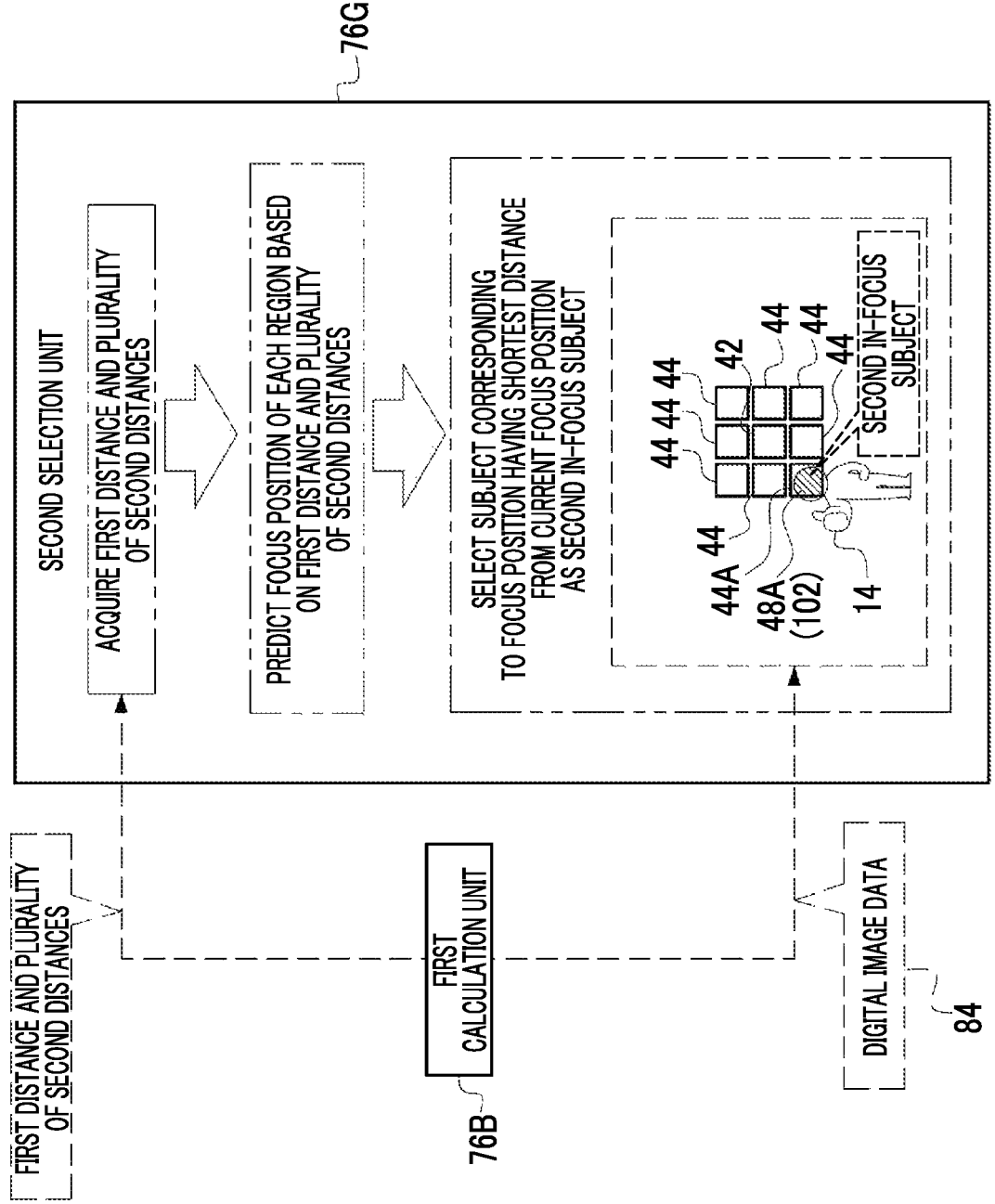
FIG. 16 is a conceptual diagram showing an example of processing contents of the first calculation unit and a second selection unit according to a second embodiment.

In this way, in a case in which the first calculation unit 76B calculates the first distance and the plurality of second distances, as shown in FIG. 16 as an example, the second selection unit 76G acquires the first distance and a plurality of second distances from the first calculation unit 76B. Based on the first distance and the plurality of second distances acquired from the first calculation unit 76B, the second selection unit 76G predicts each region 38, that is, the focus positions of the first subject 46 included in the central region 42 and the second subjects 48A to 48H included in the peripheral regions 44A to 44H.

In addition, the second selection unit 76G selects the subject corresponding to the focus position at which the distance between the focus positions is the shortest distance from the current focus position among the plurality of predicted focus positions (that is, a plurality of focus positions with respect to the first subject 46 and the second subjects 48A to 48H) as a second in-focus subject 102. In the example shown in FIG. 16, a portion corresponding to the focus position based on the second distance which is the shortest subject distance among the plurality of subject distances which are results of the distance measurement performed with respect to the plurality of portions of the second subject 48A (in the example shown in FIG. 16, a portion of the person 14 which overlaps the peripheral region 44A) is selected as the second in-focus subject 102.

Figure 17:
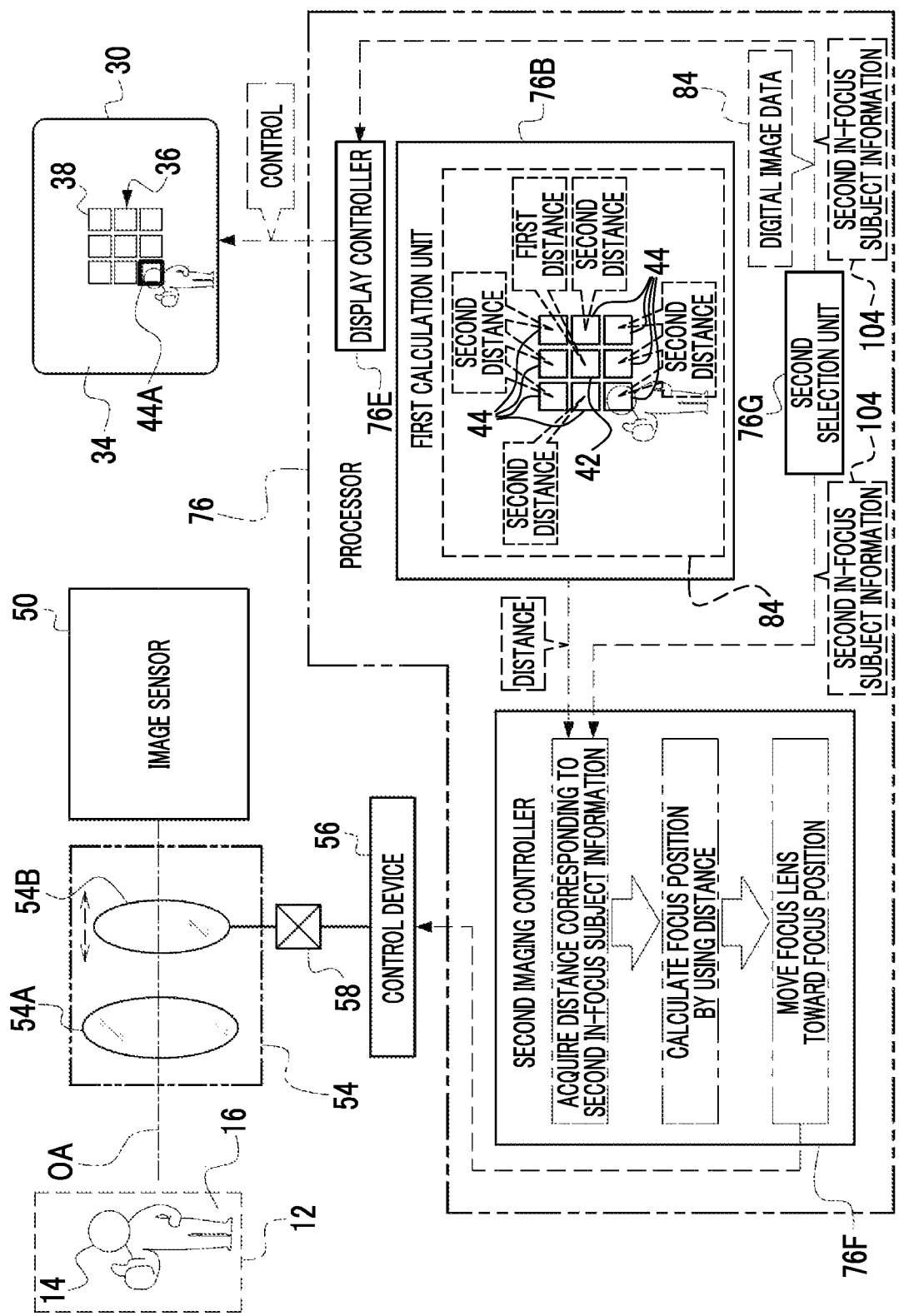
FIG. 17 is a conceptual diagram showing an example of processing contents of the second imaging controller, the first calculation unit, a display controller, and the second selection unit according to a second embodiment.

In this way, in a case in which the second in-focus subject 102 is selected, as shown in FIG. 17 as an example, the second selection unit 76G outputs second in-focus subject information 104, which is information on the second in-focus subject 102, to the second imaging controller 76F. The second in-focus subject information 104 includes position specification information for specifying the position of the second in-focus subject 102 selected by the second selection unit 76G. Here, the position of the second in-focus subject 102 refers to the position of the pixel corresponding to the second in-focus subject 102 in the image indicated by the digital image data 84 used for selecting the second in-focus subject 102.

The second imaging controller 76F acquires the subject distance corresponding to the second in-focus subject information 104, which is input from the second selection unit 76G, from the first calculation unit 76B. For example, the subject distance corresponding to the second in-focus subject information 104 refers to the first distance or the second distance corresponding to the position of the pixel specified from the position specification information included in the second in-focus subject information 104 among the first distance and the plurality of second distances calculated by the first calculation unit 76B.

It should be noted that, here, although the form example has been described in which the subject distance is acquired from the first calculation unit 76B by the second imaging controller 76F, this is merely an example. For example, the subject distance (first distance or second distance) corresponding to the second in-focus subject 102 in the image indicated by the digital image data 84 used for selecting the second in-focus subject 102 may be included in the second in-focus subject information 104. In this case, the second imaging controller 76F need only acquire the subject distance from the second in-focus subject information 104 input from the second selection unit 76G.

The second imaging controller 76F calculates the focus position by using the subject distance corresponding to the second in-focus subject information 104. In addition, the second imaging controller 76F controls the actuator 58 via the control device 56 to move the focus lens 54B to the focus position. As a result, the focusing on the second in-focus subject 102 is realized.

On the other hand, the second selection unit 76G outputs the digital image data 84 used for selecting the second in-focus subject 102 and the second in-focus subject information 104 to the display controller 76E. The display controller 76E displays the live view image 34 with the AF frame 36 on the display 30 based on the digital image data 84 and the second in-focus subject information 104. In the same manner as in the first embodiment described above, the region 38 including the second in-focus subject 102 selected by the second selection unit 76G is displayed in the AF frame 36 in an enhanced manner. In the example shown in FIG. 17, the peripheral region 44A is displayed in an enhanced manner.

Next, an example of a flow of the imaging processing according to the second embodiment performed by the processor 76 of the imaging apparatus 10 will be described with reference to the flowcharts shown in FIGS. 18A and 18B.

It should be noted that, here, a step of performing the same processing as the processing shown in the flowchart shown in FIG. 12 is designated by the same step number as the flowchart shown in FIG. 12, and the description thereof will be omitted. In the imaging processing shown in FIGS. 18A and 18B is different from the imaging processing shown in FIG. 12 in that the processing of step ST30A is applied instead of the processing of step ST30 and processing of step ST36 to step ST50 is added.

Figure 18A:
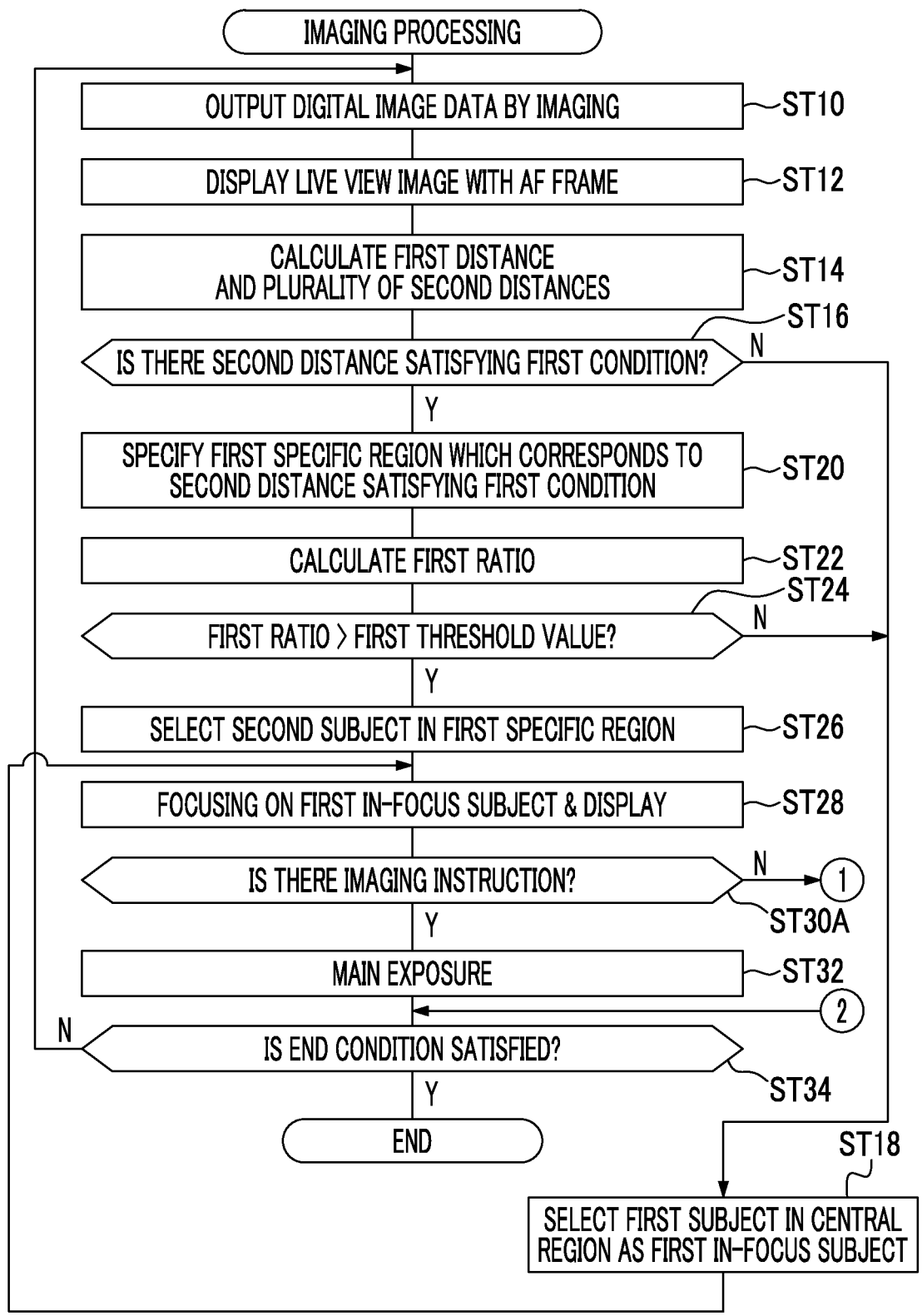
FIG. 18A is a flowchart showing an example of a flow of imaging processing according to the second embodiment.

In step ST30A shown in FIG. 18A, the first imaging controller 76A determines whether or not the imaging instruction is received by the reception device 86. In step ST30A, in a case in which the imaging instruction is received by the reception device 86, a positive determination is made, and the imaging processing shifts to step ST32. In step ST30A, in a case in which the imaging instruction is not received by the reception device 86, a negative determination is made, and the imaging processing shifts to step ST36 shown in FIG. 18B.

Figure 18B:
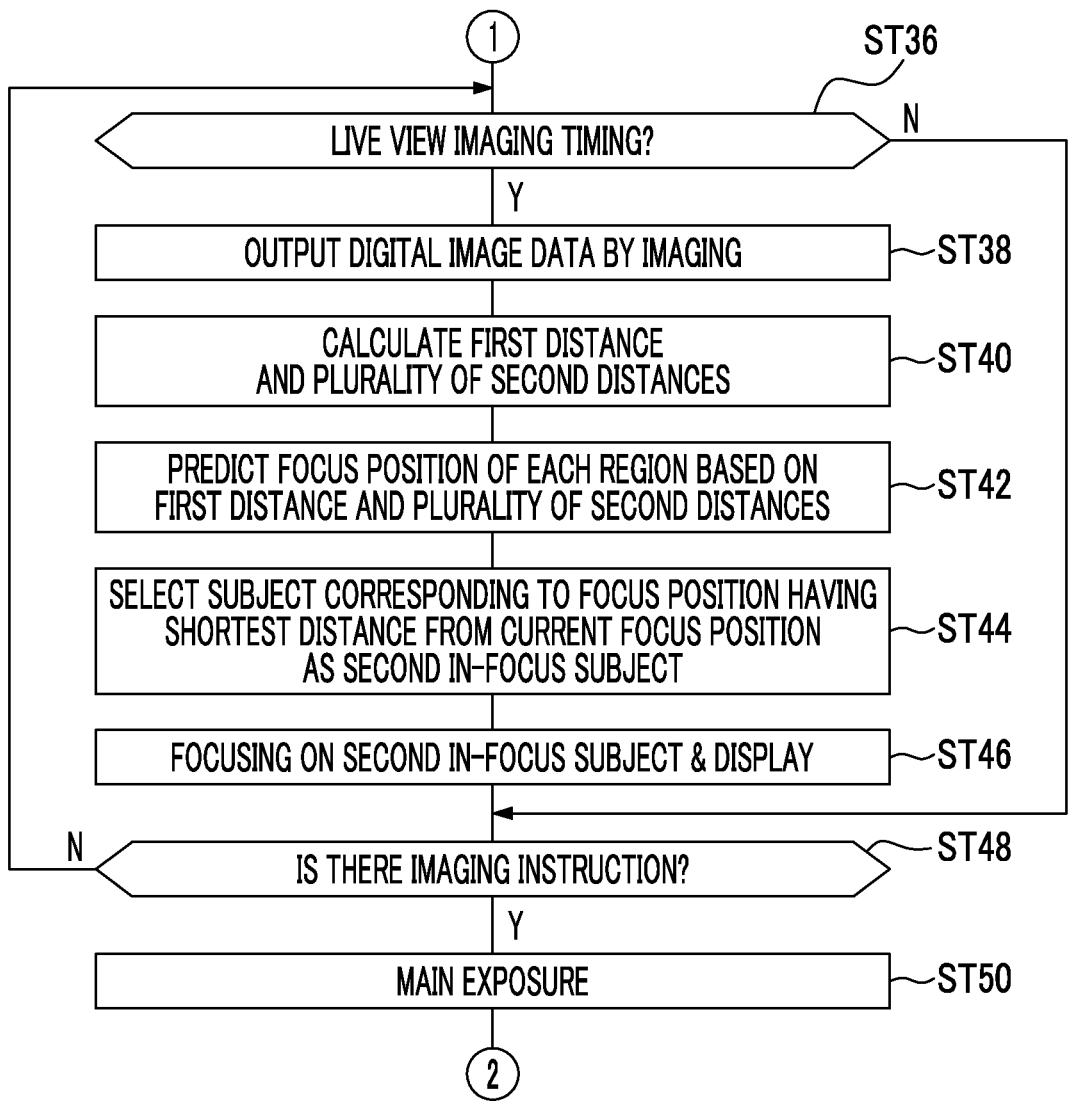
FIG. 18B is the continuation of the flowchart shown in FIG. 18A.

In step ST36 shown in FIG. 18B, the second imaging controller 76F determines whether or not the live view imaging timing has arrived. In step ST36, in a case in which the live view imaging timing has not arrived, a negative determination is made, and the imaging processing shifts to step ST48. In step ST36, in a case in which the live view imaging timing has arrived, a positive determination is made, and the imaging processing shifts to step ST38.

In step ST38, the second imaging controller 76F controls the photoelectric conversion element driver 70 to cause the image sensor 50 to perform the live view imaging and acquire the digital image data 84. As a result, the digital image data 84 is stored in the image memory 62 (see FIG. 15). After the processing of step ST38 is executed, the imaging processing shifts to step ST40.

In step ST40, the first calculation unit 76B acquires the digital image data 84 from the image memory 62, and calculates the first distance related to the first subject 46 (see FIG. 2) and the plurality of second distances related to the plurality of second subjects 48 (see FIG. 2) based on the acquired digital image data 84. After the processing of step ST40 is executed, the imaging processing shifts to step ST42.

In step ST42, the second selection unit 76G predicts each region 38 (see FIGS. 1 and 2), that is, the focus positions of the first subject 46 included in the central region 42 and the second subjects 48A to 48H included in the peripheral regions 44A to 44H based on the first distance and the plurality of second distances calculated in step ST40. After the processing of step ST42 is executed, the imaging processing shifts to step ST44.

In step ST44, the second selection unit 76G selects the subject corresponding to the focus position at which the distance between the focus positions is the shortest distance from the current focus position among the plurality of focus positions predicted in step ST42 (that is, the plurality of focus positions with respect to the first subject 46 and the second subjects 48A to 48H) as the second in-focus subject 102. After the processing of step ST44 is executed, the imaging processing shifts to step ST46.

In step ST46, the second imaging controller 76F performs the focusing on the second in-focus subject 102 selected in step ST44 (see FIG. 17). Moreover, the display controller 76E displays the live view image 34 with the AF frame 36 on the display 30 and displays the region 38 corresponding to the second in-focus subject 102 in an enhanced manner (see FIG. 17). After the processing of step ST46 is executed, the imaging processing shifts to step ST48.

In step ST48, the second imaging controller 76F determines whether or not the imaging instruction is received by the reception device 86. In step ST48, in a case in which the imaging instruction is received by the reception device 86, a positive determination is made, and the imaging processing shifts to step ST36. In step ST48, in a case in which the imaging instruction is not received by the reception device 86, a negative determination is made, and the imaging processing shifts to step ST50.

In step ST50, the second imaging controller 76F performs the main exposure control with respect to the photoelectric conversion element driver 70 to cause the image sensor 50 to perform the imaging accompanied by the main exposure. As a result, the image memory 62 stores the digital image data 84 obtained by performing the imaging accompanied by the main exposure. After the processing of step ST50 is executed, the imaging processing shifts to step ST34 shown in FIG. 18A.

As described above, in the imaging apparatus 10 according to the second embodiment, after the live view imaging for one frame is performed in step ST10 (see FIG. 18A) included in the imaging processing, the live view imaging for next one frame is performed in step ST38 (see FIG. 18B). The fact that the live view imaging for the next one frame is performed in step ST38 after the live view imaging for one frame is performed means that the live view imaging for the next one frame is performed in a state in which the focusing on the first in-focus subject 94 is performed (see step ST28 of FIG. 18A). There is a high probability that the subject that is in focus at the present time is a subject that the user takes interest. For the subject that is in focus at the present time, there is a high probability that the next frame has a distance between the focus positions close to that of the previous frame.

In the imaging apparatus 10 according to the second embodiment, the subject of which the distance between the focus positions is close to that of the first in-focus subject 94 from among the first subject 46 and the second subjects 48A to 48H imaged in step ST38 is selected as the second in-focus subject 102 to be focused. Specifically, among the first subject 46 and the second subjects 48A to 48H imaged in step ST38, the subject of which the distance between the focus positions is closest to that of the first in-focus subject 94 is selected as the second in-focus subject 102. In addition, the focusing is performed on the selected second in-focus subject 102 (see step ST46 in FIG. 18B). As a result, the focusing on the subject that the user takes an interest can be continued across the frames.

It should be noted that, in the second embodiment described above, the focusing is taken over from the first in-focus subject 94 to the second in-focus subject 102 at an interval of one frame, this is merely an example, and the focusing may be taken over from the first in-focus subject 94 to the second in-focus subject 102 at intervals of several frames to several tens of frames. Moreover, although processing of step ST36 to step ST48 is performed at an interval of one frame, this may also be performed at intervals of several frames to several tens of frames.

Moreover, in the second embodiment described above, the form example has been described in which the subject of which the distance between the focus positions is close to that of the first in-focus subject 94 is selected as the second in-focus subject 102 from among the first subject 46 and the second subjects 48A to 48H imaged in step ST38, but this is merely an example. For example, a subject (for example, a subject having the shortest distance) of which the distance on a two-dimensional plane in a case in which front and rear frames overlap is close to the first in-focus subject 94 may be selected as the second in-focus subject 102 from among the first subject 46 and the second subjects 48A to 48H imaged in step ST38. Moreover, for example, a subject (for example, a subject having the shortest distance) of which the subject distance is close to the first in-focus subject 94 may be selected as the second in-focus subject 102 from among the first subject 46 and the second subjects 48A to 48H imaged in step ST38.

Moreover, in the second embodiment described above, the form example has been described in which the subject corresponding to the focus position at which the distance between the focus positions is the shortest distance from the current focus position is selected as the second in-focus subject 102 from among the plurality of predicted focus positions, but the technology of the present disclosure is not limited to this. For example, a subject corresponding to the focus position at which the distance between the focus positions is the shortest distance from the current focus position in a range less than a predetermined distance (for example, several millimeters) may be selected as the second in-focus subject 102 from among the plurality of predicted focus positions.

Figure 19:
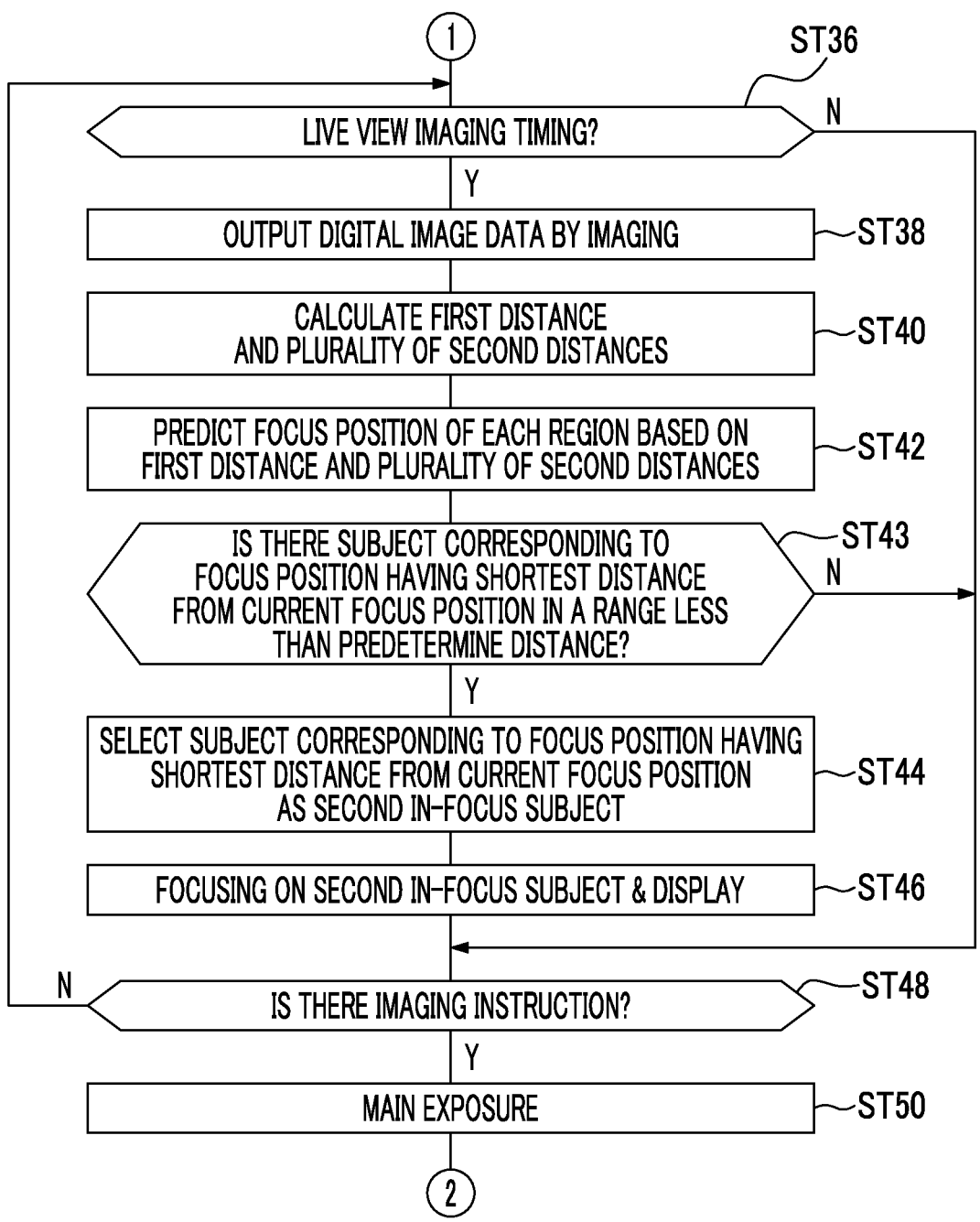
FIG. 19 is a modification example of the flowchart shown in FIG. 18B.

In this case, for example, as shown in FIG. 19, in the imaging processing, the processing of step ST43 need only be inserted between the processing of step ST42 and the processing of step ST44. In step ST43, the second selection unit 76G determines whether or not the subject corresponding to the focus position at which the distance between the focus positions is the shortest distance from the current focus position (for example, the focus position corresponding to the first in-focus subject 94 or the second in-focus subject 102 in the previous frame) in the range less than the predetermined distance is present among the plurality of focus positions predicted in step ST42. In step ST43, in a case in which the subject corresponding to the focus position at which the distance between the focus positions is the shortest distance from the current focus position in the range less than the predetermined distance is not present among the plurality of focus positions predicted in step ST42, a negative determination is made, and the imaging processing shifts to step ST48. In step ST43, in a case in which the subject corresponding to the focus position at which the distance between the focus positions is the shortest distance from the current focus position in the range less than the predetermined distance is present among the plurality of focus positions predicted in step ST42, a positive determination is made, and the imaging processing shifts to step ST44.

In this way, by performing the processing of step ST43 in the imaging processing, the subject corresponding to the focus position at which the distance between the focus positions is the shortest distance from the current focus position in a range exceeding the predetermined distance is not selected as the second in-focus subject 102 from among the plurality of focus positions predicted in step ST42. That is, the subject corresponding to the focus position that is significantly far from the current focus position is determined to be a subject having a probability that the user takes interest, and is not selected as the second in-focus subject 102. Therefore, it is possible to suppress that the focusing is performed on a subject that the user does not take interest.

Third Embodiment

In the first and second embodiments described above, the form example has been described in which the AF frame 36 consisting of the regions 38 of 3×3 is used, but in the third embodiment, a form example will be described in which an AF frame 41 (see FIG. 20) consisting of regions 39 of 5×5.

It should be noted that, in the third embodiment described above, the same components as those in the first and second embodiments will be designated by the same reference numeral, the description of the components will be omitted, and the difference from the first and second embodiments will be mainly described.

Figure 20:
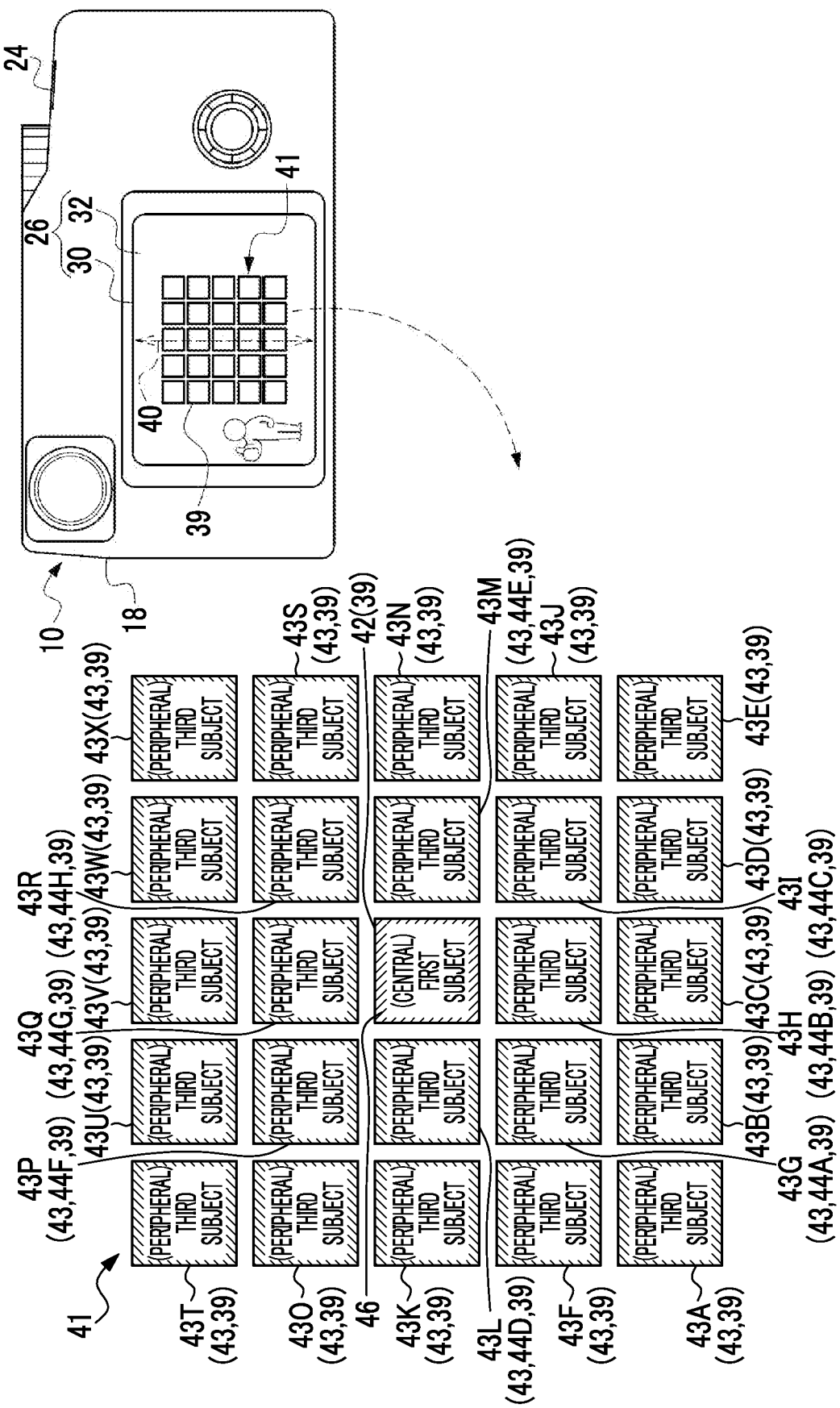
FIG. 20 is a conceptual diagram showing an example of an AF frame according to a third embodiment.

As shown in FIG. 20 as an example, the imaging apparatus 10 according to the third embodiment includes the AF frame 41 instead of the AF frame 36 described in the embodiments described above. The AF frame 41 is a rectangular frame that is one size larger than the AF frame 36. The AF frame 41 includes a plurality of regions 39. The plurality of regions 39 is an example of a "plurality of third regions" according to the technology of the present disclosure.

The plurality of regions 39 are disposed in a matrix of 5×5. The plurality of regions 39 included in the AF frame 41 consist of the central region 42 and a plurality of peripheral regions 43. The plurality of peripheral regions 43 are peripheral regions 43A to 43X. The peripheral regions 43A to 43X include third subjects different from each other, respectively. The peripheral regions 43A to 43X include peripheral regions 44A to 44H as the peripheral regions 43G, 43H, 43I, 43L, 43M, 43P, 43Q, and 43R. That is, in the plurality of regions 39, the plurality of regions 38 (see FIG. 1 and FIG. 2) disposed in a matrix of 3×3 state are included as the plurality of regions 39 (that is, the central region 42 and the peripheral regions 43G, 43H, 43I, 43L, 43M, 43P, 43Q, and 43R) disposed in a matrix state of 3×3.

Figure 21:
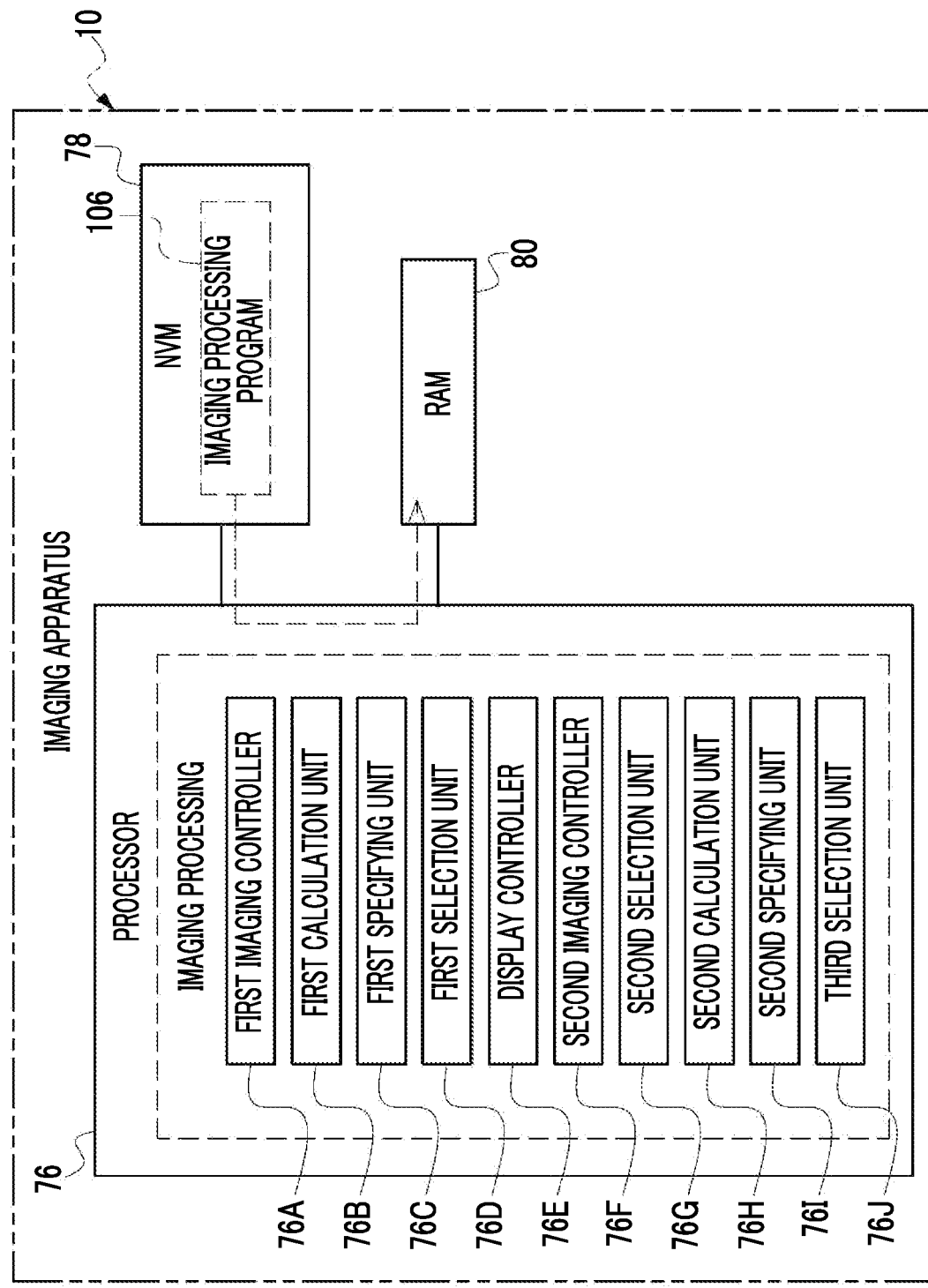
FIG. 21 is a block diagram showing an example of a function of a processor according to the third embodiment.

In the AF frame 41, the subject to be focused is selected in two stages of the regions 39 of 5×5 and the regions 39 of 3×3. In order to select the subject to be focused in two stages of the regions 39 of 5×5 and the regions 39 of 3×3, as shown in FIG. 21 as an example, an imaging processing program 106 is stored in the NVM 78. The processor 76 reads out the imaging processing program 106 from the NVM 78, and executes the read out imaging processing program 106 on the RAM 80. The processor 76 is operated as the first imaging controller 76A, the first calculation unit 76B, the first specifying unit 76C, the first selection unit 76D, the display controller 76E, the second imaging controller 76F, the second selection unit 76G, a second calculation unit 76H, a second specifying unit 76I, and a third selection unit 76J in accordance with the imaging processing program 106 executed on the RAM 80 to perform the imaging processing according to the third embodiment.

It should be noted that processing performed by the second calculation unit 76H is an example of a "second calculation step" according to the technology of the present disclosure. Moreover, processing performed by the second specifying unit 76I is an example of a "second specifying step" according to the technology of the present disclosure. Moreover, processing performed by the third selection unit 76J is an example of a "third selection step" according to the technology of the present disclosure.

Figure 22:
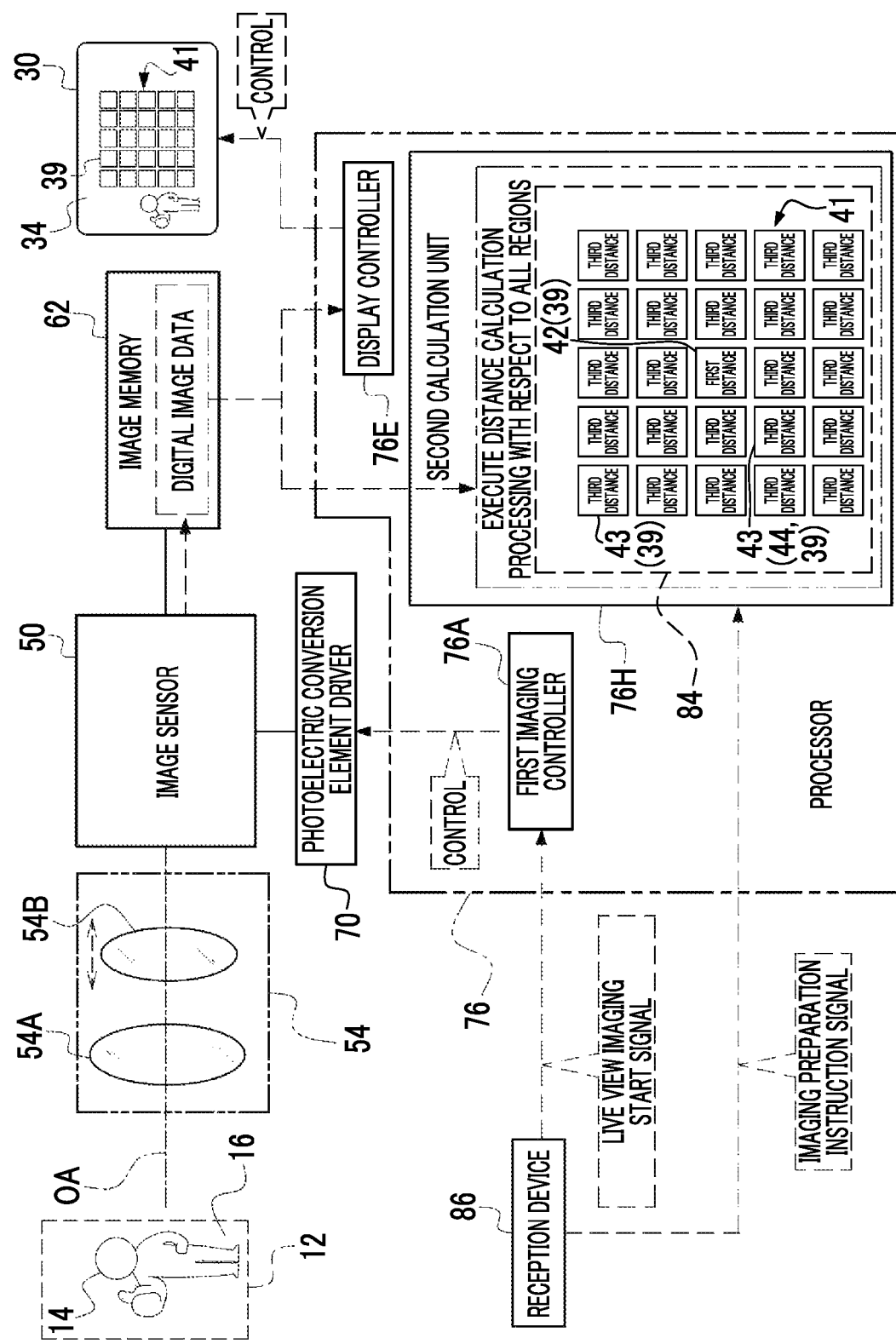
FIG. 22 is a conceptual diagram showing an example of processing contents of a first imaging controller, a second calculation unit, and a display controller according to the third embodiment.

As shown in FIG. 22 as an example, in a case in which the imaging preparation instruction is received, the reception device 86 outputs the imaging preparation instruction signal to the second calculation unit 76H. The second calculation unit 76H performs distance calculation processing for all the regions 39 in the AF frame 41. The distance calculation processing is processing of performing the distance measurement on the central region 42 and all the peripheral regions 43. In this case, for example, in the same manner as in the first embodiment described above, the second calculation unit 76H calculates the first distance. Moreover, for example, the second calculation unit 76H calculates a plurality of third distances based on the phase difference image data included in the digital image data 84 in the same manner as in calculating the first distance. The plurality of third distances are a plurality of subject distances related to all the third subjects (see FIG. 20) included in all the peripheral regions 43 in the AF frame 41.

In the third embodiment, the distance measurement is performed with respect to a plurality of portions of the third subjects in the peripheral region 43. Therefore, the plurality of subject distances are calculated for the third subjects in the peripheral region 43. The second calculation unit 76H acquires the shortest subject distance as the third distance from among the plurality of subject distances of the third subjects in the peripheral region 43. It should be noted that, here, the shortest subject distance among the plurality of subject distances for the third subjects in the peripheral region 43 is used as the third distance, but this is merely an example, and a representative subject distance for the third subjects in the peripheral region 43 need only be used as the third distance. Examples of the representative subject distance for the third subjects in the peripheral region 43 include an average value, a median value, and a mode value of the plurality of subject distances for the third subjects in the peripheral region 43.

The display controller 76E acquires the digital image data 84 used in the calculation by the second calculation unit 76H and generates the live view image 34 based on the acquired digital image data 84. In addition, the display controller 76E displays the live view image 34 on the display and displays the AF frame 41 on the live view image 34 in a superimposed manner. It should be noted that, in the following, the live view image 34 on which the AF frame 41 is displayed in a superimposed manner is also referred to as the "live view image 34 with the AF frame 41".

Figure 23:
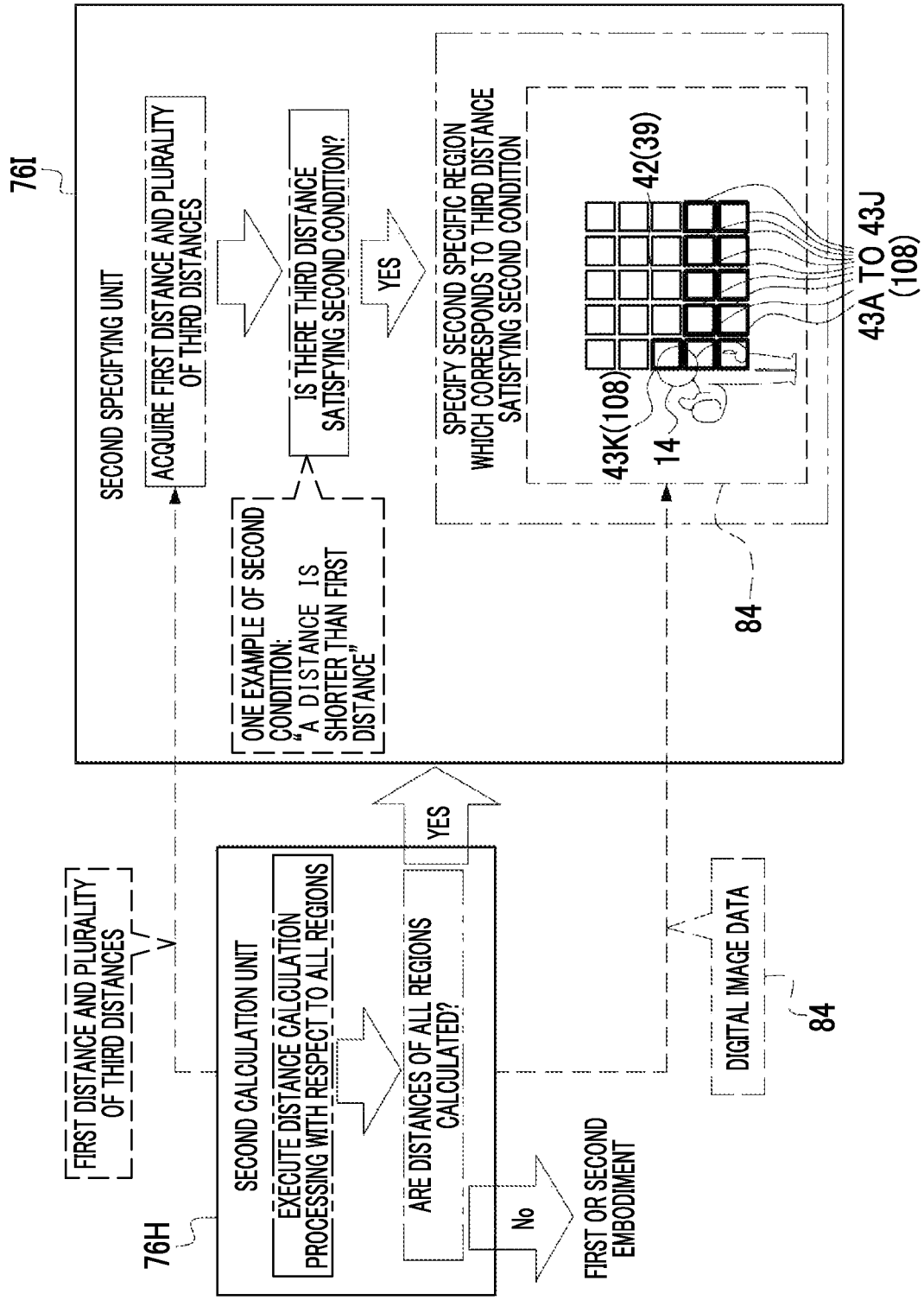
FIG. 23 is a conceptual diagram showing an example of processing contents of a second calculation unit and a second specifying unit according to the third embodiment.

As shown in FIG. 23 as an example, the second calculation unit 76H determines whether or not the distance calculation processing for all the regions 39 in the AF frame 41 succeeds (that is, whether or not the first distance related to the first subject 46 and the plurality of third distances related to the plurality of third subjects are calculated). In a case in which the distance calculation processing for all the regions 39 in the AF frame 41 succeeds, the second specifying unit 76I acquires the first distance, the plurality of third distances, and the digital image data 84 from the second calculation unit 76H. The second specifying unit 76I determines whether or not the third distance satisfying the second condition is present among the plurality of third distances. For example, the second condition refers to a condition in which a distance is shorter than the first distance. Here, in a case in which the third distance satisfying the second condition is present among the plurality of third distances, the second specifying unit 76I specifies a second specific region 108, which corresponds to the third distance satisfying the second condition among the plurality of third distances, from among the plurality of peripheral regions 43 by using the digital image data 84. In the example shown in FIG. 23, each of the peripheral regions 43A to 43K is shown as the second specific region 108 which corresponds to the third distance satisfying the second condition.

On the other hand, in a case in which the distance calculation processing for all the regions 39 in the AF frame 41 fails (that is, at least one of the first distance related to the first subject 46 or the plurality of third distances related to the plurality of third subjects is not calculated by the second calculation unit 76H), the second specifying unit 76I does not specify the second specific region 108. In addition, the same imaging processing as in the first or second embodiment (that is, the imaging processing using the regions 39 of 3×3) described above is executed by the processor 76.

Figure 24:
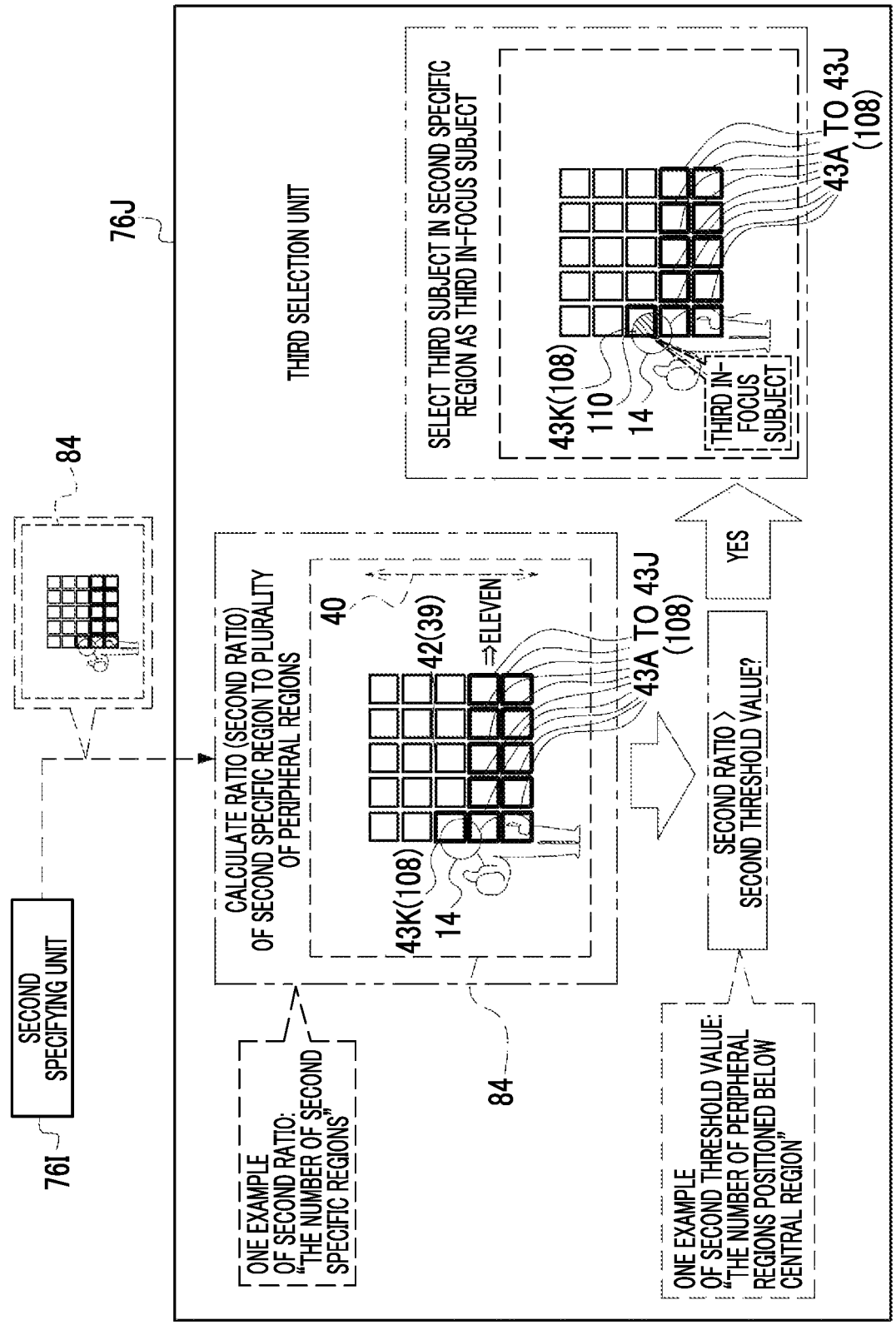
FIG. 24 is a conceptual diagram showing an example of processing contents of the second specifying unit and a third selection unit according to the third embodiment.

In a case in which the second specific region 108 which corresponds to the third distance satisfying the second condition is specified by the second specifying unit 76I, as shown in FIG. 24 as an example, the third selection unit 76J acquires the digital image data 84 from the second specifying unit 76I. In addition, the third selection unit 76J calculates a second ratio, which is a ratio of the second specific region 108 to the plurality of peripheral regions 43. For example, the second ratio is the number of the second specific regions 108. It should be noted that this is merely an example, and the ratio may be a ratio of a total area of the plurality of peripheral regions 43 (in the example shown in FIG. 8, the peripheral regions 43A to 43K), which are the second specific regions 108, to a total area of the plurality of peripheral regions 43, or need only be a value corresponding to the number of the second specific regions 108.

The third selection unit 76J selects a third in-focus subject 110 to be focused from among the first subject 46 and the third subjects by using the digital image data 84 based on the second ratio. Specifically, first, the third selection unit 76J determines whether or not the second ratio exceeds a second threshold value. For example, the second threshold value refers to the number of the peripheral regions 43 positioned below the central region 42 in the up-down direction 40 (here, for example, 10 peripheral regions 43A to 43J). In a case in which the third selection unit 76J determines that the second ratio exceeds the second threshold value, the third selection unit 76J selects the third subject in the second specific region 108 as the third in-focus subject 110. That is, in a case in which the second ratio exceeds the second threshold value, a determination is made that there is a higher probability that the user takes an interest in the third subject in the second specific region 108 than in a case in which the second ratio is equal to or less than the second threshold value, and the third subject in the second specific region 108 is selected as the third in-focus subject 110.

Figure 25:
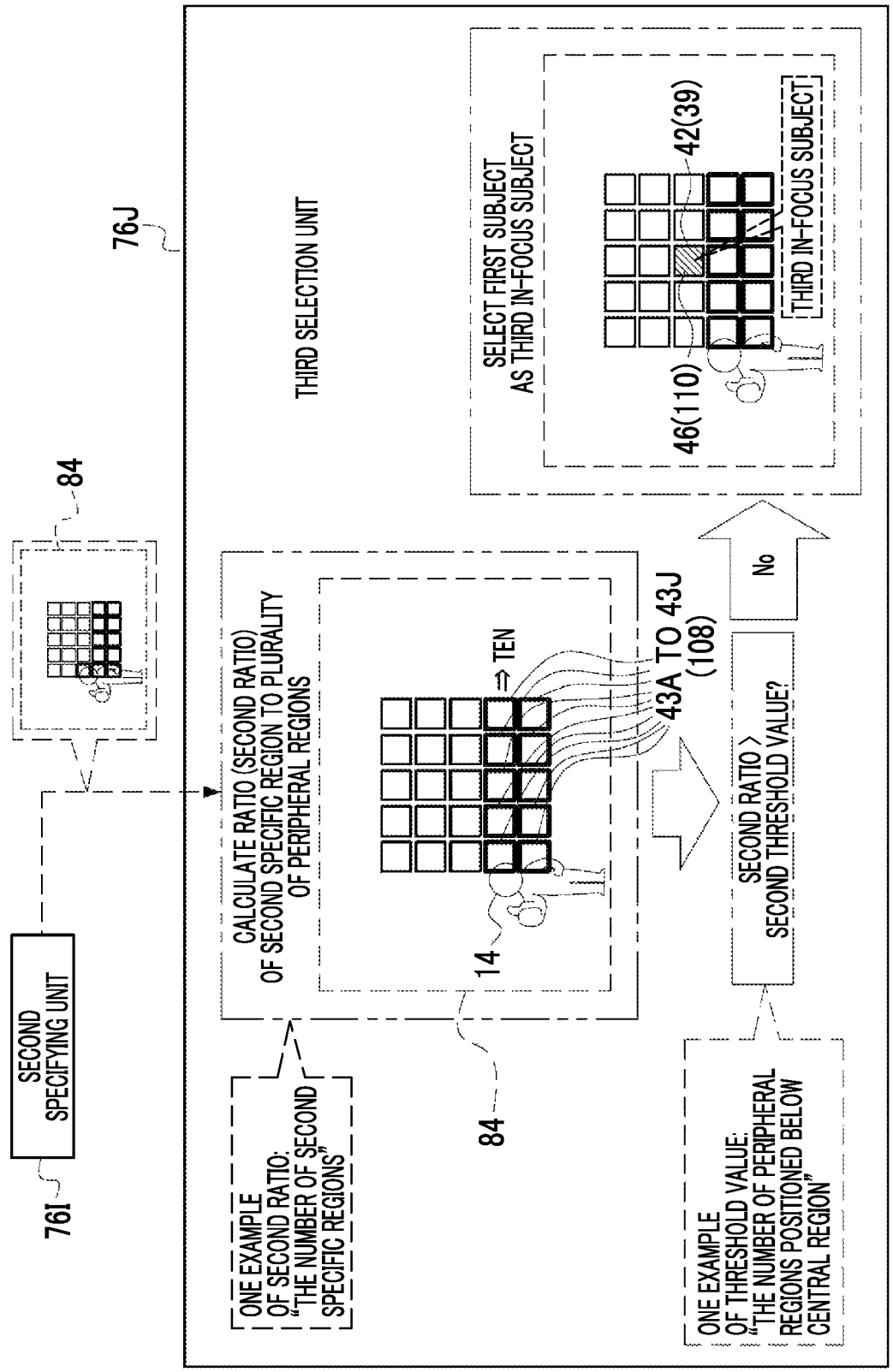
FIG. 25 is a conceptual diagram showing an example of processing contents of the second specifying unit and the third selection unit according to the third embodiment.

On the other hand, as shown in FIG. 25 as an example, in a case in which the third selection unit 76J determines that the second ratio is equal to or less than the second threshold value, the first subject 46 in the central region 42 is selected as the third in-focus subject 110. That is, in a case in which the second ratio is equal to or less than the second threshold value, a determination is made that the number of the peripheral regions 43 having the probability that the user takes an interest is small and there is a higher probability that the user takes more interest in the central region 42 than the peripheral region 43 than in a case in which the second ratio exceeds the second threshold value, the first subject 46 in the central region 42 is selected as the third in-focus subject 110.

Figure 26:
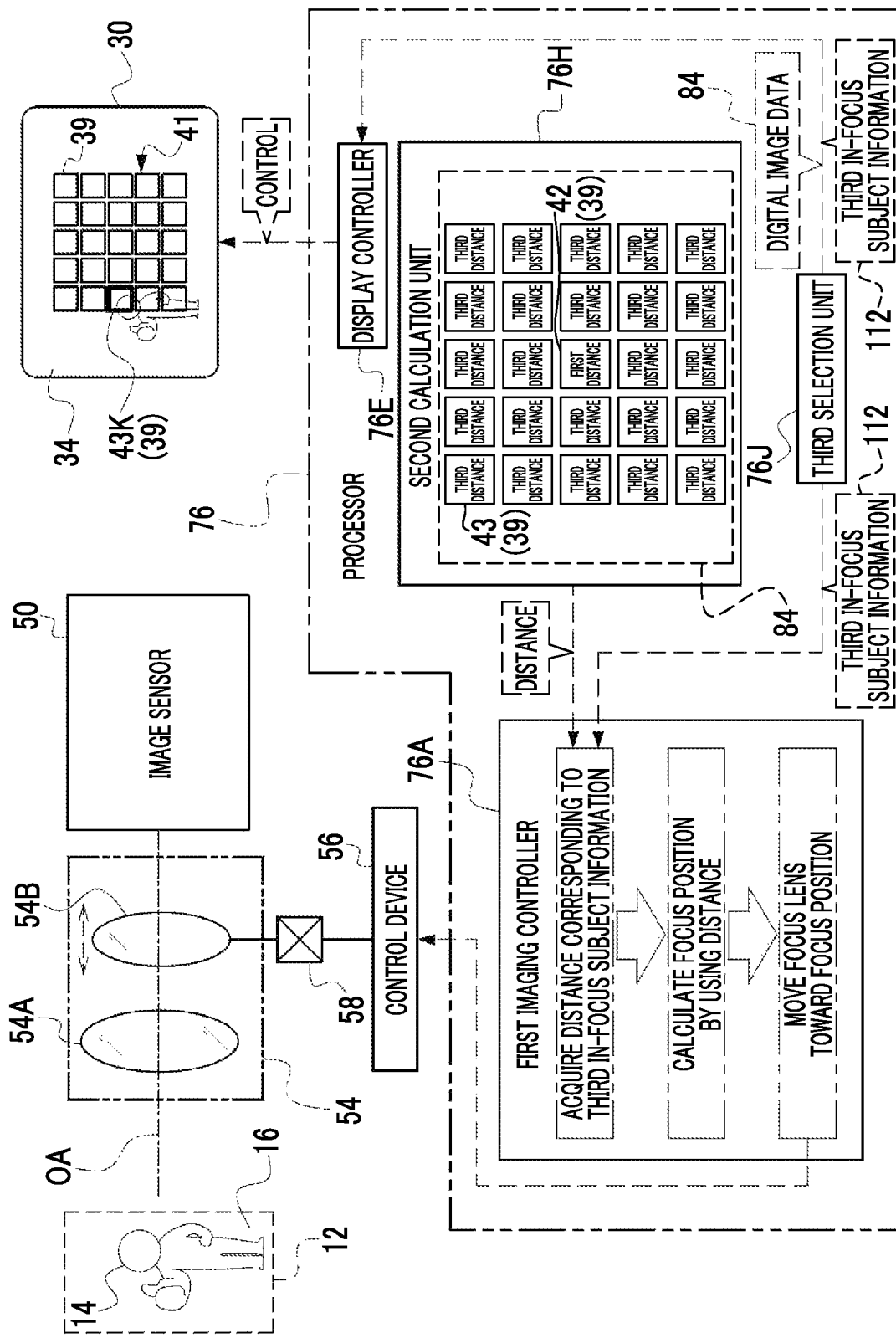
FIG. 26 is a conceptual diagram showing an example of processing contents of the first imaging controller, the second calculation unit, the display controller, and the third selection unit according to the third embodiment.

In this way, in a case in which the third in-focus subject 110 is selected, as shown in FIG. 26 as an example, the third selection unit 76J outputs third in-focus subject information 112, which is information on the third in-focus subject 110, to the first imaging controller 76A. The third in-focus subject information 112 includes position specification information for specifying the position of the third in-focus subject 110 selected by the third selection unit 76J. Here, the position of the third in-focus subject 110 refers to the position of the pixel corresponding to the third in-focus subject 110 in the image indicated by the digital image data 84 used for selecting the third in-focus subject 110.

The first imaging controller 76A acquires the subject distance corresponding to the third in-focus subject information 112, which is input from the third selection unit 76J, from the second calculation unit 76H. For example, the subject distance corresponding to the third in-focus subject information 112 refers to the first distance or the third distance corresponding to the position of the pixel specified from the position specification information included in the third in-focus subject information 112 among the first distance and the plurality of third distances calculated by the second calculation unit 76H.

It should be noted that, here, although the form example has been described in which the subject distance is acquired from the second calculation unit 76H by the first imaging controller 76A, this is merely an example. For example, the subject distance (first distance or second distance) corresponding to the third in-focus subject 110 in the image indicated by the digital image data 84 used for selecting the third in-focus subject 110 may be included in the third in-focus subject information 112. In this case, the first imaging controller 76A need only acquire the subject distance from the third in-focus subject information 112 input from the third selection unit 76J.

The first imaging controller 76A calculates the focus position by using the subject distance corresponding to the third in-focus subject information 112. In addition, the first imaging controller 76A controls the actuator 58 via the control device 56 to move the focus lens 54B to the focus position. As a result, the focusing on the third in-focus subject 110 is realized.

On the other hand, the third selection unit 76J outputs the digital image data 84 used for selecting the third in-focus subject 110 and the third in-focus subject information 112 to the display controller 76E. The display controller 76E displays the live view image 34 with the AF frame 41 on the display 30 based on the digital image data 84 and the third in-focus subject information 112. The region 39 including the third in-focus subject 110 selected by the third selection unit 76J is displayed on the AF frame 41 in an enhanced manner. In the example shown in FIG. 26, the peripheral region 43K is displayed in an enhanced manner. It should be noted that, in a case in which the focusing is performed on the third in-focus subject 110 and the imaging instruction is received by the reception device 86, the first imaging controller 76A performs the main exposure control with respect to the photoelectric conversion element driver 70 (see FIG. 11).

Figure 27:
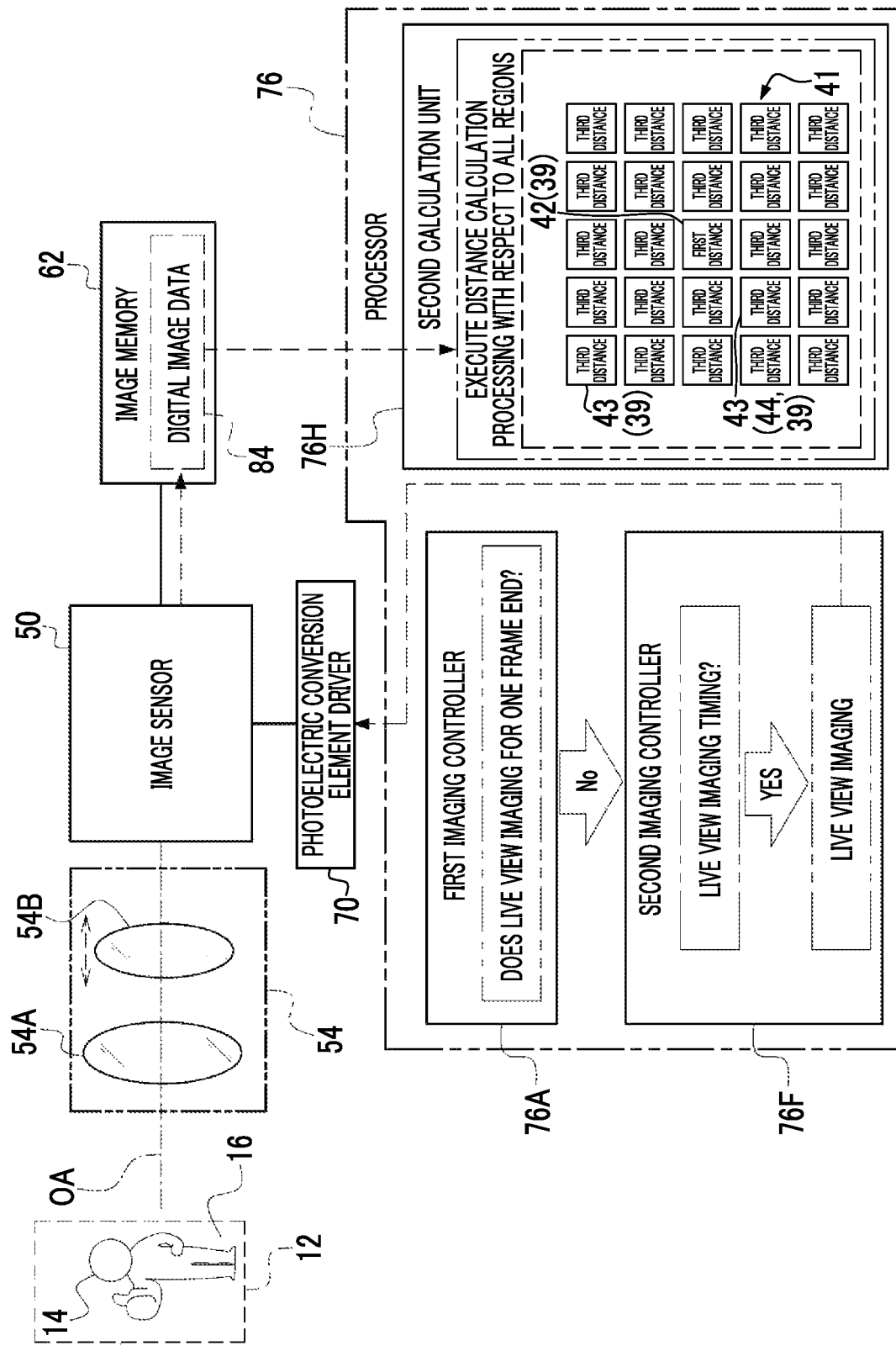
FIG. 27 is a conceptual diagram showing an example of processing contents of the first imaging controller, the second imaging controller, and the second calculation unit according to the third embodiment.

As shown in FIG. 27 as an example, in a case in which the live view imaging for one frame ends under the control of the first imaging controller 76A, the second imaging controller 76F determines whether or not the live view imaging timing has arrived. In a case in which the second imaging controller 76F determines that the live view imaging timing has arrived, the second imaging controller 76F causes the image sensor 50 to perform the live view imaging. As a result, the first subject 46 and all the third subjects (see FIG. 20) are imaged, and the digital image data 84 indicating the live view image for one frame is stored in the image memory 62. In addition, in the same manner as in the example shown in FIG. 22, the second calculation unit 76H executes the distance calculation processing for all the regions 39 in the AF frame 41.

Figure 28:
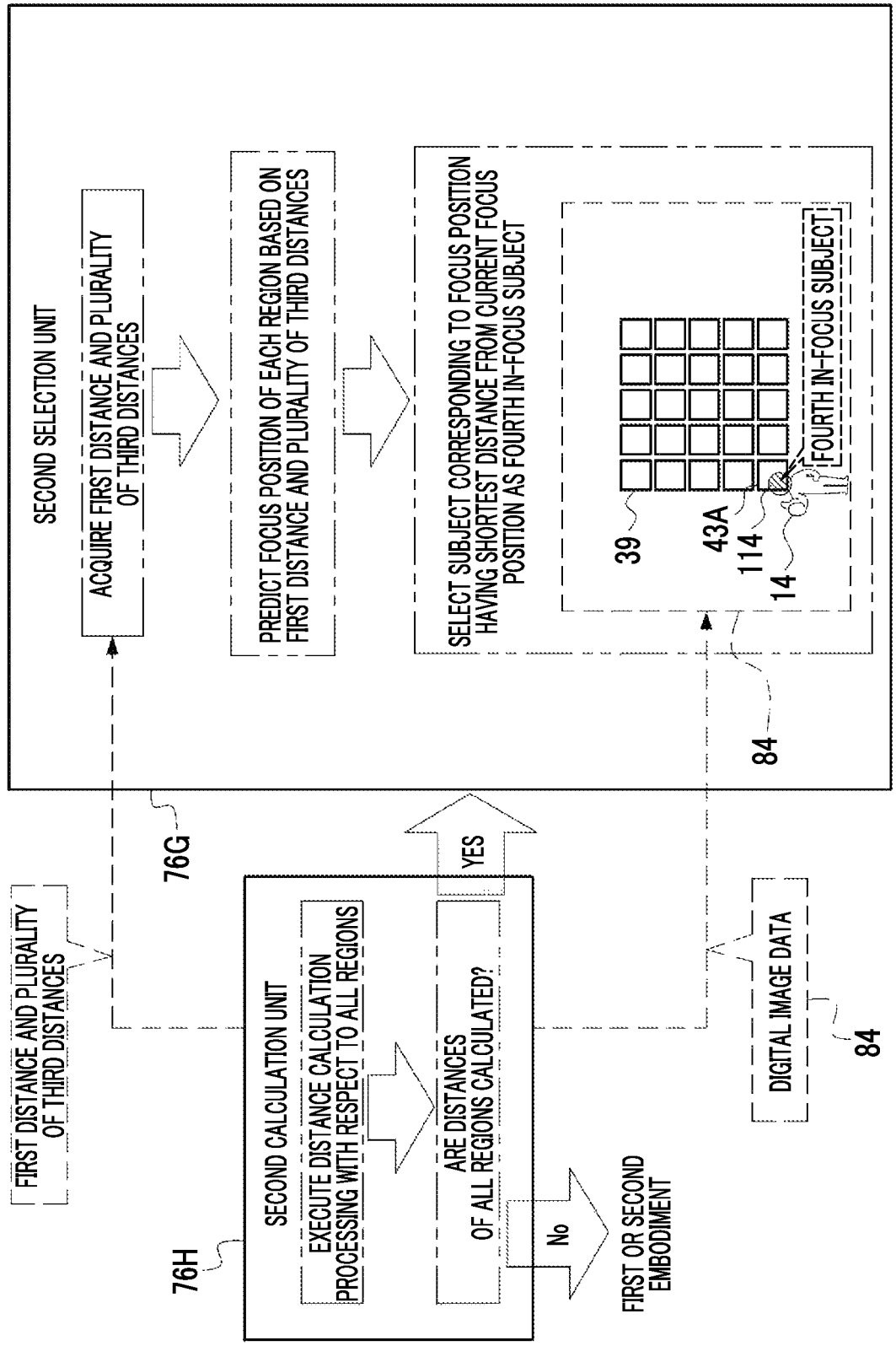
FIG. 28 is a conceptual diagram showing an example of processing contents of the second calculation unit and the second selection unit according to the third embodiment.

As shown in FIG. 28 as an example, the second calculation unit 76H determines whether or not the distance calculation processing for all the regions 39 in the AF frame 41 succeeds. In a case in which the distance calculation processing for all the regions 39 in the AF frame 41 succeeds, the second selection unit 76G acquires the first distance and the plurality of third distances from the second calculation unit 76H. Based on the first distance and the plurality of third distances acquired from the second calculation unit 76H, the second selection unit 76G predicts the focus positions of the first subject 46 included in the central region 42 and the third subjects (see FIG. 20) included in the peripheral regions 43A to 43X.

In addition, the second selection unit 76G selects the subject corresponding to the focus position at which the distance between the focus positions is the shortest distance from the current focus position among the plurality of predicted focus positions (that is, a plurality of focus positions with respect to the first subject 46 and the plurality of third subjects) as a fourth in-focus subject 114. In the example shown in FIG. 28, a portion corresponding to the focus position based on the third distance which is the shortest subject distance among the plurality of subject distances which are results of the distance measurement performed with respect to the plurality of portions of the third subject included in the peripheral region 43A (in the example shown in FIG. 28, a portion of the person 14 which overlaps the peripheral region 43A) is selected as the fourth in-focus subject 114.

On the other hand, in the example shown in FIG. 28, in a case in which the distance calculation processing for all the regions 39 in the AF frame 41 fails, the second selection unit 76G does not select the fourth in-focus subject 114. In addition, the same imaging processing as in the first or second embodiment (that is, the imaging processing using the regions 38 of 3×3) described above is executed by the processor 76.

In this way, in a case in which the fourth in-focus subject 114 is selected by the second selection unit 76G, as shown in FIG. 29 as an example, the second selection unit 76G outputs fourth in-focus subject information 116, which is information on the fourth in-focus subject 114, to the second imaging controller 76F. The fourth in-focus subject information 116 includes position specification information for specifying the position of the fourth in-focus subject 114 selected by the second selection unit 76G. Here, the position of the fourth in-focus subject 114 refers to the position of the pixel corresponding to the fourth in-focus subject 114 in the image indicated by the digital image data 84 used for selecting the fourth in-focus subject 114.

The second imaging controller 76F acquires the subject distance corresponding to the fourth in-focus subject information 116, which is input from the second selection unit 76G, from the second calculation unit 76H. For example, the subject distance corresponding to the fourth in-focus subject information 116 refers to the first distance or the third distance corresponding to the position of the pixel specified from the position specification information included in the fourth in-focus subject information 116 among the first distance and the plurality of third distances calculated by the second calculation unit 76H.

It should be noted that, here, although the form example has been described in which the subject distance is acquired from the second calculation unit 76H by the second imaging controller 76F, this is merely an example. For example, the subject distance (first distance or third distance) corresponding to the fourth in-focus subject 114 in the image indicated by the digital image data 84 used for selecting the fourth in-focus subject 114 may be included in the fourth in-focus subject information 116. In this case, the second imaging controller 76F need only acquire the subject distance from the fourth in-focus subject information 116 input from the second selection unit 76G.

The second imaging controller 76F calculates the focus position by using the subject distance corresponding to the fourth in-focus subject information 116. In addition, the second imaging controller 76F controls the actuator 58 via the control device 56 to move the focus lens 54B to the focus position. As a result, the focusing on the fourth in-focus subject 114 is realized.

On the other hand, the second selection unit 76G outputs the digital image data 84 used for selecting the fourth in-focus subject 114 and the fourth in-focus subject information 116 to the display controller 76E. The display controller 76E displays the live view image 34 with the AF frame 41 on the display 30 based on the digital image data 84 and the fourth in-focus subject information 116. In the same manner as in the first embodiment described above, the region 39 including the fourth in-focus subject 114 selected by the second selection unit 76G is displayed in the AF frame 41 in an enhanced manner. In the example shown in FIG. 29, the peripheral region 43A is displayed in an enhanced manner.

Next, an example of a flow of the imaging processing according to the third embodiment performed by the processor 76 of the imaging apparatus 10 will be described with reference to the flowcharts shown in FIGS. 30A to 30C.

It should be noted that, here, a step of performing the same processing as the processing shown in the flowchart shown in FIG. 12 is designated by the same step number as the flowchart shown in FIG. 12, and the description thereof will be omitted. The imaging processing shown in FIGS. 30A to 30C is different from the imaging processing shown in FIG. 12 in that processing of step ST60 to step ST102 is inserted before the processing of step ST10, the processing of step ST30B is applied instead of the processing of step ST30, the processing of step ST32 is removed, and the processing of step ST34 is removed.

Figure 30A:
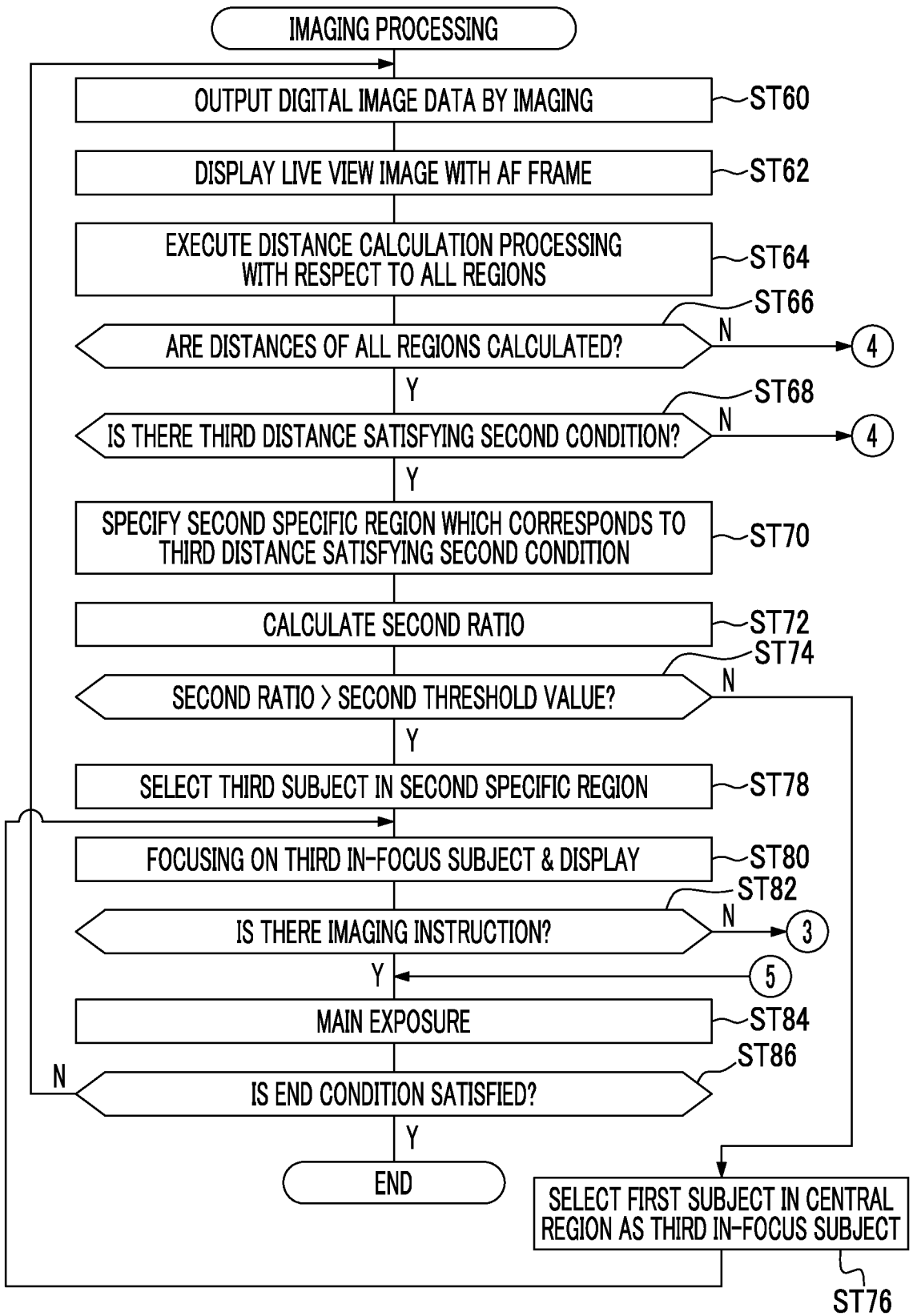
FIG. 30A is a flowchart showing an example of a flow of imaging processing according to the third embodiment.

In the imaging processing shown in FIG. 30A, first, in step ST60, the first imaging controller 76A controls the photoelectric conversion element driver 70 to cause the image sensor 50 to perform the live view imaging and acquire the digital image data 84. As a result, the digital image data 84 is stored in the image memory 62 (see FIG. 22). After the processing of step ST60 is executed, the imaging processing shifts to step ST62.

In step ST62, the display controller 76E acquires the digital image data 84 from the image memory 62 and generates the live view image 34 based on the acquired digital image data 84. In addition, the display controller 76E displays the live view image 34 with the AF frame 41 on the display 30 (see FIG. 22). After the processing of step ST62 is executed, the imaging processing shifts to step ST64.

In step ST64, the second calculation unit 76H acquires the digital image data 84 from the image memory 62 and executes the distance calculation processing for all the regions 39 in the AF frame 41 based on the acquired digital image data 84 (see FIG. 22). After the processing of step ST64 is executed, the imaging processing shifts to step ST66.

In step ST66, the second calculation unit 76H determines whether or not the distance calculation processing for all the regions 39 in the AF frame 41 succeeds (see FIG. 23). In step ST66, in a case in which the distance calculation processing for all the regions 39 in the AF frame 41 fails, a negative determination is made, and the imaging processing shifts to step ST10 shown in FIG. 30C. In step ST66, in a case in which the distance calculation processing for all the regions 39 in the AF frame 41 succeeds, a positive determination is made, and the imaging processing shifts to step ST68.

In step ST68, the second specifying unit 76I determines whether or not the third distance satisfying the second condition is present among the plurality of third distances (see FIG. 23) by using the first distance and the plurality of third distances calculated by executing the distance calculation processing in step ST64. In step ST68, in a case in which the third distance satisfying the second condition is not present among the plurality of third distances, a negative determination is made, and the imaging processing shifts to step ST10 shown in FIG. 30C. In step ST68, in a case in which the third distance satisfying the second condition is present among the plurality of third distances, a positive determination is made, and the imaging processing shifts to step ST70.

In step ST70, the second specifying unit 76I specifies the second specific region 108 which corresponds to the third distance satisfying the second condition from the plurality of peripheral regions 43. After the processing of step ST70 is executed, the imaging processing shifts to step ST72.

In step ST72, the third selection unit 76J calculates the second ratio (see FIG. 24). That is, the third selection unit 76J acquires the digital image data 84 in which the second specific region 108 is specified from the second specifying unit 76I, and calculates the ratio of the second specific region 108 to the plurality of peripheral regions 43 as the second ratio based on the acquired digital image data 84. After the processing of step ST72 is executed, the imaging processing shifts to step ST74.

In step ST74, the third selection unit 76J determines whether or not the second ratio calculated in step ST72 exceeds the second threshold value (see FIGS. 24 and 25). In step ST74, in a case in which the second ratio is equal to or less than the second threshold value (see FIG. 25), a negative determination is made, and the imaging processing shifts to step ST76. In step ST74, in a case in which the second ratio exceeds the second threshold value (see FIG. 24), a positive determination is made, and the imaging processing shifts to step ST78.

In step ST76, the third selection unit 76J selects the first subject 46 in the central region 42 as the third in-focus subject 110 (see FIG. 25). After the processing of step ST76 is executed, the imaging processing shifts to step ST80.

In step ST78, the third selection unit 76J selects the third subject in the second specific region 108 as the third in-focus subject 110 (see FIG. 24). After the processing of step ST78 is executed, the imaging processing shifts to step ST80.

In step ST80, the first imaging controller 76A performs the focusing on the third in-focus subject 110 selected in step ST76 or ST78 (see FIG. 26). Moreover, the display controller 76E displays the live view image 34 with the AF frame 41 on the display 30 and displays the region 39 corresponding to the third in-focus subject 110 in an enhanced manner (see FIG. 26). After the processing of step ST80 is executed, the imaging processing shifts to step ST82.

In step ST82, the first imaging controller 76A determines whether or not the imaging instruction is received by the reception device 86. In step ST82, in a case in which the imaging instruction is not received by the reception device 86, a negative determination is made, and the imaging processing shifts to step ST88 shown in FIG. 30B. In step ST82, in a case in which the imaging instruction is received by the reception device 86, a positive determination is made, and the imaging processing shifts to step ST84.

In step ST84, the first imaging controller 76A performs the main exposure control with respect to the photoelectric conversion element driver 70 to cause the image sensor 50 to perform the imaging accompanied by the main exposure. As a result, the image memory 62 stores the digital image data 84 obtained by performing the imaging accompanied by the main exposure. After the processing of step ST84 is executed, the imaging processing shifts to step ST86.

Figure 30B:
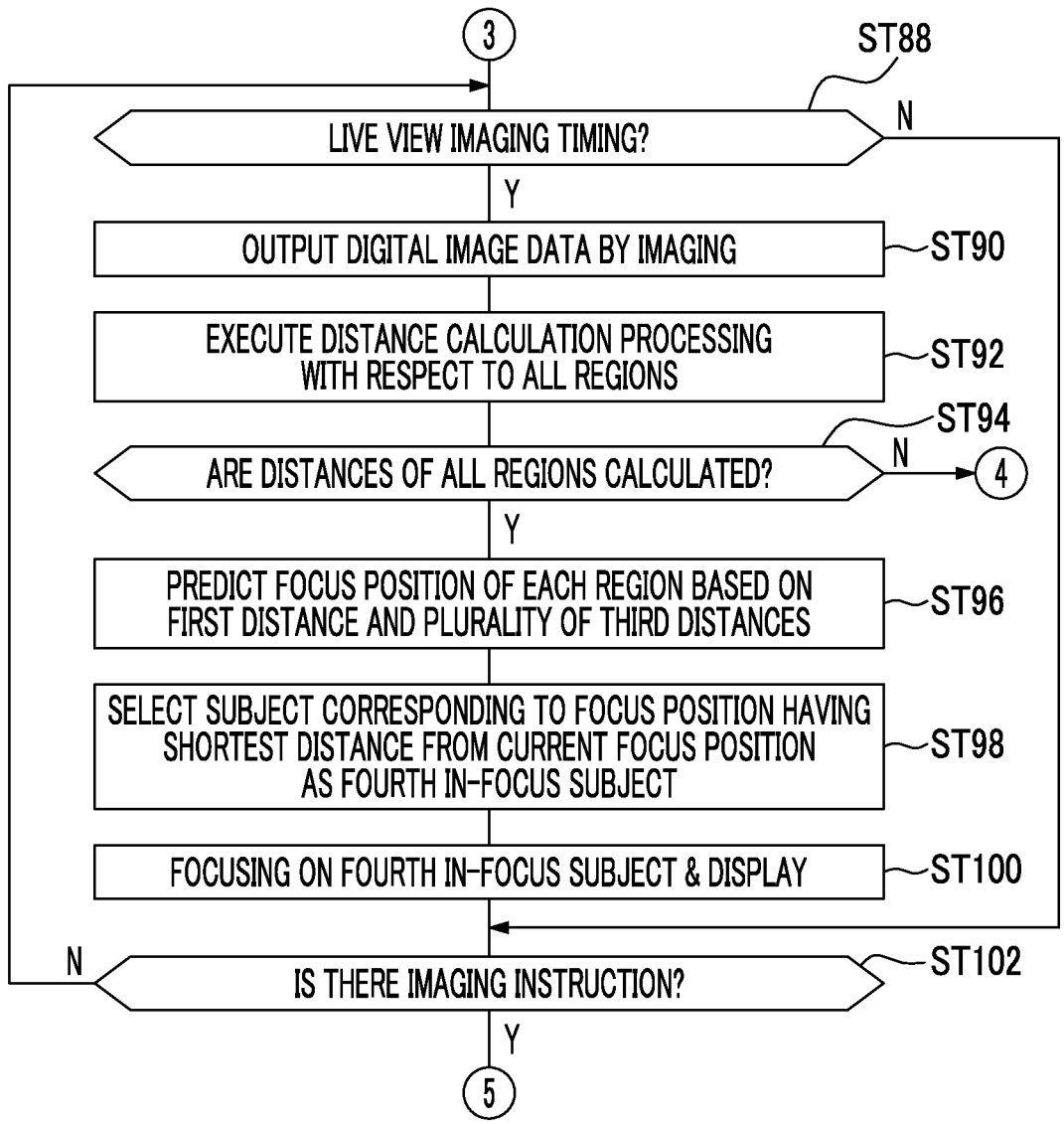
FIG. 30B is the continuation of the flowchart shown in FIG. 30A.

On the other hand, in step ST88 shown in FIG. 30B, the second imaging controller 76F determines whether or not the live view imaging timing has arrived. In step ST88, in a case in which the live view imaging timing has not arrived, a negative determination is made, and the imaging processing shifts to step ST102. In step ST88, in a case in which the live view imaging timing has arrived, a positive determination is made, and the imaging processing shifts to step ST90.

In step ST90, the second imaging controller 76F controls the photoelectric conversion element driver 70 to cause the image sensor 50 to perform the live view imaging and acquire the digital image data 84. As a result, the digital image data 84 is stored in the image memory 62 (see FIG. 27). After the processing of step ST90 is executed, the imaging processing shifts to step ST92.

In step ST92, the second calculation unit 76H acquires the digital image data 84 from the image memory 62 and executes the distance calculation processing for all the regions 39 in the AF frame 41 based on the acquired digital image data 84 (see FIG. 27). After the processing of step ST92 is executed, the imaging processing shifts to step ST94.

In step ST94, the second calculation unit 76H determines whether or not the distance calculation processing for all the regions 39 in the AF frame 41 succeeds (see FIG. 28). In step ST94, in a case in which the distance calculation processing for all the regions 39 in the AF frame 41 fails, a negative determination is made, and the imaging processing shifts to step ST10 shown in FIG. 30C. In step ST94, in a case in which the distance calculation processing for all the regions 39 in the AF frame 41 succeeds, a positive determination is made, and the imaging processing shifts to step ST96.

In step ST96, the second selection unit 76G acquires the first distance and the plurality of third distances obtained by executing the distance calculation processing in step ST92, and predicts each region 39 (see FIG. 20), that is, the focus positions of the first subject 46 included in the central region 42 and the plurality of third subjects included in the peripheral regions 43A to 43X based on the acquired first distance and plurality of third distances. After the processing of step ST96 is executed, the imaging processing shifts to step ST98.

In step ST98, the second selection unit 76G selects the subject corresponding to the focus position at which the distance between the focus positions is the shortest distance from the current focus position among the plurality of focus positions predicted in step ST96 (that is, the plurality of focus positions with respect to the first subject 46 and the plurality of third subjects) as the fourth in-focus subject 114 (see FIG. 28). After the processing of step ST98 is executed, the imaging processing shifts to step ST100.

In step ST100, the second imaging controller 76F performs the focusing on the fourth in-focus subject 114 selected in step ST98 (see FIG. 29). Moreover, the display controller 76E displays the live view image 34 with the AF frame 41 on the display 30 and displays the region 39 corresponding to the fourth in-focus subject 114 in an enhanced manner (see FIG. 29). After the processing of step ST100 is executed, the imaging processing shifts to step ST102.

In step ST102, the second imaging controller 76F determines whether or not the imaging instruction is received by the reception device 86. In step ST102, in a case in which the imaging instruction is received by the reception device 86, a positive determination is made, and the imaging processing shifts to step ST84 shown in FIG. 30A. In step ST102, in a case in which the imaging instruction is not received by the reception device 86, a negative determination is made, and the imaging processing shifts to step ST88.

On the other hand, in the imaging processing shown in FIG. 30C, processing of step ST10 to step ST28 described in the first embodiment described above is performed by the processor 76. In step ST30B, the first imaging controller 76A determines whether or not the imaging instruction is received by the reception device 86. In step ST30B, in a case in which the imaging instruction is not received by the reception device 86, a negative determination is made, and the imaging processing shifts to step ST18. In step ST30B, in a case in which the imaging instruction is received by the reception device 86, a positive determination is made, and the imaging processing shifts to step ST84 shown in FIG. 30A.

In step ST86 shown in FIG. 30A, the first imaging controller 76A determines whether or not the imaging processing end condition is satisfied. In a case in which the imaging processing end condition is not satisfied in step ST86, a negative determination is made, and the imaging processing shifts to step ST60. In a case in which the imaging processing end condition is satisfied in step ST86, a positive determination is made, and the imaging processing ends.

As described above, in the imaging apparatus 10 according to the third embodiment, the first distance related to the first subject 46 in the central region 42 included in the AF frame 41 (see FIG. 20) which is wider than the AF frame 36 (see FIGS. 1 and 2) and the plurality of third distances related to the plurality of third subjects in the peripheral regions 43A to 43X included in the AF frame 41 are calculated. In addition, the second specific region 108 which corresponds to the third distance satisfying the second condition among the plurality of third distances is specified from among the plurality of regions 39 (see FIG. 23). In addition, the ratio of the second specific region 108 to the plurality of peripheral regions 43 is calculated as the second ratio (see FIGS. 24 and 25).

Here, for example, in a case in which the second ratio is large (for example, in a case in which the second ratio exceeds the second threshold value), a determination is made that there is a high probability that the user takes more interest in the third subject in the second specific region 108 than the first subject 46 in the central region 42. On the other hand, in a case in which the second ratio is small (for example, in a case in which the second ratio is equal to or less than the second threshold value), a determination is made that there is a high probability that the third subject that the user takes an interest is not present among the plurality of peripheral regions 43. Therefore, in a case in which the second ratio is large, the focusing intended by the user is more easily realized by performing the focusing on the third subject in the second specific region 108 than by performing the focusing on the first subject 46. On the other hand, in a case in which the second ratio is small, the focusing intended by the user is more easily realized by performing the focusing on the first subject 46 than by performing the focusing on the third subject in the second specific region 108. Therefore, in the imaging apparatus 10, the third in-focus subject 110, which is the subject to be focused, is selected from among the first subject 46 and the third subject in the second specific region 108 based on the second ratio (see FIGS. 24 and 25).

As a result, it is possible to facilitate the focusing on the subject that the user takes an interest in the AF frame 41 (see FIG. 20) which is wider than the AF frame 36 (see FIG. 1 and FIG. 2). For example, in a case in which there is a high probability that the user takes more interest in the first subject 46 than the third subject, the focusing on the first subject 46 can be performed. On the other hand, in a case in which there is a high probability that the user takes more interest in the third subject than the first subject 46, the focusing on the third subject (that is, the third subject in the second specific region 108) that the user takes an interest can be performed. In other words, this means that it is difficult to perform the focusing on a subject that the user does not take an interest in the AF frame 41 which is wider than the AF frame 36.

Moreover, in the imaging apparatus 10 according to the third embodiment, the second specific region 108 corresponding to the third distance which is shorter than the first distance among the plurality of third distances is specified from among the plurality of peripheral regions 43 (see FIG. 23). As a result, the focusing is performed on the third subject in the peripheral region 43 in which the subject distance is shorter than the subject distance related to the first subject 46 in the central region 42. Therefore, in a case in which the subject that the user takes an interest is present on the front side (side closer to the user) of the first subject 46 in the central region 42, it is possible to facilitate the focusing on the subject that the user takes an interest in the AF frame 41 (see FIG. 20) which is wider than the AF frame 36 (see FIGS. 1 and 2).

Moreover, in the imaging apparatus 10 according to the third embodiment, the AF frame 41 which is wider than the AF frame 36 is used. Therefore, the distance measurement for all the regions 39 in the AF frame 41 is less likely to succeed than the distance measurement for all the regions 38 in the AF frame 36. In a case in which the distance measurement for all the regions 39 in the AF frame 41 does not succeed, in a case in which the focusing is always performed on the central region 42 and the subject that the user takes an interest is not present in the central region 42, the focusing on the subject that the user does not take an interest is performed. In the imaging apparatus 10 according to the third embodiment, in a case in which the second specific region 108 is not specified due to the failure of the distance calculation processing for all the regions 39, the imaging processing (for example, processing shown in step ST10 to step ST28 shown in FIG. 30C) described in the first or second embodiment described above is performed. The imaging processing described in the first or second embodiment described above is the imaging processing using the AF frame 36 which is narrower than the AF frame 41. Therefore, even in a case in which the second specific region 108 is not specified due to the failure of the distance calculation processing for all the regions 39, in a case in which the subject that the user takes an interest is included in the peripheral region 44 in the AF frame 36, the focusing can be performed on the second subject 48 in the peripheral region 44 instead of the first subject 46 in the central region 42. As a result, it is possible to more facilitate the focusing on the subject that the user takes an interest than in a case in which the imaging processing is performed using only the AF frame 41.

Moreover, in the imaging apparatus 10 according to the third embodiment, the imaging processing using the plurality of regions 39 disposed in a matrix of 5×5 and the imaging processing using the plurality of regions 38 disposed in a matrix of 3×3 are performed by two-stage method. Therefore, even in a case in which the second specific region 108 is not specified due to the failure of the distance calculation processing for the plurality of regions 39, in a case in which the subject that the user takes an interest is included in the plurality of regions 38, the focusing can be performed on the second subject 48 in the peripheral region 44 instead of the first subject 46 in the central region 42. As a result, it is possible to more facilitate the focusing on the subject that the user takes an interest than in a case in which the imaging processing is performed using only the plurality of regions 39 disposed in a matrix of 5×5.

It should be noted that, in the third embodiment described above, the plurality of regions 39 disposed in a matrix of 5×5 and the plurality of regions 38 disposed in a matrix of 3×3 are described, but the technology of the present disclosure is not limited to this. For example, the imaging processing using the plurality of regions disposed in a matrix of 7×7 and the imaging processing using the plurality of regions 39 disposed in a matrix of 5×5 may be performed. That is, in a case in which N is an odd number of 3 or more, the imaging processing using a plurality of regions disposed in a matrix of N×N and the imaging processing using a plurality of regions disposed in a matrix of (N+2)×(N+2) need only be performed.

Moreover, in a case in which M is an even number of 2 or more, the imaging processing using a plurality of regions disposed in a matrix of N×N and the imaging processing using a plurality of regions disposed in a matrix of (N+M)×(N+M) may be performed.

Moreover, in the third embodiment described above, the form example has been described in which the imaging processing shifts to step ST34 of FIG. 30A in a case in which a negative determination is made in step ST30B shown in FIG. 30C, but the technology of the present disclosure is not limited to this. For example, in a case in which a negative determination is made in step ST30B shown in FIG. 30C, the processing shown in the flowchart of FIG. 18B or FIG. 19 may be performed by the processor 76.

Fourth Embodiment

In the fourth embodiment, a form example of a case in which the continuous imaging is performed by the imaging apparatus 10 (that is, a case in which the continuous imaging mode is set for the imaging apparatus 10) will be described. It should be noted that, in the fourth embodiment described above, the same components as those in the first to third embodiments will be designated by the same reference numeral, the description of the components will be omitted, and the difference from the first to third embodiments will be mainly described.

Figure 31:
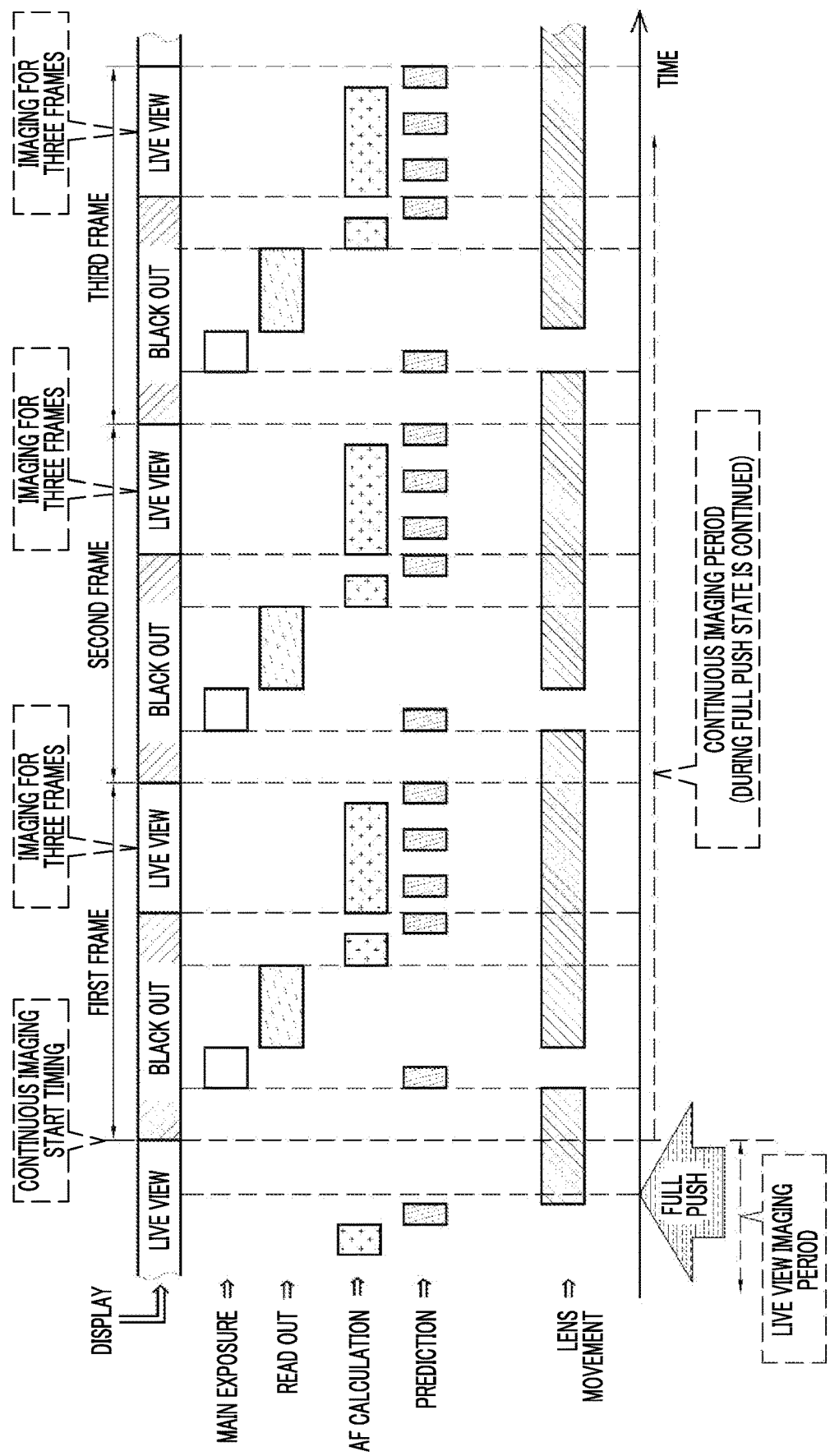
FIG. 31 is a time chart showing an example of a flow of processing of continuous imaging which is known in the related art.

First, an example of a flow of processing of continuous imaging which is known in the related art will be described with reference to FIG. 31. As shown in FIG. 31 as an example, the live view imaging is performed during a live view imaging period. During the live view imaging period, by performing the live view imaging, the non-phase difference image data included in the digital image data 84 is stored in the image memory 62. In addition, the non-phase difference image data is read out from the image memory 62 by the processor 76, and the image indicated by the read out non-phase difference image data is displayed on the display 30 as the live view image.

Moreover, during the live view imaging period, by performing the live view imaging, the phase difference image data included in the digital image data 84 is stored in the image memory 62. The processor 76 reads out the phase difference image data from the image memory 62, and calculates the subject distance related to a focus target region based on the read out phase difference image data. For example, the focus target region is a region in the AF frame 36, a region in the AF frame 41, or a region designated by the user via the reception device 86.

It should be noted that the focus target region may be a fixed region, or may be a region in which a position in an imaging range is changed, for example, a region in which a specific moving object (for example, a specific person, a specific bicycle, a specific vehicle, or a specific aircraft), which is recognized by the processor 76 performing image recognition processing based on the image data, is followed.

During the live view imaging period, the processor 76 performs the AF calculation based on the calculated subject distance. Moreover, during the live view imaging period, the processor 76 predicts the focus position of the focus lens 54B with respect to the focus target region at a timing at which the main exposure of the first frame of the continuous imaging is started, based on the focus position obtained by performing the AF calculation. The prediction of the focus position is performed, for example, based on a plurality of focus positions obtained by performing the latest plurality of AF calculations (for example, the latest two AF calculations retroactively from the present time) and an elapsed time from the completion of the prediction of the first frame of the continuous imaging to the present time. The processor 76 controls the actuator 58 via the control device 56 to move the focus lens 54B along the optical axis OA toward the predicted focus position.

In a case in which the release button 24 is fully pushed and the full push state is continued for a certain time or longer, a timing for starting the continuous imaging (hereinafter, also referred to as a "continuous imaging start timing") arrives. In a case in which the continuous imaging start timing has arrived, the live view image of the display 30 is hidden. That is, a display region in which the live view image is displayed is blacked out. Moreover, in a case in which the continuous imaging start timing has arrived, the continuous imaging is started.

The processor 76 stops the focus lens 54B at the timing at which the main exposure is started. This is because, in a case in which the focus lens 54B is moved during the main exposure, the distortion due to the movement of the focus lens 54B occurs in the image obtained by the imaging. On the condition that the focus lens 54B is stopped, first, the main exposure of the first frame of the continuous imaging is started.

While the main exposure of the first frame of the continuous imaging is performed, the processor 76 predicts the focus position of the focus lens 54B with respect to the focus target region at a timing at which the main exposure of the second frame of the continuous imaging is performed, based on the latest focus position obtained by performing the AF calculation. Even in this case, the prediction of the focus position is performed based on, for example, a plurality of focus positions obtained by the latest plurality of AF calculations obtained during the live view imaging period, and the elapsed time from the completion of the prediction of the first frame of the continuous imaging to the present time.

After the main exposure of the first frame of the continuous imaging ends, the reading out of the digital image data 84 of the first frame of the continuous imaging is started. Here, the reading out of the digital image data 84 refers to processing up to the storage of the digital image data of the first frame of the continuous imaging in the image memory 62 and the storage of the digital image data 84, which is read out from the image memory 62 by the processor 76, in a predetermined storage region (here, as an example, the NVM 78).

Moreover, in a case in which the main exposure of the first frame of the continuous imaging ends, the processor 76 calculates the subject distance based on the phase difference image data obtained by the main exposure, and performs the AF calculation based on the calculated subject distance. Moreover, the processor 76 predicts the focus position of the focus lens 54B with respect to the focus target region at the timing at which the main exposure of the second frame of the continuous imaging is performed, based on the focus position obtained by performing the latest AF calculation.

Moreover, after the main exposure of the first frame of the continuous imaging ends, the focus lens 54B starts moving toward the predicted focus position. In a case in which the reading out of the digital image data ends, the live view imaging for three frames is performed, and the image indicated by the non-phase difference image data obtained thereby is displayed on the display 30 as the live view image. It should be noted that, here, the live view imaging for three frames is described, but this is merely an example, and the live view imaging for one or two frames may be performed, the live view imaging for four or more frames may be performed, and the live view imaging for the number of frames determined in accordance with the frame rate of the live view imaging.

Moreover, each time the live view imaging is performed, the processor 76 performs the AF calculation based on the phase difference image data obtained by performing the live view imaging. In addition, each time the AF calculation is performed, based on a plurality of focus positions obtained from a latest plurality of AF calculations, the focus position of the focus lens 54B with respect to the focus target region at a timing at which the main exposure of a next frame in the continuous imaging is performed is predicted by the processor 76.

On the other hand, the focus lens 54B continues to be moved toward the predicted focus position even while the live view imaging for three frames is performed while the main exposure of the first frame of the continuous imaging is performed. That is, the processor 76 continues to move the focus lens 54B toward the predicted latest focus position while the live view imaging for three frames is performed.

In a case in which the live view imaging of the third frame ends, the processor 76 controls the actuator 58 via the control device 56 to move the focus lens 54B along the optical axis OA toward the latest focus position predicted by performing the live view imaging of the third frame.

In each frame after the second frame of the continuous imaging, the same processing as the processing of the first frame of the continuous imaging after the continuous imaging start timing has arrived is performed until the release button 24 is released from the full push state.

In general, the main exposure of the continuous imaging is performed at regular time intervals. For example, the main exposure is performed once in each of a plurality of continuous frame periods, and the live view imaging of several frames (three frames in the example shown in FIG. 31) is performed after the main exposure in each frame period.

However, in a case in which the frame period is fixed, the focus lens 54B may not be able to reach the predicted latest focus position before the main exposure of the next frame period is started. This is because the latest focus position predicted by performing the last live view imaging in the frame period is too far from the current focus position.

In a case in which the focusing is prioritized over a release interval of the continuous imaging (that is, the time interval during which the main exposure of the continuous imaging is performed), the focus lens 54B can reach the predicted latest focus position by extending the frame period without limit. However, in that case, as a matter of course, the number of frames per unit time obtained by performing the continuous imaging is less than that in a case in which the release interval of the continuous imaging is prioritized.

Figure 32:
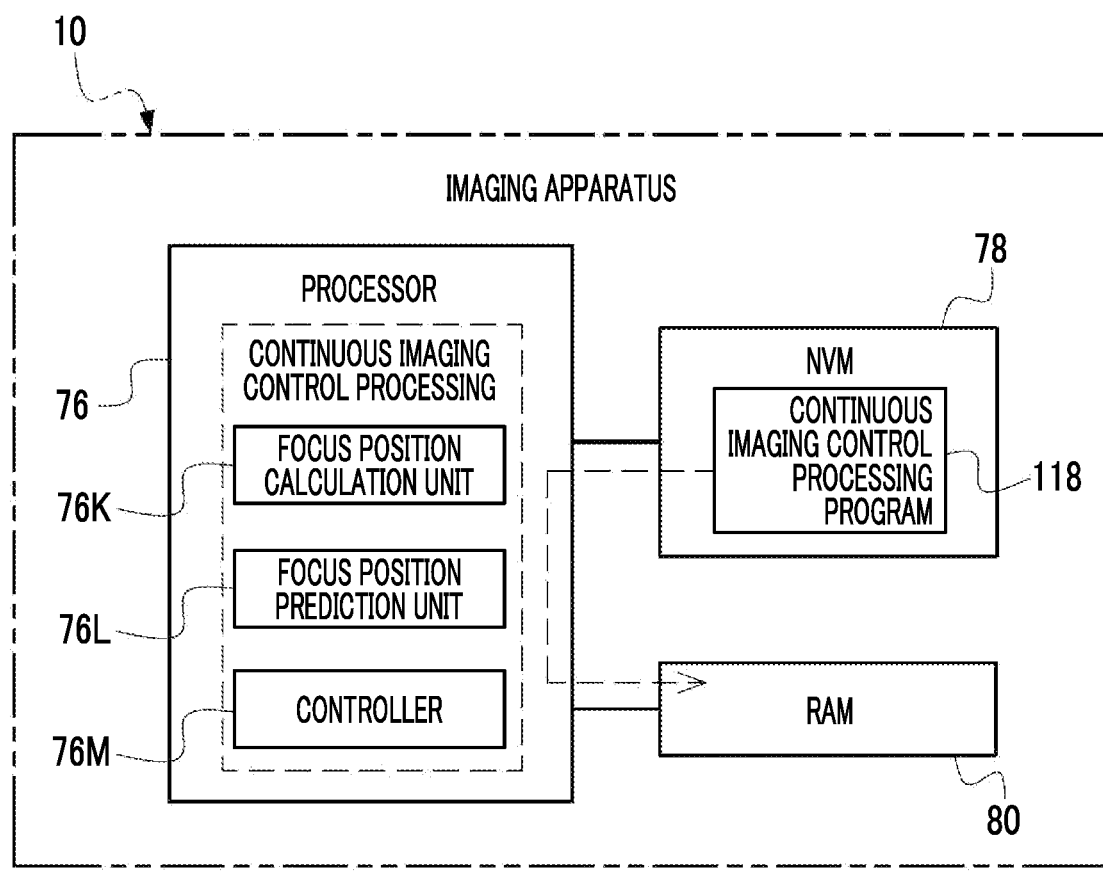
FIG. 32 is a block diagram showing an example of a function of a processor according to a fourth embodiment.

In view of such circumstances, the imaging apparatus 10 according to the fourth embodiment is configured to perform continuous imaging control processing (see FIGS. 32 to 38C) by the processor 76. As shown in FIG. 32 as an example, a continuous imaging control processing program 118 is stored in the NVM 78. The processor 76 reads out the continuous imaging control processing program 118 from the NVM 78, and executes the read out continuous imaging control processing program 118 on the RAM 80. The processor 76 is operated as a focus position calculation unit 76K, a focus position prediction unit 76L, and a controller 76M in accordance with the continuous imaging control processing program 118 executed on the RAM 80 to perform the continuous imaging control processing.

It should be noted that processing performed by the focus position calculation unit 76K and the focus position prediction unit 76L is an example of a "first calculation step", a "second calculation step", and a "selection step" according to the technology of the present disclosure. Moreover, processing performed by the controller 76M is an example of a "first movement step" and an "imaging step" according to the technology of the present disclosure.

Figure 33:
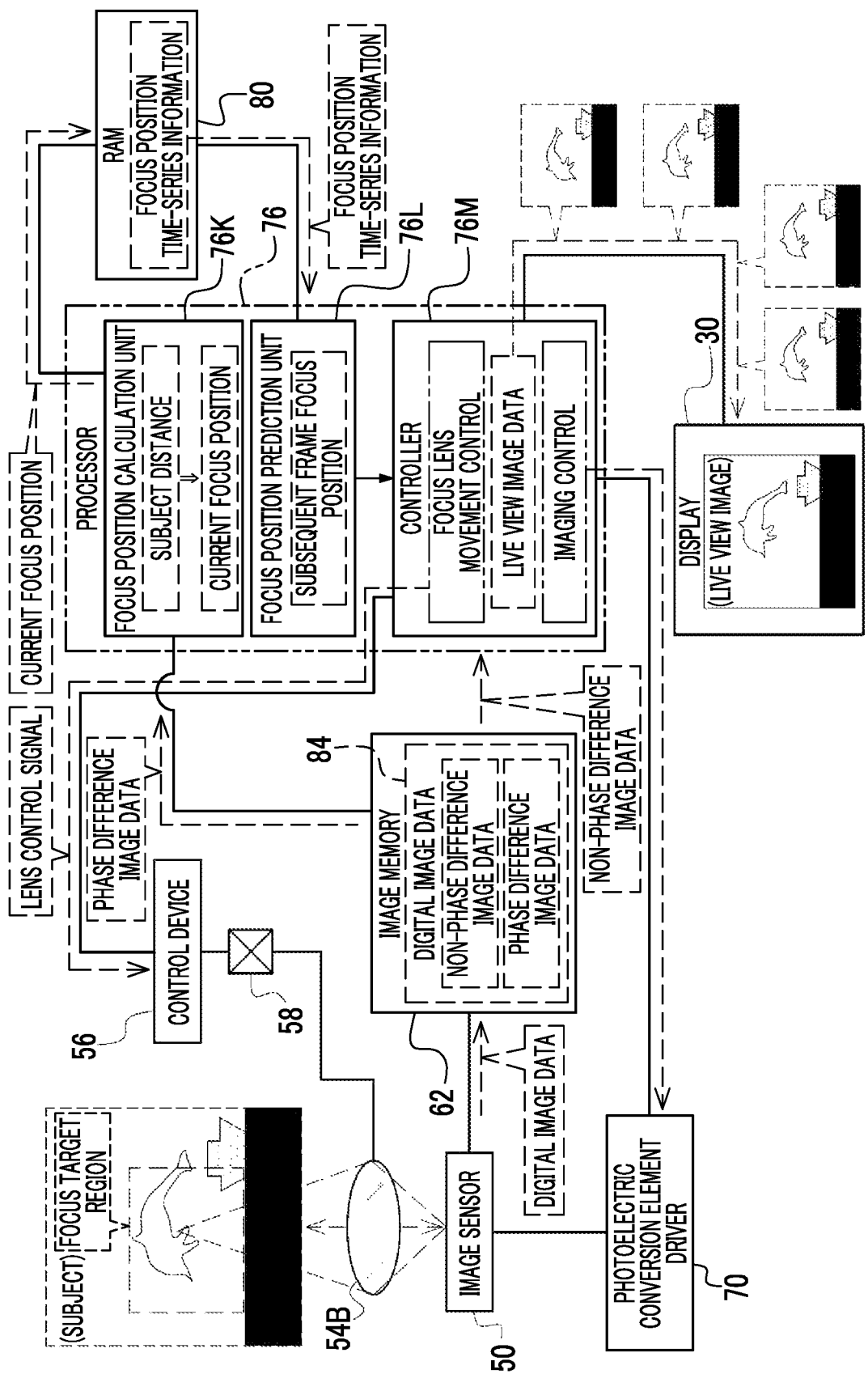
FIG. 33 is a conceptual diagram showing an example of processing contents of a focus position calculation unit, a focus position prediction unit, and a controller according to a fourth embodiment.

As shown in FIG. 33 as an example, the controller 76M performs an imaging control with respect to the image sensor 50 via the photoelectric conversion element driver 70 to cause the image sensor 50 to perform various types of imaging, such as the live view imaging and the continuous imaging. By performing the imaging as described above, the digital image data 84 is stored in the image memory 62. The controller 76M acquires the non-phase difference image data, which is included in the digital image data 84 from the image memory 62, as the live view image data. The controller 76M displays the image indicated by the live view image data on the display 30 as the live view image.

In a period from the live view imaging period to the arrival of the continuous imaging start timing, the focus position calculation unit 76K acquires the latest phase difference image data from the image memory 62, and calculates the subject distance related to the focus target region based on the acquired phase difference image data. In addition, the focus position calculation unit 76K performs the AF calculation based on the calculated subject distance to calculate a current focus position of the focus lens 54B with respect to the focus target region (hereinafter, referred to as a "current focus position").

Focus position time-series information is stored in the RAM 80. The focus position time-series information is information indicating the time series of the current focus position obtained each time the AF calculation is performed. The time series of the current focus position is, for example, the time series of the current focus position obtained by the AF calculation for the last three times. The focus position calculation unit 76K updates the focus position time-series information by storing the calculated latest current focus position in the RAM 80 each time the current focus position is calculated. Here, as the time series of the current focus position, the time series of the current focus position obtained by the AF calculation for the last three times is described, but this is merely an example, and the time series of the current focus position need only be the time series of the current focus position obtained by the AF calculation for a plurality of times in the past, further, the AF calculation for a plurality of times in the past need only be the AF calculation for a plurality of times performed in a period close to the present time.

The focus position prediction unit 76L predicts the focus position of the focus lens 54B with respect to the focus target region in the first frame of the continuous imaging in the previous stage of the start of the continuous imaging by the image sensor 50. Moreover, the focus position prediction unit 76L predicts the focus position of the focus lens 54B with respect to the focus target region of the subsequent frame (for example, the next frame) for each frame of the continuous imaging after the continuous imaging by the image sensor 50 is started. Specifically, the focus position prediction unit 76L acquires the focus position time-series information from the RAM 80, and predicts the focus position (hereinafter, also referred to as a "subsequent frame focus position") of the focus lens 54B with respect to the focus target region of the subsequent frame (for example, the next frame) based on the acquired focus position time-series information.

The controller 76M performs a focus lens movement control. A lens control signal for instructing the movement of the focus lens 54B toward the focus position predicted by the focus position prediction unit 76L or instructing the stop of the focus lens 54B is generated and output to the control device 56. In the example shown in FIG. 33, since the subsequent frame focus position is predicted by the focus position prediction unit 76L, the lens control signal generated and output by the controller 76M is, for example, a signal for instructing the movement of the focus lens 54B toward the subsequent frame focus position predicted by the focus position prediction unit 76L. The control device 56 operates the actuator 58 in response to the lens control signal input from the controller 76M to move the focus lens 54B along the optical axis OA toward the subsequent frame focus position.

Figure 34:
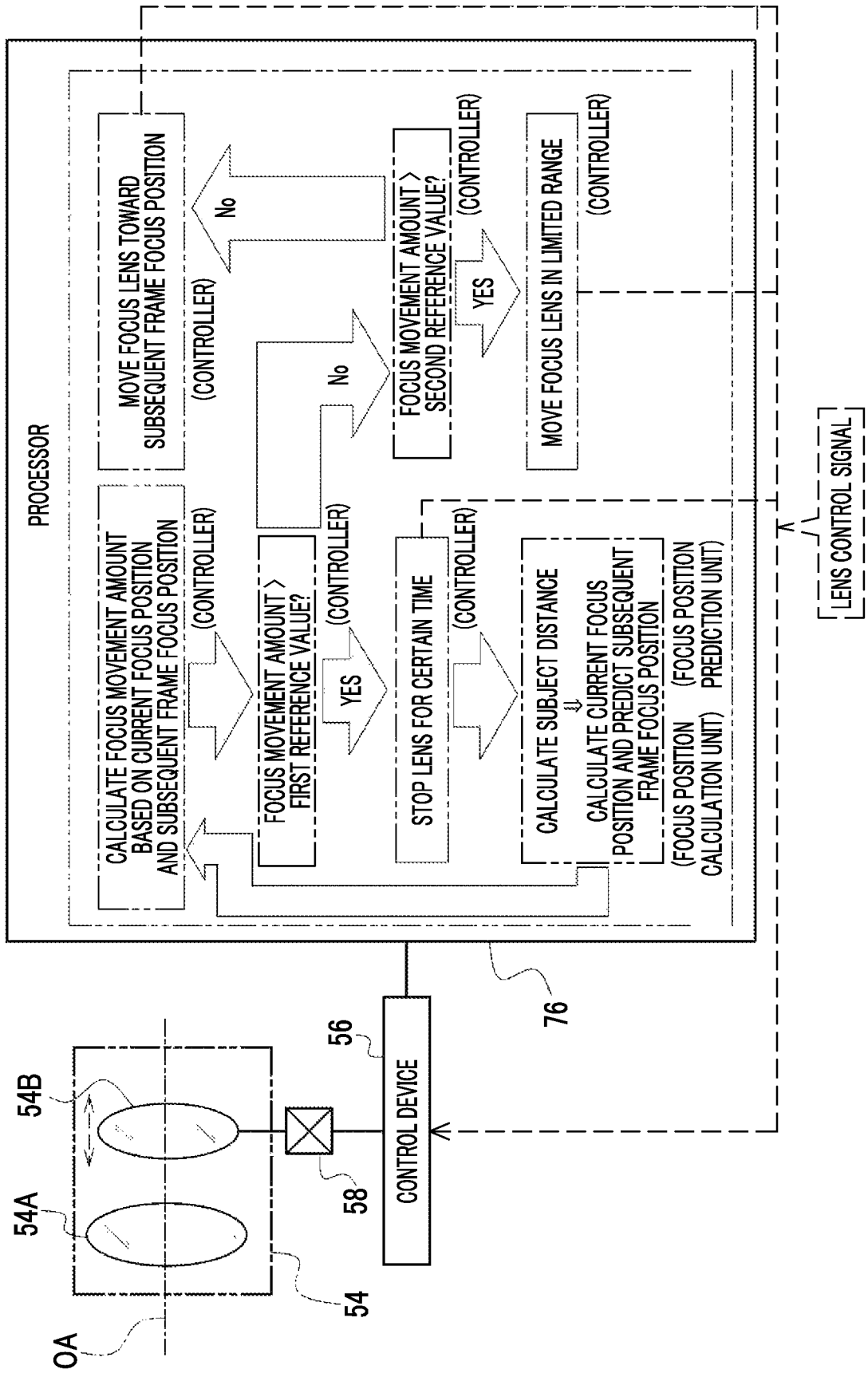
FIG. 34 is a conceptual diagram showing an example of contents of processing performed by the processor according to the fourth embodiment.

As shown in FIG. 34 as an example, the controller 76M calculates the focus movement amount based on the current focus position calculated by the focus position calculation unit 76K and the subsequent frame focus position predicted by the focus position prediction unit 76L. The focus movement amount is a movement amount for moving the focus lens 54B along the optical axis OA. Moreover, the focus movement amount corresponds to the magnitude of a blurriness amount of the image obtained by the imaging with the image sensor 50.

The controller 76M determines whether or not the focus movement amount exceeds a first reference value. The first reference value is an example of a "threshold value" according to the technology of the present disclosure. For example, the first reference value is a value predetermined as the focus movement amount corresponding to the blurriness amount in which there is a risk that rear focus occurs. In a case in which the focus movement amount exceeds the first reference value, the controller 76M outputs the lens control signal to the control device 56 to stop the focus lens 54B for a certain time. The reason why the focus lens 54B is stopped for a certain time is to stand by the change in the situation of the subject. Depending on the change in the situation of the subject, it is possible to escape from the state in which the rear focus occurs.

On the condition that the focus lens 54B is stopped for a certain time, the focus position calculation unit 76K calculates the subject distance and calculates the current focus position based on the calculated subject distance. Moreover, the focus position calculation unit 76K updates the focus position time-series information by using the current focus position. In addition, the focus position prediction unit 76L predicts the subsequent frame focus position by using the focus position time-series information.

The controller 76M determines whether or not the focus movement amount exceeds a second reference value in a case in which the latest focus movement amount is equal to or less than the first reference value. The second reference value is a value which is less than the first reference value. The second reference value may be a fixed value predetermined based on a frame rate of the continuous imaging, a movement speed of the focus lens 54B, or the like, or may be a variable value changed in accordance with an instruction given from the user or the like. In a case in which the focus movement amount exceeds the second reference value, the controller 76M outputs the lens control signal to the control device 56 to move the focus lens 54B along the optical axis OA in a limited range. On the other hand, in a case in which the focus movement amount is equal to or less than the second reference value, the controller 76M outputs the lens control signal to the control device 56 to move the focus lens 54B toward the subsequent frame focus position along the optical axis OA.

Figure 35:
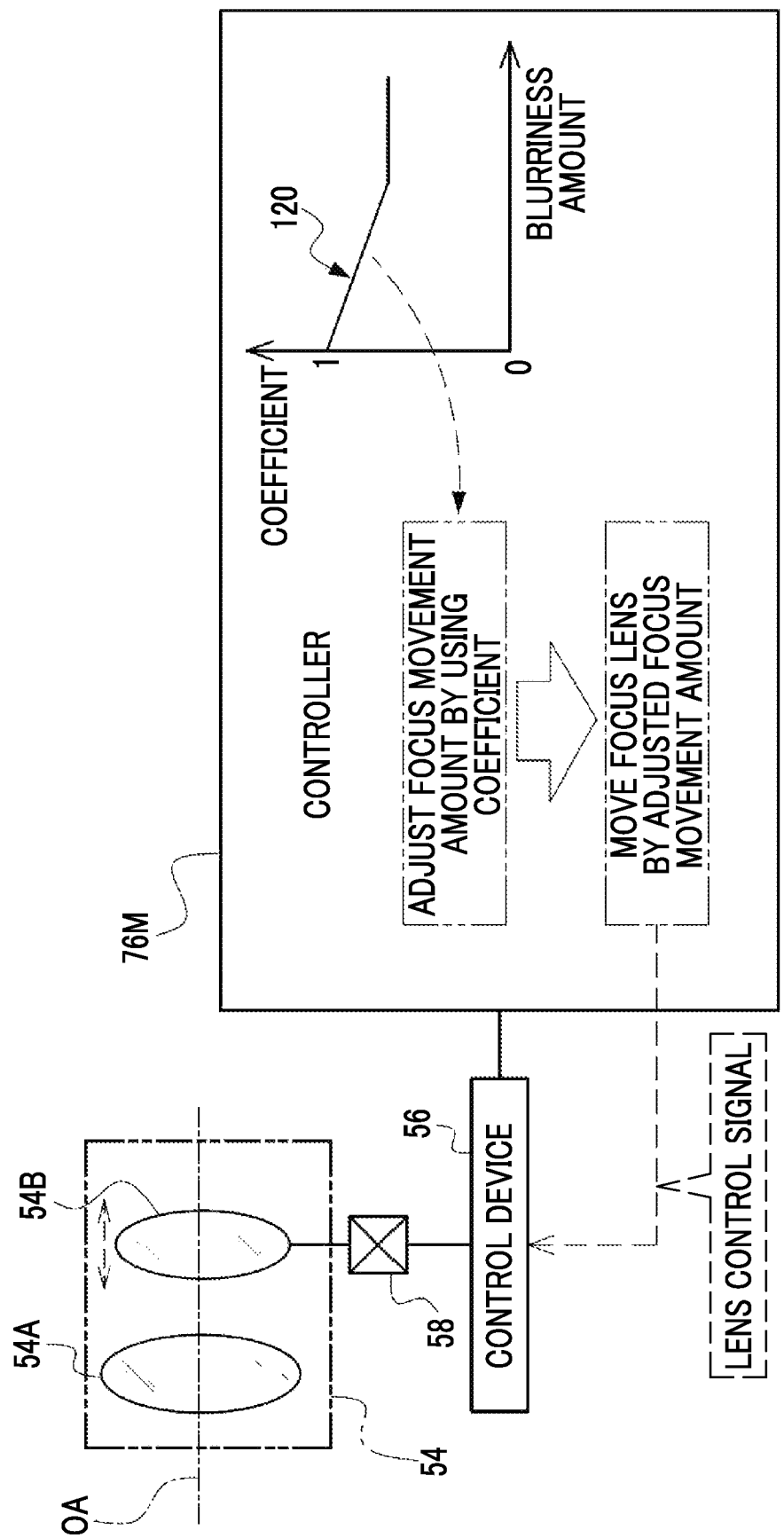
FIG. 35 is a conceptual diagram showing an example of processing contents of the controller according to the fourth embodiment.

In a case in which the focus lens 54B is moved along the optical axis OA by using the focus movement amount exceeding the second reference value as it is, there is a risk that the focus lens 54B is out of the limited range or deviates from the subsequent frame focus position. Therefore, in a case in which the focus lens 54B is moved in the limited range along the optical axis OA, the focus movement amount is adjusted such that the focus lens 54B is not out of the limited range or does not deviate from the subsequent frame focus position. As shown in FIG. 35 as an example, in a case in which the focus lens 54B is moved along the optical axis OA in the limited range, the controller 76M acquires a coefficient from a function 120 and multiplies the acquired coefficient by the focus movement amount to adjust the focus movement amount. The function 120 defines a correlation between the blurriness amount and the coefficient. The coefficient is a value less than 1, and the blurriness amount is linearly decreased as the blurriness amount is increased, and the blurriness amount is fixed in a range equal to or more than a certain value.

After adjusting the focus movement amount, the controller 76M outputs the lens control signal to the control device 56 to move the focus lens 54B along the optical axis OA by the adjusted focus movement amount.

Figure 36:
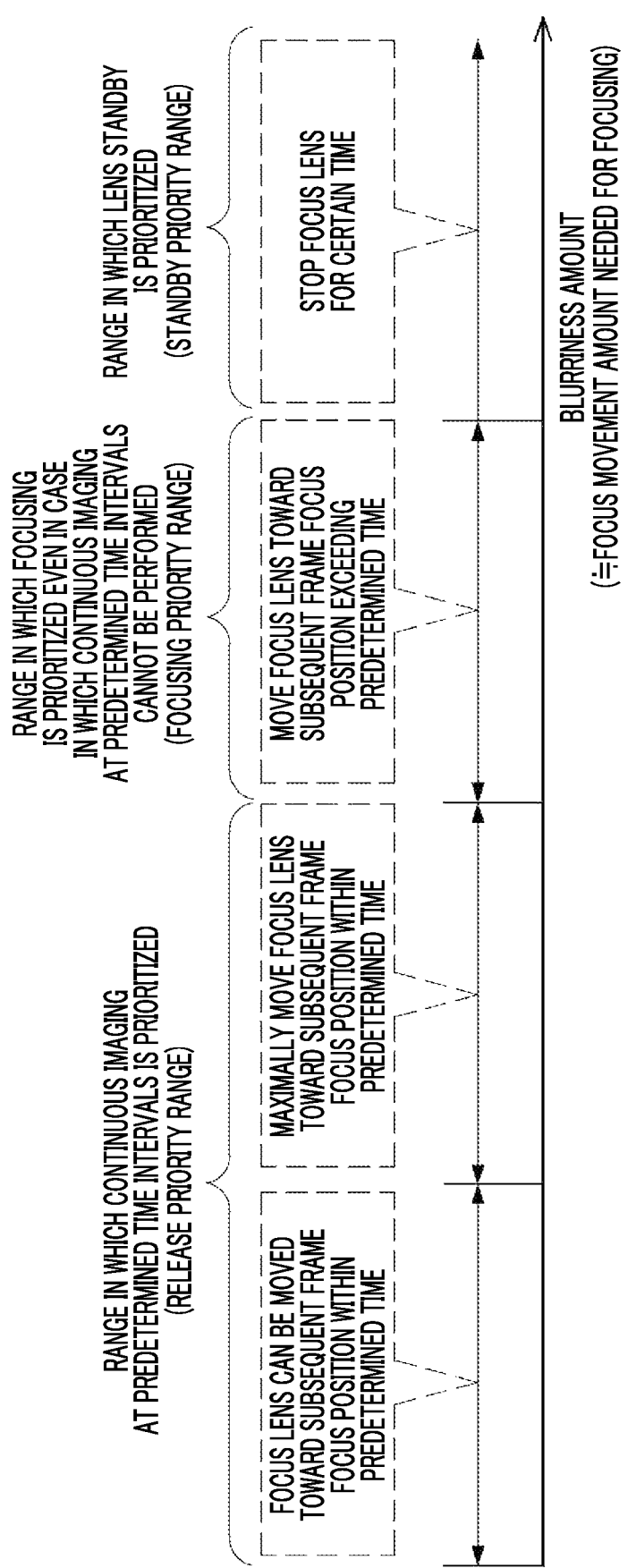
FIG. 36 is a conceptual diagram showing an example of a relationship between a release priority range, a focusing priority range, and a standby priority range, and a blurriness amount according to the fourth embodiment.

As shown in FIG. 36 as an example, in the continuous imaging mode, a release priority range, a focusing priority range, and a standby priority range are defined as a range of the focus movement amount. The release priority range is a range in which the continuous imaging at predetermined time (for example, a time defined in accordance with a default frame rate of the continuous imaging) intervals is prioritized. The focusing priority range is a range in which the focusing is prioritized even in a case in which the continuous imaging cannot be performed at predetermined time intervals. The standby priority range is a range in which the standby of the focus lens 54B is prioritized. In the imaging apparatus 10, in a case in which the continuous imaging is performed, the processor 76 performs the processing shown in FIGS. 34 and 35, so that the focus lens 54B is moved along the optical axis OA in the release priority range, the focusing priority range, or the standby priority range.

The release priority range is broadly classified into a range in which the focus movement amount is small and a range in which the focus movement amount is large. In a case in which the focus lens 54B is moved in the release priority range, the controller 76M adjusts the focus movement amount by using the coefficient (see FIG. 35) in the range in which the focus lens 54B is linearly decreased in the function 120 in accordance with the blurriness amount, and moves the focus lens 54B along the optical axis OA by the adjusted focus movement amount. In a range in which the focus movement amount is small in the release priority range, the controller 76M moves the focus lens 54B toward the subsequent frame focus position within a predetermined time. In a range in which the focus movement amount is large in the release priority range, the controller 76M maximally moves the focus lens 54B toward the subsequent frame focus position within the predetermined time.

In a case in which the focus lens 54B is moved in the focusing priority range, the controller 76M adjusts the focus movement amount by using a fixed coefficient in a range in which the blurriness amount is equal to or larger than a certain value in the function 120, and moves the focus lens 54B along the optical axis OA by the adjusted focus movement amount. In the focusing priority range, the controller 76M moves the focus lens 54B toward the subsequent frame focus position exceeding the predetermined time (that is, ignoring the predetermined time).

In the standby priority range, since the blurriness amount is large, it is predicted that the focus lens will be in the rear focus. Therefore, the controller 76M stops the focus lens 54B for a certain time. This is to stand by the change in the situation of the subject (that is, to stand by the situation in which the rear focus does not occur).

Figure 37:
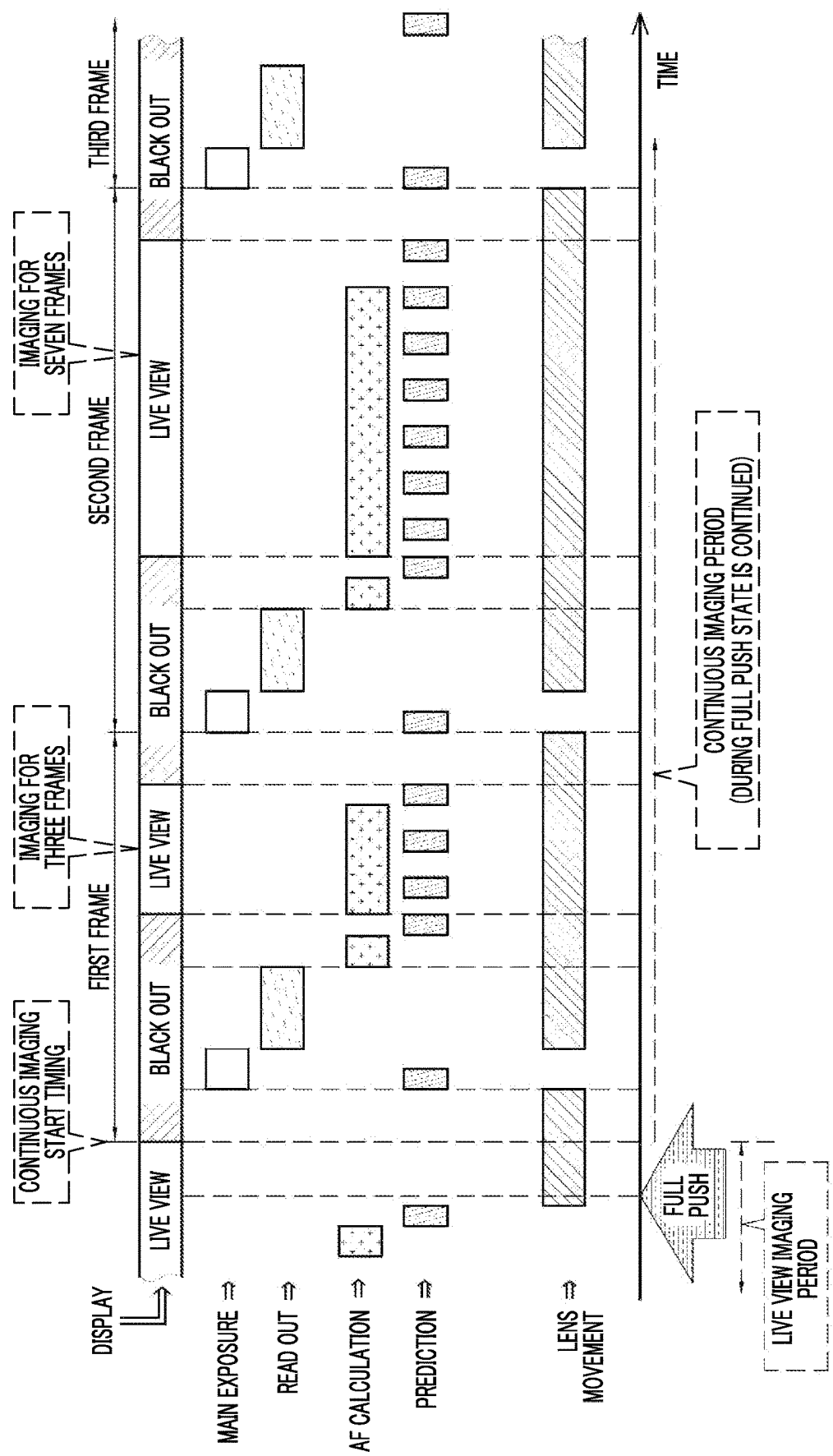
FIG. 37 is a time chart showing an example of a flow of processing of continuous imaging performed by an imaging apparatus according to the fourth embodiment.

FIG. 37 shows an example of a flow of the processing of the continuous imaging in a case in which the continuous imaging control processing is executed by the processor 76. Up to the first frame of the live view imaging period and a continuous imaging period shown in FIG. 37 is the same as the first frame of the live view imaging period and the continuous imaging period shown in FIG. 31. In the example shown in FIG. 37, in the second frame of the continuous imaging, during a main exposure period, the processor 76 predicts the subsequent frame focus position based on the focus position time-series information. In addition, in a case in which the main exposure of the second frame of the continuous imaging ends, the processor 76 moves the focus lens 54B toward the predicted latest subsequent frame focus position.

After the reading out of the digital image data 84 obtained by the main exposure ends, the processor 76 calculates the subject distance based on the phase difference image data included in the latest digital image data 84, and performs the AF calculation based on the calculated subject distance. The processor 76 updates the focus position time-series information by using the current focus position obtained by performing the AF calculation. In addition, the processor 76 predicts the subsequent frame focus position based on the latest focus position time-series information, and continues the movement of the focus lens 54B toward the predicted latest subsequent frame focus position.

Thereafter, in the second frame of the continuous imaging, the live view imaging of a predetermined number of frames (for example, three frames) is performed. The processor 76 calculates the subject distance based on the phase difference image data included in the latest digital image data 84 obtained each time the live view imaging is performed, and performs the AF calculation based on the calculated subject distance. The processor 76 updates the focus position time-series information by using the current focus position obtained by performing the AF calculation. In addition, the processor 76 predicts the subsequent frame focus position based on the latest focus position time-series information, and calculates the focus movement amount from the predicted latest subsequent frame focus position and the current focus position.

Here, the processor 76 executes the processing shown in FIGS. 34 and 35 by using the latest focus movement amount obtained after the live view imaging of the predetermined number of frames ends, thereby controlling the movement of the focus lens 54B in the release priority range, the focusing priority range, or the standby priority range. In a case in which the focus lens 54B is moved in the release priority range, the second frame of the continuous imaging ends within the predetermined time. In a case in which the focus lens 54B is moved in the focusing priority range, the movement of the focus lens 54B toward the subsequent frame focus position is continued, and the live view imaging is also continued. In the example shown in FIG. 37, the live view imaging is not continued in the first frame of the continuous imaging, and the live view imaging is continued in the second frame of the continuous imaging. As a result, the number of frames of the live view image in the first frame of the continuous imaging is "3", whereas the number of frames of the live view image in the second frame of the continuous imaging is "7".

Next, an example of a flow of continuous imaging control processing performed by the processor 76 of the imaging apparatus 10 according to the fourth embodiment will be described with reference to the flowcharts shown in FIGS. 38A to 38D.

Figure 38A:
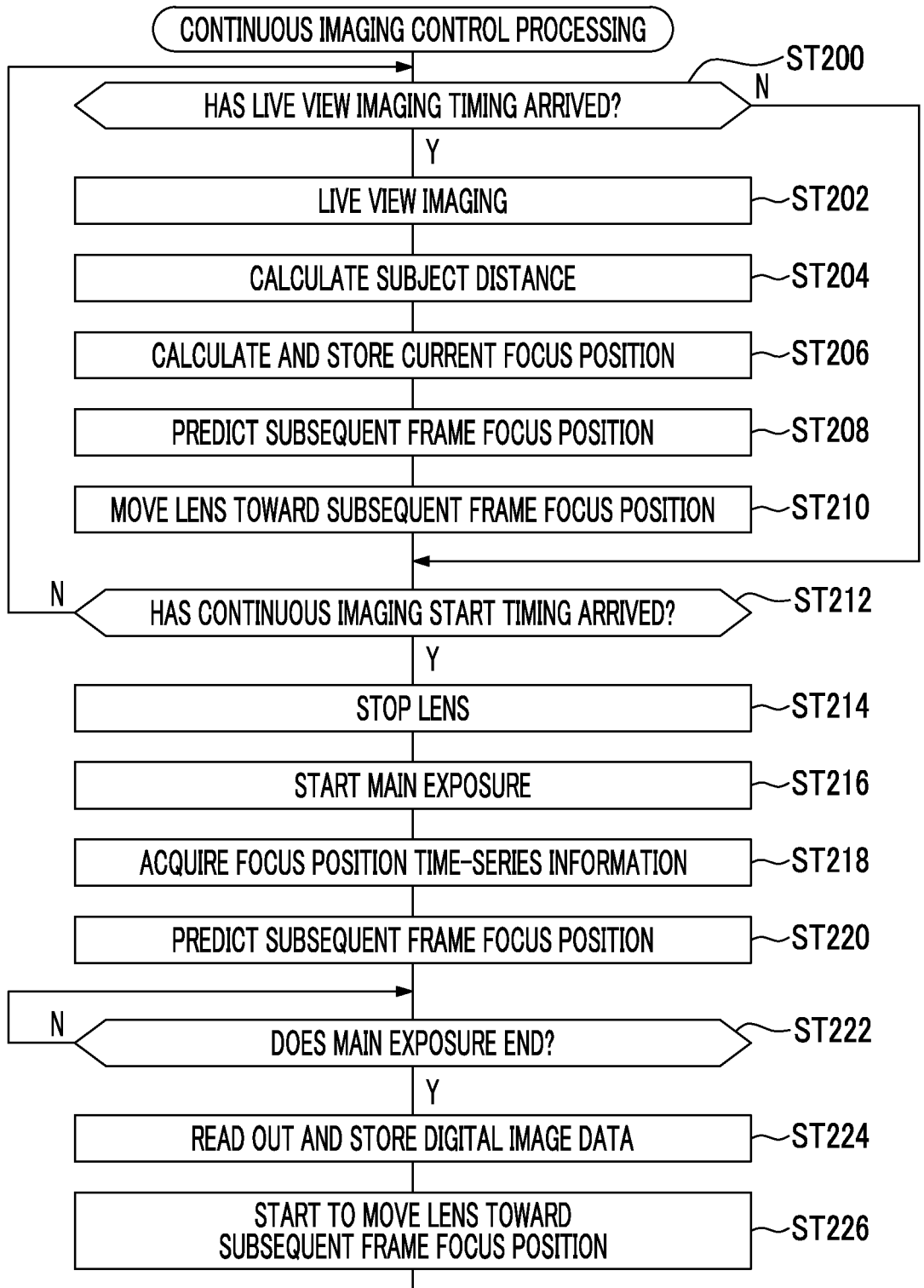
FIG. 38A is a flowchart showing an example of a flow of continuous imaging control processing according to the fourth embodiment.
Figure 38B:
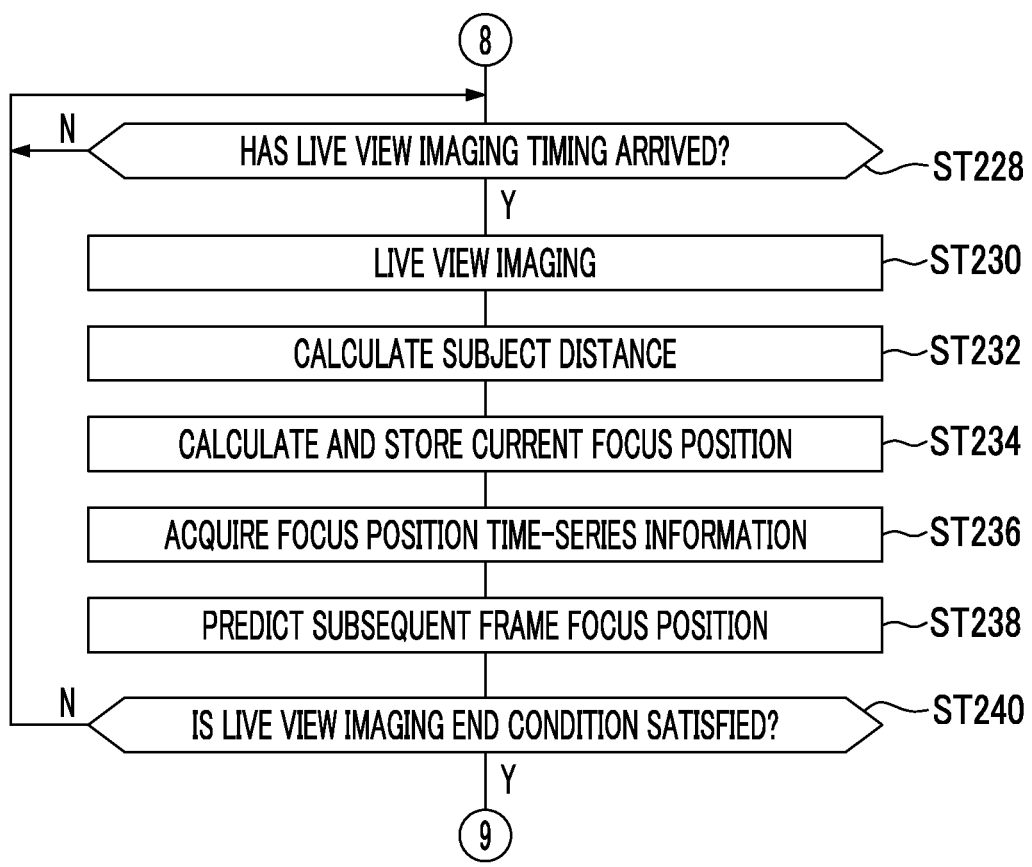
FIG. 38B is the continuation of the flowchart shown in FIG. 38A.

In the continuous imaging control processing shown in FIG. 38A, in step ST200, the controller 76M determines whether or not the live view imaging timing has arrived. In step ST200, in a case in which the live view imaging timing has not arrived, a negative determination is made, and the continuous imaging control processing shifts to step ST212. In step ST200, in a case in which the live view imaging timing has arrived, a positive determination is made, and the continuous imaging control processing shifts to step ST202.

In step ST202, the controller 76M causes the image sensor 50 to perform the live view imaging. After the processing of step ST202 is executed, the continuous imaging control processing shifts to step ST204.

In step ST204, the focus position calculation unit 76K calculates the subject distance based on the phase difference image data included in the digital image data 84 obtained by performing the live view imaging in step ST202. The subject distance calculated in step ST204 is an example of a "first distance which is a distance of a first subject included in first frame data of a first frame period" according to the technology of the present disclosure. Moreover, the processing of step ST204 is an example of a "first calculation step" according to the technology of the present disclosure. After the processing of step ST204 is executed, the continuous imaging control processing shifts to step ST206.

In step ST206, the focus position calculation unit 76K calculates the current focus position based on the subject distance calculated in step ST204 and stores the calculated current focus position in the RAM 80 to update the focus position time-series information. After the processing of step ST206 is executed, the continuous imaging control processing shifts to step ST208.

In step ST208, the focus position prediction unit 76L predicts the subsequent frame focus position based on the focus position time-series information. After the processing of step ST208 is executed, the continuous imaging control processing shifts to step ST210.

In step ST210, the controller 76M moves the focus lens 54B toward the subsequent frame focus position predicted in step ST208. The processing of step ST210 is an example of a "first movement step" according to the technology of the present disclosure. After the processing of step ST210 is executed, the continuous imaging control processing shifts to step ST212.

In step ST212, the controller 76M determines whether or not the continuous imaging start timing has arrived. In step ST212, in a case in which the continuous imaging start timing has not arrived, a negative determination is made, and the continuous imaging control processing shifts to step ST200. In step ST212, in a case in which the continuous imaging start timing has arrived, a positive determination is made, and the continuous imaging control processing shifts to step ST214.

It should be noted that a period from the execution of the processing of step ST200 to the positive determination of step ST212 is an example of a "first frame period" according to the technology of the present disclosure. Moreover, the digital image data 84 obtained by performing the live view imaging in step ST202 is an example of "first frame data" according to the technology of the present disclosure.

In step ST214, the controller 76M stops the focus lens 54B. After the processing of step ST214 is executed, the continuous imaging control processing shifts to step ST216.

In step ST216, the controller 76M causes the image sensor 50 to start the main exposure. After the processing of step ST216 is executed, the continuous imaging control processing shifts to step ST218.

In step ST218, the focus position prediction unit 76L acquires the focus position time-series information from the RAM 80. After the processing of step ST218 is executed, the continuous imaging control processing shifts to step ST220.

In step ST220, the focus position prediction unit 76L predicts the subsequent frame focus position based on the focus position time-series information acquired in step ST218. After the processing of step ST220 is executed, the continuous imaging control processing shifts to step ST222.

In step ST222, the controller 76M determines whether or not the main exposure ends. In step ST222, in a case in which the main exposure does not end, a negative determination is made, and the determination in step ST222 is made again. In step ST222, in a case in which the main exposure ends, a positive determination is made, and the continuous imaging control processing shifts to step ST224.

In step ST224, the controller 76M reads out the digital image data 84 from the image sensor 50 and stores the read out digital image data 84 in the image memory 62. After the processing of step ST224 is executed, the continuous imaging control processing shifts to step ST226.

In step ST226, the controller 76M starts the movement of the focus lens 54B toward the subsequent frame focus position predicted in step ST220. After the processing of step ST226 is executed, the continuous imaging control processing shifts to step ST228 shown in FIG. 38B.

In step ST228, the controller 76M determines whether or not the live view imaging timing has arrived. In step ST228, in a case in which the live view imaging timing has not arrived, a negative determination is made, and the determination in step ST228 is made again. In step ST228, in a case in which the live view imaging timing has arrived, a positive determination is made, and the continuous imaging control processing shifts to step ST230.

In step ST230, the controller 76M causes the image sensor 50 to perform the live view imaging. After the processing of step ST230 is executed, the continuous imaging control processing shifts to step ST232.

In step ST232, the focus position calculation unit 76K calculates the subject distance based on the phase difference image data included in the digital image data 84 obtained by performing the live view imaging in step ST230. After the processing of step ST232 is executed, the continuous imaging control processing shifts to step ST234.

In step ST234, the focus position calculation unit 76K calculates the current focus position based on the subject distance calculated in step ST232 and stores the calculated current focus position in the RAM 80 to update the focus position time-series information. After the processing of step ST234 is executed, the continuous imaging control processing shifts to step ST236.

In step ST236, the focus position prediction unit 76L acquires the focus position time-series information from the RAM 80. After the processing of step ST236 is executed, the continuous imaging control processing shifts to step ST238.

In step ST238, the focus position prediction unit 76L predicts the subsequent frame focus position based on the focus position time-series information acquired in step ST236. After the processing of step ST238 is executed, the continuous imaging control processing shifts to step ST240.

In step ST240, the controller 76M determines whether or not a condition for ending the live view imaging (hereinafter, referred to as a "live view imaging end condition") is satisfied. Examples of the live view imaging end condition include a condition in which the live view imaging is performed for a predetermined number of frames. In step ST240, in a case in which the live view imaging end condition is not satisfied, a negative determination is made, and the continuous imaging control processing shifts to step ST228. In step ST240, in a case in which the live view imaging end condition is satisfied, a positive determination is made, and the continuous imaging control processing shifts to step ST242 shown in FIG. 38C.

Figure 38C:
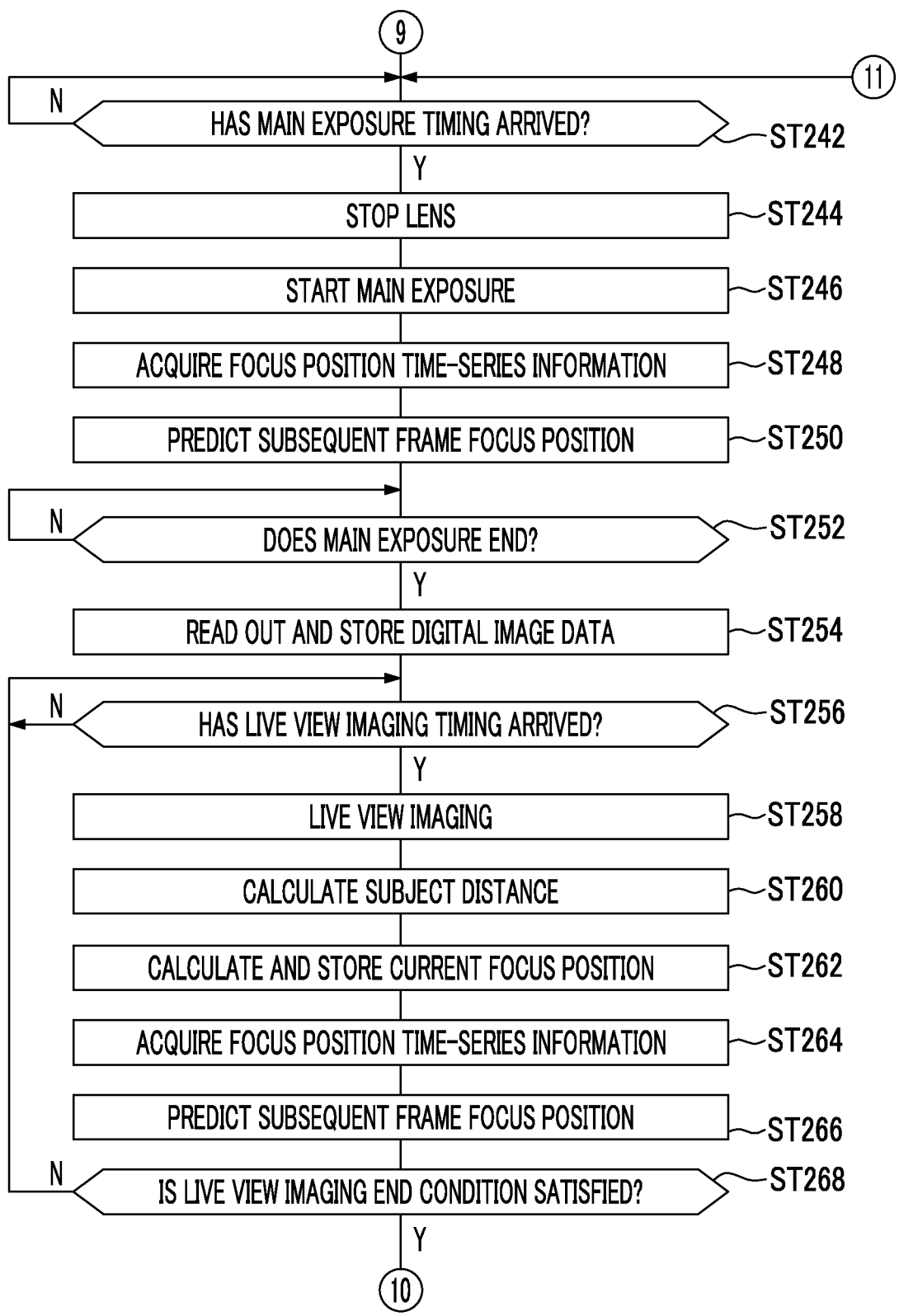
FIG. 38C is the continuation of the flowchart shown in FIG. 38B.

In step ST242 shown in FIG. 38C, the controller 76M determines whether or not a timing for starting the main exposure (hereinafter, referred to as a "main exposure timing") is satisfied. Examples of the main exposure timing include a timing at which the reset of the photoelectric conversion element 52 is completed. In step ST242, in a case in which the main exposure timing is not satisfied, a negative determination is made, and the determination in step ST242 is made again. In a case in which the main exposure timing is satisfied in step ST242, a positive determination is made, and the continuous imaging control processing shifts to step ST244.

In step ST244, the controller 76M stops the focus lens 54B. The position of the focus lens 54B that is stopped by first executing the processing of step ST244 is an example of a "first position" according to the technology of the present disclosure. After the processing of step ST244 is executed, the continuous imaging control processing shifts to step ST246.

In step ST246, the controller 76M causes the image sensor 50 to start the main exposure. After the processing of step ST246 is executed, the continuous imaging control processing shifts to step ST248.

In step ST248, the focus position prediction unit 76L acquires the focus position time-series information from the RAM 80. After the processing of step ST248 is executed, the continuous imaging control processing shifts to step ST250.

In step ST250, the focus position prediction unit 76L predicts the subsequent frame focus position based on the focus position time-series information acquired in step ST248. After the processing of step ST250 is executed, the continuous imaging control processing shifts to step ST252.

In step ST252, the controller 76M determines whether or not the main exposure ends. In step ST252, in a case in which the main exposure does not end, a negative determination is made, and the determination in step ST252 is made again. In step ST252, in a case in which the main exposure ends, a positive determination is made, and the continuous imaging control processing shifts to step ST254.

In step ST254, the controller 76M reads out the digital image data 84 from the image sensor 50 and stores the read out digital image data 84 in the image memory 62. After the processing of step ST254 is executed, the continuous imaging control processing shifts to step ST256.

In step ST256, the controller 76M determines whether or not the live view imaging timing has arrived. In step ST256, in a case in which the live view imaging timing has not arrived, a negative determination is made, and the determination in step ST256 is made again. In step ST256, in a case in which the live view imaging timing has arrived, a positive determination is made, and the continuous imaging control processing shifts to step ST258.

In step ST258, the controller 76M causes the image sensor 50 to perform the live view imaging. After the processing of step ST258 is executed, the continuous imaging control processing shifts to step ST260.

In step ST260, the focus position calculation unit 76K calculates the subject distance based on the phase difference image data included in the digital image data 84 obtained by performing the live view imaging in step ST258. The subject distance calculated in step ST260 is an example of a "second distance which is a distance of a second subject included in second frame data of a second frame period after the first frame period" according to the technology of the present disclosure. Moreover, the processing of step ST260 is an example of a "second calculation step" according to the technology of the present disclosure. After the processing of step ST260 is executed, the continuous imaging control processing shifts to step ST262.

In step ST262, the focus position calculation unit 76K calculates the current focus position based on the subject distance calculated in step ST260 and stores the calculated current focus position in the RAM 80 to update the focus position time-series information. After the processing of step ST262 is executed, the continuous imaging control processing shifts to step ST264.

In step ST264, the focus position prediction unit 76L acquires the focus position time-series information from the RAM 80. After the processing of step ST264 is executed, the continuous imaging control processing shifts to step ST266.

In step ST266, the focus position prediction unit 76L predicts the subsequent frame focus position based on the focus position time-series information acquired in step ST264. After the processing of step ST266 is executed, the continuous imaging control processing shifts to step ST268.

In step ST268, the controller 76M determines whether or not the live view imaging end condition is satisfied. In step ST268, in a case in which the live view imaging end condition is not satisfied, a negative determination is made, and the continuous imaging control processing shifts to step ST256. In step ST268, in a case in which the live view imaging end condition is satisfied, a positive determination is made, and the continuous imaging control processing shifts to step ST270 shown in FIG. 38D.

Figure 38D:
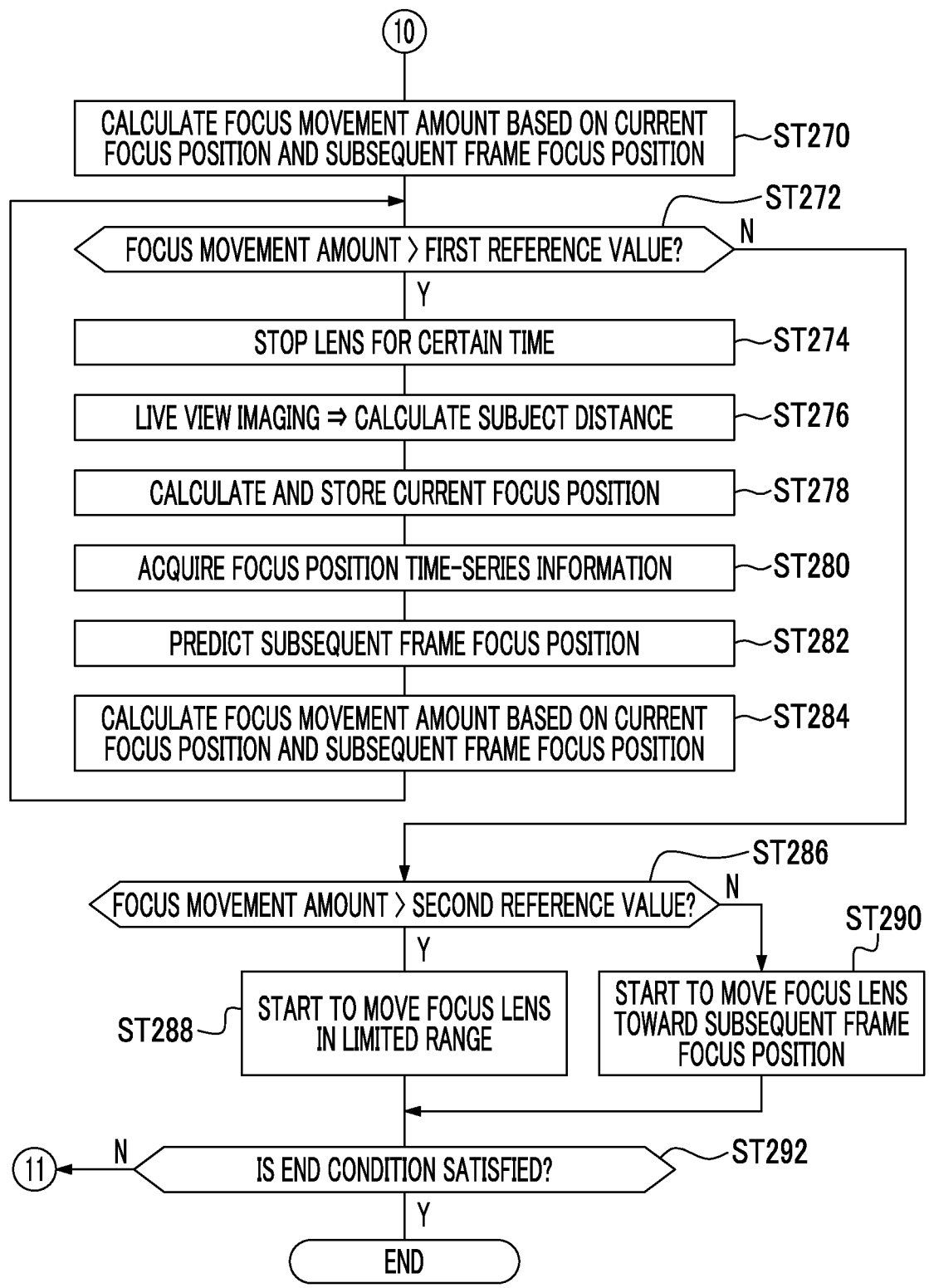
FIG. 38D is the continuation of the flowchart shown in FIG. 38C.

In step ST270 shown in FIG. 38D, the controller 76M calculates the focus movement amount based on the current focus position and the subsequent frame focus position which is predicted in step ST266. The focus movement amount calculated in step ST270 is an example of a "movement amount" according to the technology of the present disclosure. After the processing of step ST270 is executed, the continuous imaging control processing shifts to step ST272.

In step ST272, the controller 76M determines whether or not the focus movement amount calculated in step ST270 or ST284 exceeds the first reference value. In step ST270, in a case in which the focus movement amount calculated in step ST270 or ST284 does not exceed the first reference value, a negative determination is made, and the continuous imaging control processing shifts to step ST286. In step ST272, in a case in which the focus movement amount calculated in step ST270 or ST284 exceeds the first reference value, a positive determination is made, and the continuous imaging control processing shifts to step ST274.

In step ST274, the controller 76M stops the focus lens 54B for a certain time. After the processing of step ST274 is executed, the continuous imaging control processing shifts to step ST276.

In step ST276, the controller 76M causes the image sensor 50 to perform the live view imaging. In addition, the focus position calculation unit 76K calculates the subject distance based on the phase difference image data included in the digital image data 84 obtained by performing the live view imaging. After the processing of step ST276 is executed, the continuous imaging control processing shifts to step ST278.

In step ST278, the focus position calculation unit 76K calculates the current focus position based on the subject distance calculated in step ST276 and stores the calculated current focus position in the RAM 80 to update the focus position time-series information. After the processing of step ST278 is executed, the continuous imaging control processing shifts to step ST280.

In step ST280, the focus position prediction unit 76L acquires the focus position time-series information from the RAM 80. After the processing of step ST280 is executed, the continuous imaging control processing shifts to step ST282.

In step ST282, the focus position prediction unit 76L predicts the subsequent frame focus position based on the focus position time-series information acquired in step ST280. After the processing of step ST282 is executed, the continuous imaging control processing shifts to step ST284.

In step ST284, the controller 76M calculates the focus movement amount based on the current focus position and the subsequent frame focus position which is predicted in step ST282. The focus movement amount calculated in step ST284 is an example of a "movement amount" according to the technology of the present disclosure. After the processing of step ST284 is executed, the continuous imaging control processing shifts to step ST272.

In step ST286, a determination is made as to whether or not the focus movement amount calculated in step ST270 or ST284 exceeds the second reference value. In step ST286, in a case in which the focus movement amount calculated in step ST270 or ST284 exceeds the second reference value, a positive determination is made, and the continuous imaging control processing shifts to step ST288. In step ST286, in a case in which the focus movement amount calculated in step ST270 or ST284 does not exceed the second reference value, a negative determination is made, and the continuous imaging control processing shifts to step ST290.

In step ST288, the controller 76M starts the movement of the focus lens 54B in the limited range. That is, the controller 76M starts the movement of the focus lens 54B within the predetermined time toward the subsequent frame focus position predicted in step ST266 or ST282. Here, the focus movement amount used for the movement of the focus lens 54B is the focus movement amount adjusted by the coefficient obtained from the function 120 in accordance with the blurriness amount. By executing the processing of step ST288, the focus lens 54B does not reach the subsequent frame focus position predicted in step ST266 or ST282, but reaches a position closer to the position of the subsequent frame focus position predicted in step ST266 or ST282 than the position of the focus lens 54B stopped in step ST244. A position which is a destination of the movement of the focus lens 54B due to the execution of the processing of step ST288 (for example, a position of the focus lens 54B stopped in step ST244 shown in FIG. 38C) is an example of a "third position" according to the technology of the present disclosure. After the processing of step ST288 is executed, the continuous imaging control processing shifts to step ST292.

In step ST290, the controller 76M starts the movement of the focus lens 54B toward the subsequent frame focus position predicted in step ST266 or ST282. Here, the focus movement amount used for the movement of the focus lens 54B is the focus movement amount adjusted by the coefficient obtained from the function 120 in accordance with the blurriness amount. By executing the processing of step ST290, the focus lens 54B reaches the subsequent frame focus position predicted in step ST266 or ST282. A position which is a destination of the movement of the focus lens 54B due to the execution of the processing of step ST290 (for example, a position of the focus lens 54B stopped in step ST244 shown in FIG. 38C) is an example of a "second position" according to the technology of the present disclosure. After the processing of step ST290 is executed, the continuous imaging control processing shifts to step ST292.

It should be noted that, in the continuous imaging control processing, the position which is the destination of the movement of the focus lens 54B is selected by executing the processing of step ST270 or the processing of step ST284 and the processing of step ST286. The processing of step ST270, the processing of step ST284, and the processing of step ST286 are examples of a "selection step" according to the technology of the present disclosure. Moreover, the processing of step ST288, the processing of step ST290, and the processing of step ST246 are examples of an "imaging step" according to the technology of the present disclosure.

In step ST292, the controller 76M determines whether or not a condition for ending the continuous imaging control processing (hereinafter, referred to as a "continuous imaging control processing end condition") is satisfied. Examples of the continuous imaging control processing end condition include a condition in which the continuous imaging mode is released. In step ST292, in a case in which the continuous imaging control processing end condition is not satisfied, a negative determination is made, and the continuous imaging control processing shifts to step ST242 shown in FIG. 38C. In step ST292, in a case in which the continuous imaging control processing end condition is satisfied, a positive determination is made, and the continuous imaging control processing ends.

As described above, in the imaging apparatus 10 according to the fourth embodiment, the subject distance is calculated based on the digital image data 84 obtained by performing the live view imaging during the live view imaging period, which is a stage before the continuous imaging period (see step ST204). In addition, in the continuous imaging period, the focus lens 54B is moved toward the subsequent frame focus position (see step ST220) predicted based on the subject distance calculated during the live view imaging period. Here, in a case in which the frame interval of the continuous imaging is determined by the time interval in which the release is prioritized, the main exposure may be started without causing the focus lens 54B to reach the subsequent frame focus position, and a blurred image is obtained. On the other hand, in a case in which the focusing is prioritized while ignoring the frame interval of the continuous imaging, an image with less blur can be obtained, but the number of frames obtained by the continuous imaging is reduced.

In the imaging apparatus 10 according to the fourth embodiment, for example, the subject distance is calculated based on the digital image data 84 obtained in the live view imaging of the second frame of the continuous imaging, and the focus movement amount is calculated based on the calculated subject distance. In addition, depending on whether or not the focus movement amount exceeds the second reference value, whether the focus lens 54B is caused to reach the predicted subsequent frame focus position or the focus lens 54B is brought as close as possible to the predicted subsequent frame focus position is selected.

For example, in a case in which the focus movement amount exceeds the second reference value, a determination is made that the focus lens 54B cannot reach the predicted subsequent frame focus position within the predetermined time. In this case, an option of bringing the focus lens 54B as close as possible to the subsequent frame focus position is selected (see step ST288). In a case in which the focus movement amount is equal to or less than the second reference value, a determination is made that the focus lens 54B can reach the predicted subsequent frame focus position within the predetermined time. In this case, an option of causing the focus lens 54B to reach the predicted subsequent frame focus position is selected (see step ST290).

In a case in which the main exposure is performed after the focus lens 54B reaches the predicted subsequent frame focus position, the main exposure in an in-focus state can be performed without widening the release interval. Moreover, in a case in which the main exposure is performed after the predicted subsequent frame focus position is brought as close as possible to the predicted position, the main exposure can be performed in a state close to the in-focus state without excessively widening the frame interval of the continuous imaging. Therefore, it is possible to achieve both the release and the focusing in a well-balanced manner. As a result, for example, in the case of the continuous imaging mode, it is possible to obtain an image with less blur without excessively reducing the speed of the continuous imaging.

Moreover, in the imaging apparatus 10 according to the fourth embodiment, in a case in which the calculated focus movement amount is too large, it is difficult to perform the focusing within the predetermined time. In a case in which the focus movement amount exceeds the first reference value, the focus lens 54B is held for a certain time. In a case in which the situation of the subject is changed during this period, it can be expected that the focus movement amount which is calculated again is reduced. In a case in which the focus movement amount is small, it is possible to realize the main exposure in the in-focus state within the predetermined time or the main exposure in a state close to the in-focus state within the predetermined time.

It should be noted that, in the fourth embodiment described above, the case of the continuous imaging mode is described, but the technology of the present disclosure is not limited to this. For example, the technology disclosed in the fourth embodiment described above is applied to the imaging performed to continuously obtain a plurality of frames, such as the imaging performed to obtain a video for recording.

Moreover, in each of the embodiments described above, the form example has been described in which various programs are stored in the NVM 78, but the technology of the present disclosure is not limited to this. For example, various programs may be stored in a portable computer-readable non-transitory storage medium, such as a solid state drive (SSD) or a USB memory. Various programs stored in the non-transitory storage medium are installed in the imaging apparatus 10. The processor 76 executes various pieces of processing described in each of the embodiments described above in accordance with various programs.

Moreover, various programs may be stored in a storage device of another computer or server device connected to the imaging apparatus 10 via a network, and various programs may be downloaded in response to a request of the imaging apparatus 10 and are installed in the imaging apparatus 10.

It should be noted that it is not necessary to store all of the various programs in the storage device of the other computer or server device connected to the imaging apparatus 10 or the NVM 78, and a part of the various programs may be stored.

Moreover, although the imaging apparatus 10 shown in FIG. 3 includes the built-in controller 60, the technology of the present disclosure is not limited to this, and for example, the controller 60 may be provided outside the imaging apparatus 10.

In each of the embodiments described above, the form example has been described in which the technology of the present disclosure is realized by the software configuration, but the technology of the present disclosure is not limited to this, and a device including an ASIC, an FPGA, or a PLD may be applied. Moreover, a combination of the hardware configuration and the software configuration may be used.

The following various processors can be used as a hardware resource for executing the various pieces of processing described in each of the embodiments described above. Examples of the processor include a CPU which is a general-purpose processor functioning as the hardware resource for executing the various pieces of processing by executing software, that is, a program. Moreover, examples of the processor include a dedicated electronic circuit which is a processor having a circuit configuration designed to be dedicated for executing specific processing, such as the FPGA, the PLD, or the ASIC. A memory is built in or connected to any processor, and any processor executes the various pieces of processing by using the memory.

The hardware resource for executing various pieces of processing may be composed of one of the various processors or may be composed of a combination of two or more processors that are the same type or different types (for example, combination of a plurality of FPGAs or combination of a CPU and an FPGA). Moreover, the hardware resource for executing the various pieces of processing may be one processor.

As a configuring example of one processor, first, there is a form in which one processor is composed of a combination of one or more CPUs and software and the processor functions as the hardware resource for executing the various pieces of processing. Second, as represented by system-on-a-chip (SoC), there is a form in which a processor that realizes the functions of the entire system including a plurality of hardware resources for executing the various pieces of processing with a single integrated circuit (IC) chip. As described above, the various pieces of processing are realized by using one or more of various processors as the hardware resource.

Further, as the hardware structure of these various processors, more specifically, it is possible to use an electronic circuit in which circuit elements, such as semiconductor elements, are combined. Moreover, the various pieces of processing are merely examples. Therefore, it is needless to say that the deletion of an unneeded step, the addition of a new step, and the change of a processing order may be employed in a range not departing from the gist.

The description contents and the shown contents above are the detailed description of the parts according to the technology of the present disclosure, and are merely examples of the technology of the present disclosure. For example, the description of the configuration, the function, the action, and the effect above are the description of examples of the configuration, the function, the action, and the effect of the parts according to the technology of the present disclosure. Accordingly, it is needless to say that unneeded parts may be deleted, new elements may be added, or replacements may be made with respect to the description contents and the shown contents above in a range that does not deviate from the gist of the technology of the present disclosure. Moreover, in order to avoid complications and facilitate understanding of the parts according to the technology of the present disclosure, in the description contents and the shown contents above, the description of common technical knowledge and the like that do not particularly require description for enabling the implementation of the technology of the present disclosure are omitted.

In the present specification, the grammatical concept of "A or B" includes the concept of "any one of A or B" as well as the concept synonymous with "at least one of A or B". That is, "A or B" includes meaning that it may be only A, only B, or a combination of A and B. Moreover, in the present specification, in a case in which three or more matters are associated and expressed by "or", the same concept as "A or B" is applied.

All documents, patent applications, and technical standards described in the present specification are incorporated into the present specification by reference to the same extent as in a case in which the individual documents, patent applications, and technical standards are specifically and individually stated to be incorporated by reference.

What is claimed is:
1. A selection method comprising:
   a first imaging step of imaging a subject included in a plurality of candidate regions including a first region and a plurality of second regions;
   a first calculation step of calculating a first distance, which is a distance of a first subject in the first region, and a plurality of second distances, which are distances of a plurality of second subjects in the plurality of second regions;
   a first specifying step of specifying a first specific region, which corresponds to the second distance satisfying a first condition among the plurality of second distances, from among the plurality of second regions; and a first selection step of selecting a first in-focus subject, which is to be focused, from among the first subject and the second subject in the first specific region based on a first ratio which is a ratio of the first specific region to the plurality of second regions.

2. The selection method according to claim 1,
wherein the first condition is a condition in which a distance is shorter than the first distance.

3. The selection method according to claim 1,
wherein the first region is a central region,
the second region is a peripheral region,
the first ratio is a value corresponding to the number of the first specific regions, and
the first selection step is a step of selecting the second subject as the first in-focus subject in a case in which the value exceeds a threshold value corresponding to the number of the peripheral regions positioned below the central region in an up-down direction fixed in advance with respect to the plurality of candidate regions.

4. The selection method according to claim 1,
wherein the first selection step is a step of selecting the first subject as the first in-focus subject in a case in which the plurality of second distances are longer than the first distance.

5. The selection method according to claim 1, further comprising:
a second imaging step of imaging the first subject and the plurality of second subjects after the first imaging step; and
a second selection step of selecting a subject of which a distance is close to the first in-focus subject from among the first subject and the plurality of second subjects, which are imaged in the second imaging step, as a second in-focus subject which is to be focused.

6. The selection method according to claim 5,
wherein the second selection step is a step of selecting a subject of which a distance is close to the first in-focus subject in a range less than a predetermined distance from among the first subject and the plurality of second subjects, which are imaged in the second imaging step, as the second in-focus subject.

7. The selection method according to claim 1,
wherein the plurality of candidate regions include a plurality of third regions,
the plurality of third regions include the plurality of second regions, and
the selection method further comprises:
a second calculation step of calculating the first distance and a plurality of third distances which are distances of a plurality of third subjects in the plurality of third regions;
a second specifying step of specifying a second specific region, which corresponds to the third distance satisfying a second condition, with respect to the plurality of third distances; and
a third selection step of selecting a third in-focus subject, which is to be focused, from among the first subject and the third subject in the second specific region based on a second ratio which is a ratio of the second specific region to the plurality of third regions.

8. The selection method according to claim 7,
wherein, in a case in which the second specific region is not specified in the second specifying step, the first specifying step and the first selection step are performed.

9. The selection method according to claim 7,
wherein the second condition is a condition in which a distance is shorter than the first distance.

10. The selection method according to claim 7,
wherein, in a case in which N is an odd number of 3 or more,
the plurality of second regions are a plurality of regions disposed in a matrix of N×N, and
the plurality of third regions are a plurality of regions disposed in a matrix of (N+2)×(N+2).

11. An imaging apparatus comprising:
an image sensor; and
a processor,
wherein the processor
causes the image sensor to image a subject included in a plurality of candidate regions including a first region and a plurality of second regions,
calculates a first distance, which is a distance of a first subject in the first region, and a plurality of second distances, which are distances of a plurality of second subjects in the plurality of second regions,
specifies a first specific region, which corresponds to the second distance satisfying a first condition among the plurality of second distances, from among the plurality of second regions, and
selects a first in-focus subject, which is to be focused, from among the first subject and the second subject in the first specific region based on a first ratio which is a ratio of the first specific region to the plurality of second regions.

12. An imaging method comprising:
a first calculation step of calculating a first distance which is a distance of a first subject included in first frame data of a first frame period;
a first movement step of moving a focus lens to a first position based on the first distance;
a second calculation step of calculating a second distance which is a distance of a second subject included in second frame data of a second frame period after the first frame period;
a selection step of selecting a second position, as a position to which the focus lens is moved, in a case in which a movement amount, that is determined based on the second distance and that is for moving the focus lens, is equal to or less than a reference value, and selecting a third position closer to the first position than the second position, as a position to which the focus lens is moved, in a case in which the movement amount exceeds the reference value; and
an imaging step of moving the focus lens to the selected second position or third position and imaging the second subject.

13. The imaging method according to claim 12,
wherein the selection step is a step of selecting the first position, the second position, or the third position as the position to which the focus lens is moved in a case of a continuous imaging mode.

14. The imaging method according to claim 12,
wherein the second distance is calculated based on an image obtained by performing imaging, and
the focus lens is held in a case in which a blurriness amount of the image exceeds a threshold value.

* * * * *